US009886843B2

(12) United States Patent
Warren et al.

(10) Patent No.: US 9,886,843 B2
(45) Date of Patent: Feb. 6, 2018

(54) SYSTEMS AND METHODS FOR COORDINATING AND ADMINISTERING SELF TESTS OF SMART HOME DEVICES HAVING AUDIBLE OUTPUTS

(71) Applicant: GOOGLE LLC, Mountain View, CA (US)

(72) Inventors: Daniel Adam Warren, San Francisco, CA (US); Lawrence Frederick Heyl, Mountain View, CA (US); Edwin H. Satterthwaite, Jr., Palo Alto, CA (US); Steven Clark, Mountain View, CA (US); Andrew W. Goldenson, Palo Alto, CA (US); Dietrich Ho, Mountain View, CA (US); Nicholas Unger Webb, Menlo Park, CA (US); Julia Deluliis, Mountain View, CA (US); Tyler Moore, Mountain View, CA (US); Ben Manuto, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/247,538

(22) Filed: Aug. 25, 2016

(65) Prior Publication Data

US 2016/0364978 A1 Dec. 15, 2016

Related U.S. Application Data

(62) Division of application No. 14/717,706, filed on May 20, 2015, now Pat. No. 9,454,893.

(51) Int. Cl.
*G08B 29/12* (2006.01)
*H04W 24/00* (2009.01)
(Continued)

(52) U.S. Cl.
CPC ........... *G08B 29/126* (2013.01); *G08B 17/10* (2013.01); *G08B 29/10* (2013.01); *H04R 3/00* (2013.01); *H04R 29/001* (2013.01)

(58) Field of Classification Search
CPC ...... G08B 21/182; G08B 17/10; G08B 17/11; G08B 29/14; G08B 29/043; G08B 29/12;
(Continued)

(56) References Cited

U.S. PATENT DOCUMENTS 4,604,713 A 8/1986 Godard et al.
5,451,709 A 9/1995 Minamitaka
(Continued)

FOREIGN PATENT DOCUMENTS

KR 1020140143069 12/2014

*Primary Examiner* — George Bugg
*Assistant Examiner* — Munear Akki
(74) *Attorney, Agent, or Firm* — Van Court & Aldridge LLP

(57) ABSTRACT

Systems and methods for self-administering a sound test to verify operation of a speaker and/or alarm within a hazard detection system are described herein. The sound test can verify that the audible sources such as the alarm and speaker operate at the requisite loudness and frequencies. In addition, the sound test can be self-administered in that it does not require the presence of a person to initiate or verify that the audible sources are functioning properly.

17 Claims, 34 Drawing Sheets

(51) Int. Cl.

*G08B 29/10* (2006.01)
*G08B 17/10* (2006.01)
*H04R 3/00* (2006.01)
*H04R 29/00* (2006.01)

(58) Field of Classification Search

CPC ........ G08B 13/22; G08B 25/12; A62C 37/36; A62C 37/04; A62C 3/06; A62C 37/00; H04R 29/00

USPC .......... 340/516, 514, 309.15, 515, 628, 629; 381/58; 169/46, 61, 67–70; 280/372; 370/241, 244, 245, 246

See application file for complete search history.

(56) References Cited

U.S. PATENT DOCUMENTS 6,441,723 B1* 8/2002 Mansfield, Jr. ........ G08B 25/06 340/538
6,480,825 B1 11/2002 Sharma et al.
6,564,056 B1 5/2003 Fitzgerald
6,624,750 B1 9/2003 Marman et al.
7,113,090 B1 9/2006 Saylor et al.
8,350,694 B1 1/2013 Trundle et al.
8,789,175 B2 7/2014 Hubner et al.
8,988,232 B1 3/2015 Sloo et al.
9,454,893 B1 9/2016 Warren et al.
2002/0165466 A1 11/2002 Givens et al.
2002/0177428 A1 11/2002 Menard et al.
2002/0186131 A1 12/2002 Felts
2004/0186739 A1 9/2004 Bolles et al.
2004/0246125 A1* 12/2004 Morris ................. G08B 29/126 340/514
2005/0149136 A1 7/2005 Siejko et al.
2005/0156731 A1 7/2005 Chapman et al.
2005/0253709 A1 11/2005 Baker
2005/0253713 A1 11/2005 Yokota
2005/0280527 A1 12/2005 Farley
2006/0173564 A1 8/2006 Beverly
2006/0259169 A1 11/2006 Asada
2006/0273188 A1 12/2006 Amron
2008/0084291 A1 4/2008 Campion et al.
2008/0219458 A1 9/2008 Brooks et al.
2008/0291037 A1* 11/2008 Lax ........................ G08B 7/066 340/628
2009/0077623 A1 3/2009 Baum et al.
2009/0174562 A1* 7/2009 Jacobus ............... G08B 29/181 340/636.1
2010/0023865 A1 1/2010 Fulker et al.
2010/0086140 A1 4/2010 Chen et al.
2010/0201529 A1 8/2010 Garrick
2010/0315224 A1 12/2010 Orsini et al.
2011/0230161 A1 9/2011 Newman
2012/0192070 A1 7/2012 de Faria et al.
2012/0286946 A1 11/2012 Karl et al.
2013/0154823 A1 6/2013 Ostrer et al.
2013/0207802 A1 8/2013 Wu et al.
2013/0246850 A1 9/2013 Gelter et al.
2013/0343202 A1* 12/2013 Huseth .............. H04W 52/0206 370/244
2014/0015667 A1 1/2014 Kolb
2014/0166319 A1 6/2014 Shaik et al.
2014/0266675 A1 9/2014 Piccolo, III et al.
2014/0340215 A1* 11/2014 Piccolo, III ............ G08B 29/12 340/514
2015/0061859 A1 3/2015 Matsuoka et al.
2015/0097680 A1 4/2015 Fadell et al.
2015/0097688 A1 4/2015 Bruck et al.
2015/0100166 A1 4/2015 Baynes et al.
2015/0163814 A1* 6/2015 Kore ................... H04W 72/082 370/330
2015/0206421 A1 7/2015 Moffa
2015/0310732 A1* 10/2015 Piccolo, III .......... G08B 29/145 340/515
2015/0348399 A1 12/2015 Cree et al.
2016/0042638 A1 2/2016 Sangha et al.

* cited by examiner

SYSTEMS AND METHODS FOR COORDINATING AND ADMINISTERING SELF TESTS OF SMART HOME DEVICES HAVING AUDIBLE OUTPUTS

This application is a divisional of U.S. patent application Ser. No. 14/717,706, filed May 20, 2015, the disclosure of which is incorporated by reference in its entirety.

TECHNICAL FIELD

This patent specification relates to systems and methods for testing operations of hazard detection system. More particularly, this specification relates to automated self-testing of an alarm in a hazard detection system.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Network-connected devices appear throughout homes, office buildings, and other structures. Some of these devices may be hazard detection systems, such as smoke detectors, carbon monoxide detectors, combination smoke and carbon monoxide detectors, or may be other systems for detecting other conditions have been used in residential, commercial, and industrial settings for safety and security considerations. In the event a hazard is detected, an alarming mechanism may be activated to provide a warning. However, if the alarming mechanism does not work, the ability of the hazard system to alert the user may be compromised. Thus, testing of the alarming mechanism should be done to verify that is functioning properly.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for self-administering a sound test to verify operation of a speaker and/or alarm within a hazard detection system are described herein. The sound test can verify that the audible sources such as the alarm and speaker operate at the requisite loudness and frequencies. In addition, the sound test can be self-administered in that it does not require the presence of a person to initiate or verify that the audible sources are functioning properly.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

DETAILED DESCRIPTION OF THE DISCLOSURE

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more hazard detection embodiments are described further herein in the context of being used in a residential home, such as a single-family residential home, the scope of the present teachings is not so limited. More generally, hazard detection systems are applicable to a wide variety of enclosures such as, for example, duplexes, townhomes, multi-unit apartment buildings, hotels, retail stores, office buildings, and industrial buildings. Further, it is understood that while the terms user, customer, installer, homeowner, occupant, guest, tenant, landlord, repair person, and the like may be used to refer to the person or persons who are interacting with the hazard detector in the context of one or more scenarios described herein, these references are by no means to be considered as limiting the scope of the present teachings with respect to the person or persons who are performing such actions.

This disclosure relates to automatic self-testing and verification of proper operation of an audible alarming component of a hazard detection system. The hazard detection may include a microphone that can listen to the sound being emitted by the audible alarming component. The use of the microphone can eliminate the need for a human user to be present in order to verify that the alarm component is working. Moreover, the microphone, coupled with processing power of one or more components and/or data provided by other components, can provide intelligent analysis of the performance of the audible alarm. In addition, this combination can be used to control when and how often the self-test is performed, among other features. Additional details on these embodiments are described more fully below.

Figure 1:
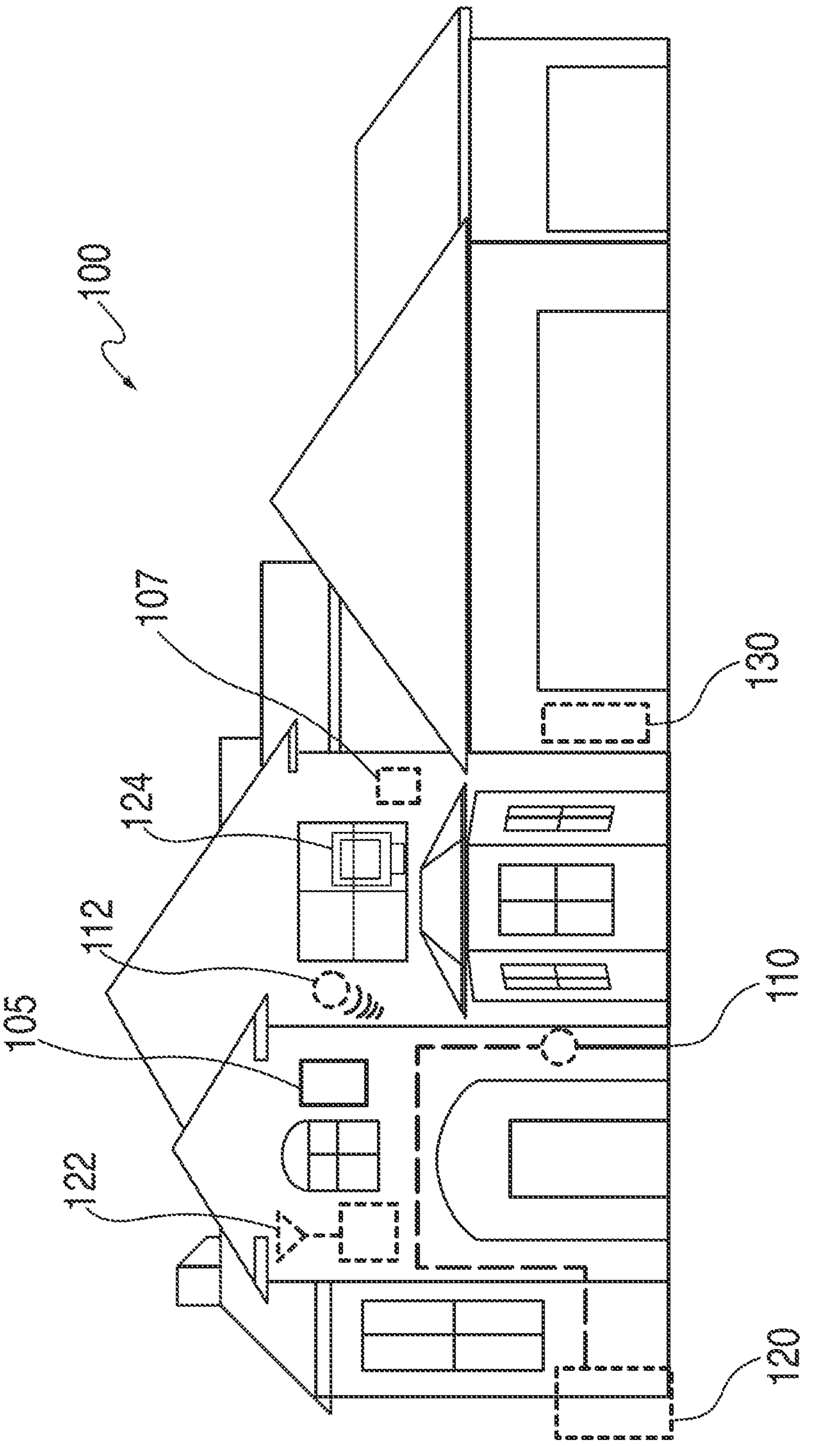
FIG. 1 is a diagram of an enclosure with a hazard detection system, according to some embodiments.

FIG. 1 is a diagram illustrating an exemplary enclosure 100 using hazard detection system 105, remote hazard detection system 107, thermostat 110, remote thermostat 112, heating, cooling, and ventilation (HVAC) system 120, router 122, computer 124, and central panel 130 in accordance with some embodiments. Enclosure 100 can be, for example, a single-family dwelling, a duplex, an apartment within an apartment building, a warehouse, or a commercial structure such as an office or retail store. Hazard detection system 105 can be battery powered, line powered, or line powered with a battery backup. Hazard detection system 105 can include one or more processors, multiple sensors, non-volatile storage, and other circuitry to provide desired safety monitoring and user interface features. Some user interface features may only be available in line powered embodiments due to physical limitations and power constraints. In addition, some features common to both line and battery powered embodiments may be implemented differently. Hazard detection system 105 can include the following components: low power wireless personal area network (6LoWPAN) circuitry, a system processor, a safety processor, non-volatile memory (e.g., Flash), WiFi circuitry, an ambient light sensor (ALS), a smoke sensor, a carbon monoxide (CO) sensor, a temperature sensor, a humidity sensor, a noise sensor, one or more ultrasonic sensors, a passive infra-red (PIR) sensor, a speaker, one or more light emitting diodes (LED's), and an alarm buzzer.

Hazard detection system 105 can monitor environmental conditions associated with enclosure 100 and alarm occupants when an environmental condition exceeds a predetermined threshold. The monitored conditions can include, for example, smoke, heat, humidity, carbon monoxide, radon, methane and other gasses. In addition to monitoring the safety of the environment, hazard detection system 105 can provide several user interface features not found in conventional alarm systems. These user interface features can include, for example, vocal alarms, voice setup instructions, cloud communications (e.g. push monitored data to the cloud, or push notifications to a mobile telephone, or receive software updates from the cloud), device-to-device communications (e.g., communicate with other hazard detection systems in the enclosure), visual safety indicators (e.g., display of a green light indicates it is safe and display of a red light indicates danger), tactile and non-tactile input command processing, and software updates.

Hazard detection system 105 can monitor other conditions that are not necessarily tied to hazards, per se, but can be configured to perform a security role. In the security role, system 105 may monitor occupancy (using a motion detector), ambient light, sound, remote conditions provided by remote sensors (door sensors, window sensors, and/or motion sensors). In some embodiments, system 105 can perform both hazard safety and security roles, and in other embodiments, system 105 may perform one of a hazard safety role and a security role.

Hazard detection system 105 can implement multi-criteria state machines according to various embodiments described herein to provide advanced hazard detection and advanced user interface features such as pre-alarms. In addition, the multi-criteria state machines can manage alarming states and pre-alarming states and can include one or more sensor state machines that can control the alarming states and one or more system state machines that control the pre-alarming states. Each state machine can transition among any one of its states based on sensor data values, hush events, and transition conditions. The transition conditions can define how a state machine transitions from one state to another, and ultimately, how hazard detection system 105 operates. Hazard detection system 105 can use a dual processor arrangement to execute the multi-criteria state machines according to various embodiments. The dual processor arrangement may enable hazard detection system 105 to manage the alarming and pre-alarming states in a manner that uses minimal power while simultaneously providing failsafe hazard detection and alarming functionalities. Additional details of the various embodiments of hazard detection system 105 are discussed below.

Enclosure 100 can include any number of hazard detection systems. For example, as shown, hazard detection system 107 is another hazard detection system, which may be similar to system 105. In one embodiment, both systems 105 and 107 can be battery powered systems. In another embodiment, system 105 may be line powered, and system 107 may be battery powered. Moreover, a hazard detection system can be installed outside of enclosure 100.

Thermostat 110 can be one of several thermostats that may control HVAC system 120. Thermostat 110 can be referred to as the "primary" thermostat because it may be electrically connected to actuate all or part of an HVAC system, by virtue of an electrical connection to HVAC control wires (e.g. W, G, Y, etc.) leading to HVAC system 120. Thermostat 110 can include one or more sensors to gather data from the environment associated with enclosure 100. For example, a sensor may be used to detect occupancy, temperature, light and other environmental conditions within enclosure 100. Remote thermostat 112 can be referred to as an "auxiliary" thermostat because it may not be electrically connected to actuate HVAC system 120, but it too may include one or more sensors to gather data from the environment associated with enclosure 100 and can transmit data to thermostat 110 via a wired or wireless link. For example, thermostat 112 can wirelessly communicate with and cooperates with thermostat 110 for improved control of HVAC system 120. Thermostat 112 can provide additional temperature data indicative of its location within enclosure 100, provide additional occupancy information, or provide another user interface for the user (e.g., to adjust a temperature setpoint).

Hazard detection systems 105 and 107 can communicate with thermostat 110 or thermostat 112 via a wired or wireless link. For example, hazard detection system 105 can wirelessly transmit its monitored data (e.g., temperature and occupancy detection data) to thermostat 110 so that it is provided with additional data to make better informed decisions in controlling HVAC system 120. Moreover, in some embodiments, data may be transmitted from one or more of thermostats 110 and 112 to one or more of hazard detections systems 105 and 107 via a wired or wireless link (e.g., the fabric network).

Central panel 130 can be part of a security system or other master control system of enclosure 100. For example, central panel 130 may be a security system that may monitor windows and doors for break-ins, and monitor data provided by motion sensors. In some embodiments, central panel 130 can also communicate with one or more of thermostats 110 and 112 and hazard detection systems 105 and 107. Central panel 130 may perform these communications via wired link, wireless link (e.g., the fabric network), or a combination thereof. For example, if smoke is detected by hazard detection system 105, central panel 130 can be alerted to the presence of smoke and make the appropriate notification, such as displaying an indicator that a particular zone within enclosure 100 is experiencing a hazard condition.

Enclosure 100 may further include a private network accessible both wirelessly and through wired connections and may also be referred to as a Local Area Network or LAN. Network devices on the private network can include hazard detection systems 105 and 107, thermostats 110 and 112, computer 124, and central panel 130. In one embodiment, the private network is implemented using router 122, which can provide routing, wireless access point functionality, firewall and multiple wired connection ports for connecting to various wired network devices, such as computer 124. Wireless communications between router 122 and networked devices can be performed using an 802.11 protocol. Router 122 can further provide network devices access to a public network, such as the Internet or the Cloud, through a cable-modem, DSL modem and an Internet service provider or provider of other public network services. Public networks like the Internet are sometimes referred to as a Wide-Area Network or WAN.

Access to the Internet, for example, may enable networked devices such as system 105 or thermostat 110 to communicate with a device or server remote to enclosure 100. The remote server or remote device can host an account management program that manages various networked devices contained within enclosure 100. For example, in the context of hazard detection systems according to embodiments discussed herein, system 105 can periodically upload data to the remote server via router 122. In addition, if a hazard event is detected, the remote server or remote device can be notified of the event after system 105 communicates the notice via router 122. Similarly, system 105 can receive data (e.g., commands or software updates) from the account management program via router 122.

Hazard detection system 105 can operate in one of several different power consumption modes. Each mode can be characterized by the features performed by system 105 and the configuration of system 105 to consume different amounts of power. Each power consumption mode corresponds to a quantity of power consumed by hazard detection system 105, and the quantity of power consumed can range from a lowest quantity to a highest quantity. One of the power consumption modes corresponds to the lowest quantity of power consumption, and another power consumption mode corresponds to the highest quantity of power consumption, and all other power consumption modes fall somewhere between the lowest and the highest quantities of power consumption. Examples of power consumption modes can include an Idle mode, a Log Update mode, a Software Update mode, an Alarm mode, a Pre-Alarm mode, a Hush mode, and a Night Light mode. These power consumption modes are merely illustrative and are not meant to be limiting. Additional or fewer power consumption modes may exist. Moreover, any definitional characterization of the different modes described herein is not meant to be all inclusive, but rather, is meant to provide a general context of each mode.

Although one or more states of the sensor state machines and system state machines may be implemented in one or more of the power consumption modes, the power consumption modes and states may be different. For example, the power consumption mode nomenclature is used in connection with various power budgeting systems and methods that are explained in more detail in U.S. Provisional Application Nos. 61/847,905 and 61/847,916.

Figure 2:
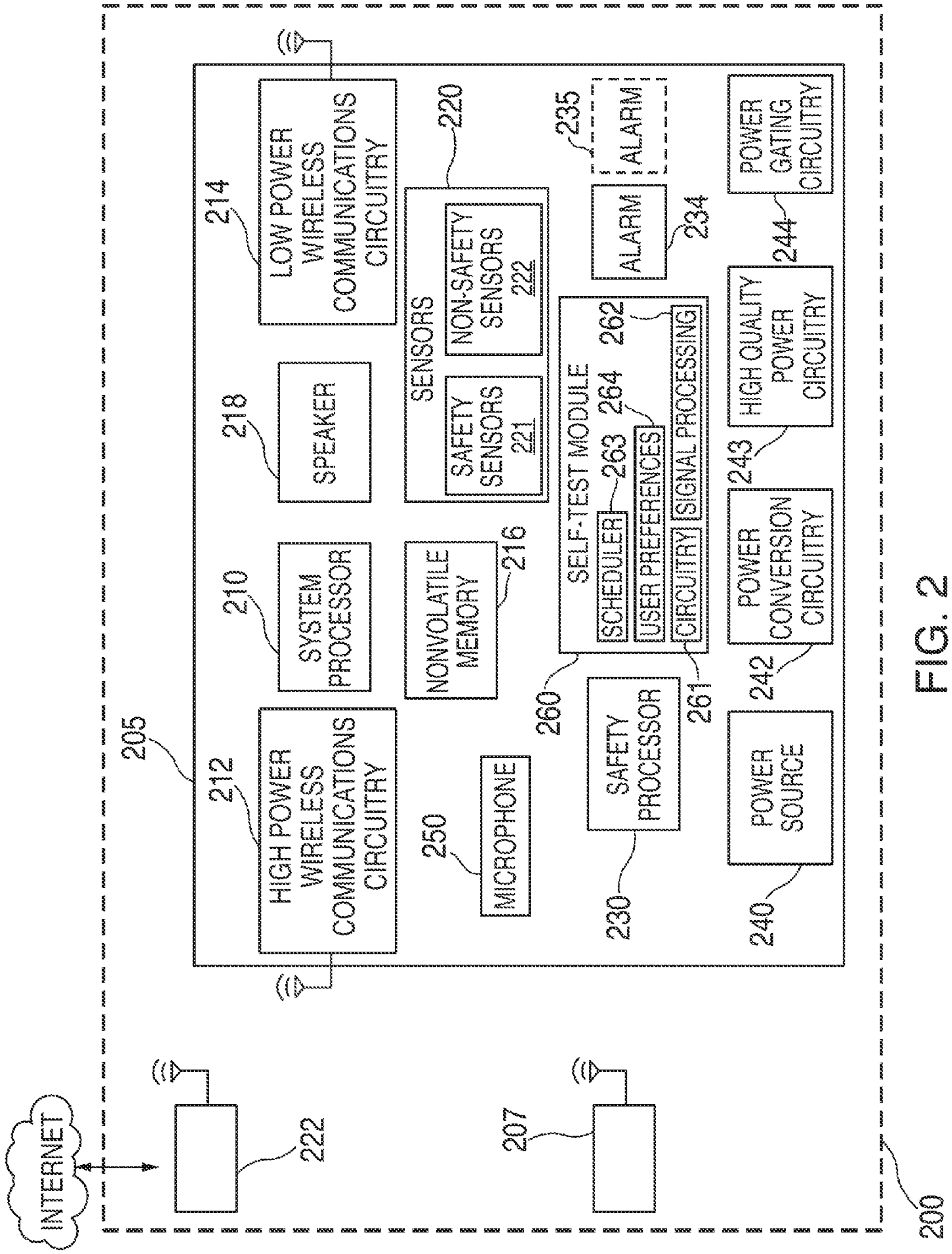
FIG. 2 shows an illustrative block diagram of a hazard detection system being used in an illustrative enclosure, according to some embodiments.

FIG. 2 shows an illustrative block diagram of hazard detection system 205 being used in an illustrative enclosure 200 in accordance with some embodiments. FIG. 2 also shows optional hazard detection system 207 and router 222. Hazard detection systems 205 and 207 can be similar to hazard detection systems 105 and 107 in FIG. 1, enclosure 200 can be similar to enclosure 100 in FIG. 1, and router 222 can be similar to router 122 in FIG. 1. Hazard detection system 205 can include several components, including system processor 210, high-power wireless communications circuitry 212 and antenna, low-power wireless communications circuitry 214 and antenna, non-volatile memory 216, speaker 218, sensors 220, which can include one or more safety sensors 221 and one or more non-safety sensors 222, safety processor 230, alarm 234, power source 240, power conversion circuitry 242, high quality power circuitry 243, power gating circuitry 244 microphone 250, self-check module 260, which can include circuitry 261, signal processing 262, scheduler 263, and user preferences 264. Hazard detection system 205 may be operative to provide failsafe safety detection features and user interface features using circuit topology and power budgeting methods that may minimize power consumption.

Hazard detection system 205 can use a bifurcated processor circuit topology for handling the features of system 205. Both system processor 210 and safety processor 230 can exist on the same circuit board within system 205, but perform different tasks. System processor 210 is a larger more capable processor that can consume more power than safety processor 230. System processor 210 can be operative to process user interface features. For example, processor 210 can direct wireless data traffic on both high and low power wireless communications circuitries 212 and 214, access non-volatile memory 216, communicate with processor 230, and cause audio to be emitted from speaker 218. As another example, processor 210 can monitor data acquired by one or more sensors 220 to determine whether any actions need to be taken (e.g., shut off a blaring alarm in response to a user detected action to hush the alarm).

Safety processor 230 can be operative to handle safety related tasks of system 205. Safety processor 230 can poll one or more of sensors 220 and activate alarm 234 when one or more of sensors 220 indicate a hazard event is detected. Processor 230 can operate independently of processor 210 and can activate alarm 234 regardless of what state processor 210 is in. For example, if processor 210 is performing an active function (e.g., performing a WiFi update) or is shut down due to power constraints, processor 230 can activate alarm 234 when a hazard event is detected. In some embodiments, the software running on processor 230 may be permanently fixed and may never be updated via a software or firmware update after system 205 leaves the factory. In other embodiments, processor 230 may be updated when system 205 is in the field.

Compared to processor 210, processor 230 is a less power consuming processor. Thus by using processor 230 in lieu of processor 210 to monitor a subset of sensors 220 yields a power savings. If processor 210 were to constantly monitor sensors 220, the power savings may not be realized. In addition to the power savings realized by using processor 230 for monitoring the subset of sensors 220, bifurcating the processors also ensures that the safety monitoring and core alarming features of system 205 will operate regardless of whether processor 210 is functioning. By way of example and not by way of limitation, system processor 210 can include a relatively high-powered processor such as Freescale Semiconductor K60 Microcontroller, while safety processor 230 may comprise a relatively low-powered processor such as a Freescale Semiconductor KL16 Microcontroller. Overall operation of hazard detection system 205 entails a judiciously architected cooperation of system processor 210 and safety processor 230, with system processor 210 performing selected higher-level, advanced functions that may not have been conventionally associated with hazard detection units (for example: more advanced user interface and communications functions; various computationally-intensive algorithms to sense patterns in user behavior or patterns in ambient conditions; algorithms for governing, for example, the brightness of an LED night light as a function of ambient brightness levels; algorithms for governing, for example, the sound level of an onboard speaker for home intercom functionality; algorithms for governing, for example, the issuance of voice commands to users; algorithms for uploading logged data to a central server; algorithms for establishing network membership; and so forth), and with safety processor 230 performing the more basic functions that may have been more conventionally associated with hazard detection units (e.g., smoke and CO monitoring, actuation of shrieking/buzzer alarms upon alarm detection). By way of example and not by way of limitation, system processor 210 may consume on the order of 18 mW when it is in a relatively high-power active state and performing one or more of its assigned advanced functionalities, whereas safety processor 230 may only consume on the order of 0.05 mW when it is performing its basic monitoring functionalities. However, again by way of example and not by way of limitation, system processor 210 may consume only on the order of 0.005 mW when in a relatively low-power inactive state, and the advanced functions that it performs are judiciously selected and timed such the system processor is in the relatively high power active state only about 0.05% of the time, and spends the rest of the time in the relatively low-power inactive state. Safety processor 230, while only requiring an average power draw of 0.05 mW when it is performing its basic monitoring functionalities, should of course be performing its basic monitoring functionalities 100% of the time. According to one or more embodiments, the judiciously architected functional overlay of system processor 210 and safety processor 230 is designed such that hazard detection system 205 can perform basic monitoring and shriek/buzzer alarming for hazard conditions even in the event that system processor 210 is inactivated or incapacitated, by virtue of the ongoing operation of safety processor 230. Therefore, while system processor 210 is configured and programmed to provide many different capabilities for making hazard detection unit 205 an appealing, desirable, updatable, easy-to-use, intelligent, network-connected sensing and communications node for enhancing the smart-home environment, its functionalities are advantageously provided in the sense of an overlay or adjunct to the core safety operations governed by safety processor 230, such that even in the event there are operational issues or problems with system processor 210 and its advanced functionalities, the underlying safety-related purpose and functionality of hazard detector 205 by virtue of the operation of safety processor 230 will continue on, with or without system processor 210 and its advanced functionalities.

High power wireless communications circuitry 212 can be, for example, a Wi-Fi module capable of communicating according to any of the 802.11 protocols. For example, circuitry 212 may be implemented using WiFi part number BCM43362, available from Murata. Depending on an operating mode of system 205, circuitry 212 can operate in a low power "sleep" state or a high power "active" state. For example, when system 205 is in an Idle mode, circuitry 212 can be in the "sleep" state. When system 205 is in a non-Idle mode such as a Wi-Fi update mode, software update mode, or alarm mode, circuitry 212 can be in an "active" state. For example, when system 205 is in an active alarm mode, high power circuitry 212 may communicate with router 222 so that a message can be sent to a remote server or device.

Low power wireless communications circuitry 214 can be a low power Wireless Personal Area Network (6LoWPAN) module or a ZigBee module capable of communicating according to a 802.15.4 protocol. In some embodiments, low power wireless communications circuitry 214 may serve as a node in a fabric network of devices. In another embodiment, circuitry 214 can be part number EM357 SoC available from Silicon Laboratories. In some embodiments, circuitry 214 can include Bluetooth Low Energy circuitry. Depending on the operating mode of system 205, circuitry 214 can operate in a relatively low power "sleep" state or a relatively high power "awake" state. When system 205 is in the Idle mode, WiFi update mode, or software update mode, circuitry 214 can be in the "sleep" state. Circuitry 214 may transition from the sleep state to the awake state in response to receipt of a wake packet (transmitted by another device) or in response to a state change in one of the state machines running on system 205. When system 205 is in the Alarm mode, circuitry 214 can transmit fabric messages so that the low power wireless communications circuitry in system 207 can receive data indicating that system 205 is alarming. Thus, even though it is possible for high power wireless communications circuitry 212 to be used for listening for alarm events, it can be more power efficient to use low power circuitry 214 for this purpose. Power savings may be further realized when several hazard detection systems or other systems having low power circuitry 214 form an interconnected wireless fabric network.

Power savings may also be realized because in order for low power circuitry 214 to continually listen for data transmitted from other low power circuitry, circuitry 214 may constantly be operating in its "sleep" state. This state consumes power, and although it may consume more power than high power circuitry 212 operating in its sleep state, the power saved versus having to periodically activate high power circuitry 214 can be substantial. When high power circuitry 212 is in its active state and low power circuitry 214 is in its awake state, high power circuitry 212 can consume substantially more power than low power circuitry 214.

In some embodiments, low power wireless communications circuitry 214 can be characterized by its relatively low power consumption and its ability to wirelessly communicate according to a first protocol characterized by relatively low data rates, and high power wireless communications circuitry 212 can be characterized by its relatively high power consumption and its ability to wirelessly communicate according to a second protocol characterized by relatively high data rates.

In some embodiments, low power wireless communications circuitry 214 may be a mesh network compatible module that does not require a distinguished access point in order to communicate to devices in a network. Mesh network compatibility can include provisions that enable mesh network compatible modules to keep track of other nearby mesh network compatible modules so that data can be passed through neighboring modules. Mesh network compatibility is essentially the hallmark of the 802.15.4 protocol. In contrast, high power wireless communications circuitry 212 is not a mesh network compatible module and requires an access point in order to communicate to devices in a network. Thus, if a first device having circuitry 212 wants to communicate data to another device having circuitry 212, the first device has to communicate with the access point, which then transmits the data to the second device. There is no device-to-device communication per se using circuitry 212.

Non-volatile memory 216 can be any suitable permanent memory storage such as, for example, NAND Flash, a hard disk drive, NOR, ROM, or phase change memory. In one embodiment, non-volatile memory 216 can store audio clips that can be played back by speaker 218. The audio clips can include installation instructions or warnings in one or more languages. Speaker 218 can be any suitable speaker operable to playback sounds or audio files. Speaker 218 can include an amplifier (not shown).

Sensors 220 can be monitored by system processor 210 and safety processor 230, and can include safety sensors 221 and non-safety sensors 222. One or more of sensors 220 may be exclusively monitored by one of system processor 210 and safety processor 230. As defined herein, monitoring a sensor refers to a processor's ability to acquire data from that monitored sensor. That is, one particular processor may be responsible for acquiring sensor data, and possibly storing it in a sensor log, but once the data is acquired, it can be made available to another processor either in the form of logged data or real-time data. For example, in one embodiment, system processor 210 may monitor one of non-safety sensors 222, but safety processor 230 cannot monitor that same non-safety sensor. In another embodiment, safety processor 230 may monitor each of the safety sensors 221, but may provide the acquired sensor data to system processor 210.

Safety sensors 221 can include sensors necessary for ensuring that hazard detection system 205 can monitor its environment for hazardous conditions and alert users when hazardous conditions are detected, and all other sensors not necessary for detecting a hazardous condition are non-safety sensors 222. In some embodiments, safety sensors 221 include only those sensors necessary for detecting a hazardous condition. For example, if the hazardous condition includes smoke and fire, then the safety sensors might only include a smoke sensor, at least one temperature sensor and a relative humidity sensor. Other sensors, such as non-safety sensors, could be included as part of system 205, but might not be needed to detect smoke or fire. As another example, if the hazardous condition includes carbon monoxide, then the safety sensor might be a carbon monoxide sensor, and no other sensor might be needed to perform this task.

Thus, sensors deemed necessary can vary based on the functionality and features of hazard detection system 205. In one embodiment, hazard detection system 205 can be a combination smoke, fire, and carbon monoxide alarm system. In such an embodiment, detection system 205 can include the following necessary safety sensors 221: a smoke detector, a carbon monoxide (CO) sensor, and one or more temperature sensors. Smoke detectors typically use optical detection, ionization, or air sampling techniques to trigger the smoke condition. Optical scattering and obscuration detection techniques may use infrared light emitting diodes (LEDs) and photodiodes. When smoke and/or other matter (e.g., water vapor) enters a smoke chamber, the light emitted by the LED(s) is scattered, which enables the photodiodes to detect the light. If no smoke or other matter (e.g., water vapor) is in the smoke chamber, then the photodiodes are not be able to detect the light being emitted by the LED(s). In some embodiments, multiple LEDs may be incorporated in the smoke sensor. Each LED may emit light energy at different wavelengths. Ionization techniques may use a radioactive material such as Americium-241 to ionize the air, which creates a measurable current between detector two plates. When smoke particles enter the chamber, they bind to the ions. The reaction produces a measurable drop in the conducted current between detector plates; the resulting drop indicates smoke detection. In some geographic locations (e.g., Europe) traditional Americium-241 ionization smoke detectors are banned by regulatory agencies in part because of the necessity to dispose of a radioactive material at the end of the smoke detector's life. A smoke detector can also use a non-radioactive ionization technique to detect the presence of smoke and/or other particulate matter. A non-radioactive ionizing detector may use a LED such as an ultraviolet emitting LED with a photocatalyst coating. The photocatalyst generates ions when light (e.g., UV light) passes through it. When these ions are displaced or neutralized by smoke and/or other matter, the detector detects a change in current between two plates and registers a smoke event.

A CO sensor can detect the presence of carbon monoxide gas, which, in the home, is typically generated by open flames, space heaters, water heaters, blocked chimneys, and automobiles. The material used in electrochemical CO sensors typically has a 5-7 year lifespan. Thus, after a 5-7 year period has expired, the CO sensor should be replaced. A heat sensor can be a thermistor, which is a type of resistor whose resistance varies based on temperature. Thermistors can include negative temperature coefficient (NTC) type thermistors or positive temperature coefficient (PTC) type thermistors. A relative humidity sensor may be used to distinguish between obscuration caused by smoke and steam or fog. Furthermore, in this embodiment, detection system 205 can include the following non-safety sensors 222: a humidity sensor, an ambient light sensor, a push-button sensor, a passive infra-red (PIR) sensor, one or more ultrasonic sensor, an accelerometer, and a camera. A temperature and humidity sensor can provide relatively accurate readings of temperature and relative humidity for the purposes of environmental monitoring and HVAC control. An ambient light sensor (ALS) can detect ambient light and the push-button sensor can be a switch, for example, that detects a user's press of the switch. A PIR sensor can be used for various motion detection features. A camera can also detect motion. An accelerometer may detect motion and vibrations. Ultrasonic sensors can be used to detect the presence of an object. Such sensors can generate high frequency sound waves and determine which wave(s) are received back by the sensor. Sensors 220 can be mounted to a printed circuit board (e.g., the same board that processors 210 and 230 may be mounted to), a flexible printed circuit board, a housing of system 205, or a combination thereof.

In some embodiments, data acquired from one or more non-safety sensors 222 can be acquired by the same processor used to acquire data from one or more safety sensors 221. For example, safety processor 230 may be operative to monitor both safety and non-safety sensors 221 and 222 for power savings reasons, as discussed above. Although safety processor 230 may not need any of the data acquired from non-safety sensor 222 to perform its hazard monitoring and alerting functions, the non-safety sensor data can be utilized to provide enhanced hazard system 205 functionality. In some embodiments, non-safety sensors 222 can include microphone 250, ultrasonic sensors (not shown), accelerometer (not shown), external motion detector (not shown), and camera (not shown). Each of these sensors may provide their signals to sound check module 260.

Alarm 234 can be any suitable alarm that audibly alerts users in the vicinity of system 205 of the presence of a hazard condition. Alarm 234 can also be activated during self-testing scenarios according to various embodiments discussed here. Alarm 234 can be a piezo-electric buzzer, for example, that emits an audible alarm at a fixed frequency or within a range of frequencies. An exemplary fixed frequency can include 3 kHz or 520 Hz. In some embodiments, alarm 234 can emit alarm sounds at two different frequencies at intermittent intervals.

System 205 can optionally include alarm 235, which may be another alarm that audibly produces a sound to alert the presence of a hazard condition. Alarm 235 may also be activated during self-testing. Alarm 235 may be also be a piezo-electric buzzer. Alarm 235 may emit a sound a fixed frequency different than that emitted by alarm 234. For example, alarm 234 may emit sound at a first frequency (e.g., 3 kHz) and alarm 235 may emit sound at a second frequency (e.g., 520 Hz). During an alarming event, for example, alarms 234 and 235 may take turns sounding their respective alarms. For example, alarm 234 may sound for a first interval, during which time, it may sound continuously or intermittently, and after the first interval ends, alarm 235 may sound for a second interval. During the second interval, alarm 235 may sound continuously or intermittently. If desired, additional alarms may be included in system 205. In some embodiments, system 205 may only include an alarm that sounds at frequency of 520 Hz.

Power source 240 can supply power to enable operation of system 205 and can include any suitable source of energy. Embodiments discussed herein can include AC line powered, battery powered, a combination of AC line powered with a battery backup, and externally supplied DC power (e.g., USB supplied power). Embodiments that use AC line power, AC line power with battery backup, or externally supplied DC power may be subject to different power conservation constraints than battery only embodiments. Battery powered embodiments are designed to manage power consumption of its finite energy supply such that hazard detection system 205 operates for a minimum period of time. In some embodiments, the minimum period of time can be one (1) year, three (3) years, or seven (7) years. In other embodiments, the minimum period of time can be at least seven (7) years, eight (8) years, nine (9) years, or ten (10) years. Line powered embodiments are not as constrained because their energy supply is virtually unlimited. Line powered with battery backup embodiments may employ power conservation methods to prolong the life of the backup battery.

In battery only embodiments, power source 240 includes one or more batteries or a battery pack. The batteries can be constructed from different compositions (e.g., alkaline or lithium iron disulfide) and different end-user configurations (e.g., permanent, user replaceable, or non-user replaceable) can be used. In one embodiment, six cells of Li—$FeS_2$ can be arranged in two stacks of three. Such an arrangement can yield about 27000 mWh of total available power for system 205.

Power conversion circuitry 242 includes circuitry that converts power from one level to another. Multiple instances of power conversion circuitry 242 may be used to provide the different power levels needed for the components within system 205. One or more instances of power conversion circuitry 242 can be operative to convert a signal supplied by power source 240 to a different signal. Such instances of power conversion circuitry 242 can exist in the form of buck converters or boost converters. For example, alarm 234 may require a higher operating voltage than high power wireless communications circuitry 212, which may require a higher operating voltage than processor 210, such that all required voltages are different than the voltage supplied by power source 240. Thus, as can be appreciated in this example, at least three different instances of power conversion circuitry 242 are required.

High quality power circuitry 243 is operative to condition a signal supplied from a particular instance of power conversion circuitry 242 (e.g., a buck converter) to another signal. High quality power circuitry 243 may exist in the form of a low-dropout regulator. The low-dropout regulator may be able to provide a higher quality signal than that provided by power conversion circuitry 242. Thus, certain components may be provided with "higher" quality power than other components. For example, certain safety sensors 221 such as smoke detectors and CO sensors require a more stable voltage in order to operate properly than digital circuitry within the system processor 210. As will be explained in more detail below, power circuitry may be customized to provide specific power signals for each LED being used in the smoke sensor.

Power gating circuitry 244 can be used to selectively couple and de-couple components from a power bus. De-coupling a component from a power bus insures that the component does not incur any quiescent current loss, and therefore can extend battery life beyond that which it would be if the component were not so de-coupled from the power bus. Power gating circuitry 244 can be a switch such as, for example, a MOSFET transistor. Even though a component is de-coupled from a power bus and does not incur any current loss, power gating circuitry 244 itself may consume a small amount of power. This power consumption, however, is less than the quiescent power loss of the component.

Microphone 250 may be a separate and independent component specifically designed to receive acoustic energy (e.g., sound) and translate it into an electrical signal. Microphone 250 may be located adjacent to an external surface of system 205 or located wholly within the interior of system 205. Microphone 250 may be MEMS microphone, for example.

As an alternative to including microphone 250 in system 205, speaker 218 may be used as a microphone when it is not being used to delivery messages. Using speaker 218 as a microphone repurposes an already existing component without incurring additional cost for a separate microphone such as microphone 250. Thus, during a self-test operation, the acoustic energy emitted by alarm 234 or 235 may be received and processed by speaker 218. As yet another alternative, if both alarms 234 and 235 are present in system 205, one of the alarms may function as a microphone while the other alarm functions as an alarm. Thus, when the first alarm is alarming, the second alarm may "listen" for sound being emitted by the first alarm, and vice versa.

Ultrasonic sensor 259 may also be used to verify the operation of alarm 234 and/or alarm 235. Although ultrasonic sensor 259 is tuned at about 40 kHz, it can pick up higher harmonics of a base frequency of alarm 234, thereby validating its operation. Because alarm 234 is extremely loud, it tends to generate a strong acoustic and electromagnetic signal within other sensors. In one implementation, alarm 234 sounds at 85 dB @ 3 m, at a frequency of 3 kHz. Even though ultrasonic sensor 259 may be tuned to emit and detect signals at 40 kHz-well above normal human hearing, it may detect the 11th and 12th harmonics (33 kHz and 36 kHz) of the loud sound being transmitted by alarm 234. These harmonics are both within the detection range of ultrasonic sensor 259. Alarm 234 may have a complex (harmonic-full) waveform, and thus the 11th and 12th and further harmonics are also quite loud. No additional circuitry is required for ultrasonic sensor 259 to clearly indicate that alarm 234 is sounding. It should be understood that all information gathered from alarm 234 is invalid for any use originally intended for sensor 259, but only during the period during which alarm 234 is sounding. In addition, in this invention alarm 234 is providing electromagnetic interference to the operation of sensor 259.

An accelerometer (not shown) may be a MEMS device capable of detecting motion. Accelerometer 254 may be used for several different purposes including automated self-test of alarm 234 and/or alarm 235. For example, accelerometer 254 may be used to determine an orientation in which system is mounted to a fixed surface (e.g., a wall or ceiling). It may be used to determine whether system 205 is being moved for theft detection. Additionally, accelerometer 254 may be used to detect vibration caused by an active alarm. That is, when alarm 234 is emitting its alarm signal, the vibration induced in the system in response thereto may be detected by the accelerometer. If the vibration signal sufficiently matches an expected data profile or exceeds a threshold, system 205 may determine that alarm 234 is operating according to desired specifications.

An external motion detector 256 (not shown) may be a device capable of detecting motion external to system 205. For example, detector 256 may be a passive infrared motion detector. A camera (not shown) may be another device capable of detecting motion or presence of occupants within a structure. Motion data may be used with the automatic self-test system to determine the best time to perform a self-test. Since the alarm 234 is loud, it may be desirable to perform the self-test when the occupants are not present in order to avoid disturbing the occupants.

System 205 can include a variety of sound verification sources. A sound verification source is a device or component that can detect audio signals being emitted by the alarm and/or buzzer. The sound verification sources can include a microphone, alarm, speaker, ultrasonic sensor, accelerometer, or capacitive sensor. These sound verification sources may feed their signals to sound check module 260 for analysis. In some embodiments, the sound verification source can be located remote to system 205. For example, a microphone in a phone can be used to detect audio signals being emitted by system 205.

Self-test module 260 may control self-tests to verify operation of one or more components of system 200. For example, the self-test may verify operation of the sensors 220, power source 240, alarm 234, and microphone 250. One of the test may be a sound test to verify that the alarms 234 and 235 and speaker 218 are operating at a minimum specified loudness and frequency. Self-test module 260 may include circuitry 261 and signal processing 262 for processing signals received from a sound verification source. In some embodiments, circuitry 261 may include digital filters and signal processing 262 may include code that interprets signals provided by the circuitry 261. In some embodiments, circuitry 261 and signal processing 262 may embody a spectral analyzer that analyzes audio signals to determine whether the alarm and/or speaker is emitting a signal at a desired frequency. Self-test module 260 may perform a myriad of analyses on the received audio signal. These analyses may determine amplitude, frequency, and duration of the audio signal being emitted by the alarm. These analyses may be cataloged over time to determine if there is any deterioration in performance.

It is understood that although hazard detection system 205 is described as having two separate processors, system processor 210 and safety processor 230, which may provide certain advantages as described hereinabove and hereinbelow, including advantages with regard to power consumption as well as with regard to survivability of core safety monitoring and alarming in the event of advanced feature provision issues, it is not outside the scope of the present teachings for one or more of the various embodiments discussed herein to be executed by one processor or by more than two processors.

Figure 3:
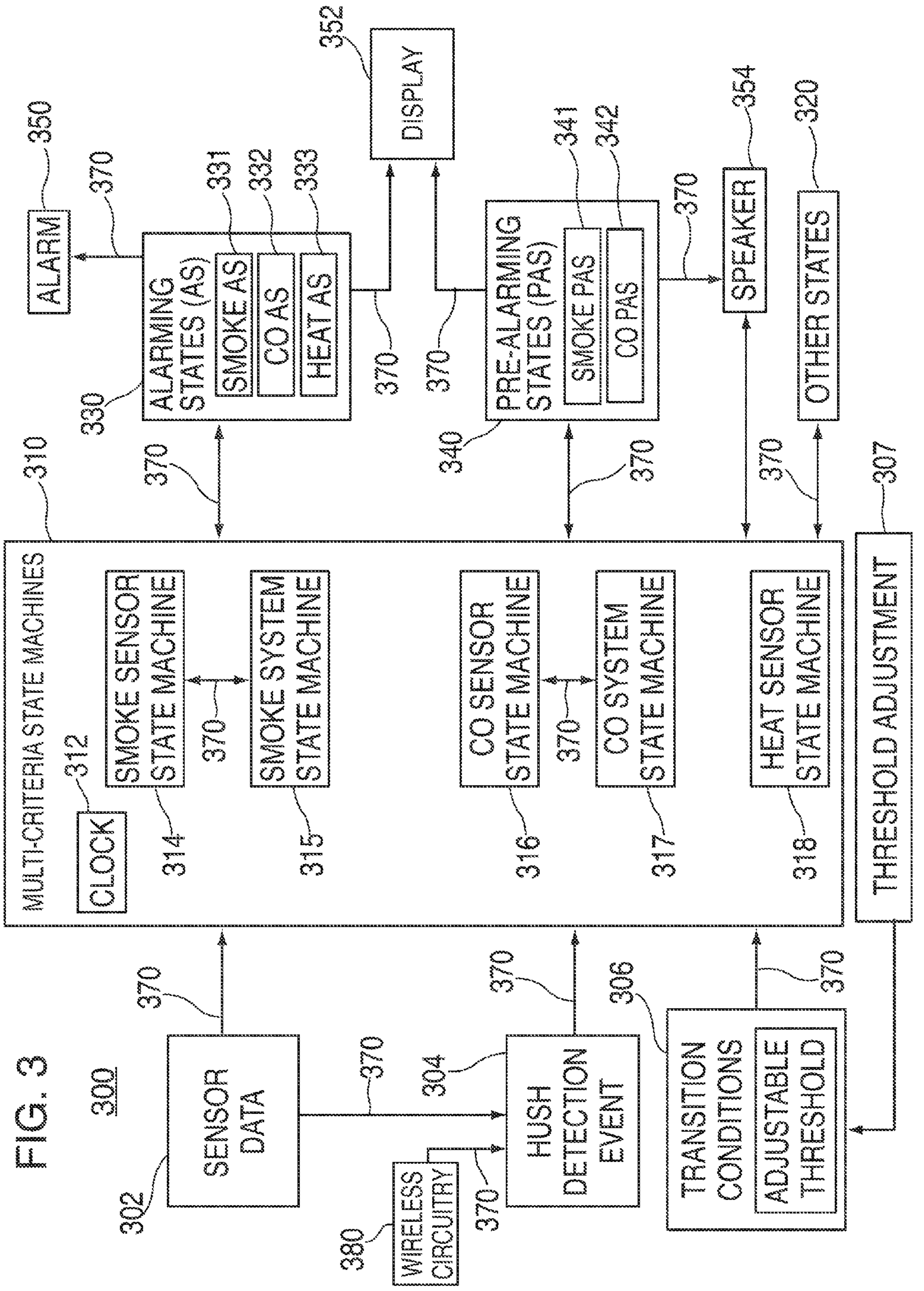
FIG. 3 shows an illustrative block diagram showing various components of a hazard detection system working together to provide multi-criteria alarming and pre-alarming functionality, according to some embodiments.

FIG. 3 shows an illustrative block diagram showing various components of hazard detection system 300 working together to provide multi-criteria alarming and pre-alarming functionalities according to various embodiments. As shown, system 300 can include sensor data 302, hush detection events 304, transition conditions 306, threshold adjustment parameter 307, multi-criteria state machines 310, clock 312, other states 320, alarming states 330, pre-alarming states 340, alarm 350, display 352, speaker 354, and wireless circuitry 380. Also shown are several communication links 370, each of which may have unidirectional or bidirectional data and/or signal communications capabilities. Multi-criteria state machines 310 can control alarming states 330, pre-alarming states 340, and all other state machine states 320 based on sensor data 302, hush detection events 304, transition conditions 306, clock 312, and other criteria, and alarming and pre-alarming states 330 and 340 can control the output of alarm 350, display 352, and speaker 354. Alarming states 330 can include multiple alarming states (e.g., one for each hazard, such as smoke alarming state 331, CO alarming state 332, and heat alarming state 333) and pre-alarming states 340 can include multiple pre-alarming states (e.g., one or more for each hazard, such as smoke pre-alarming state 341 and CO pre-alarming state 342. Other states can include, for example, idling states, monitoring states, alarm hushing states, pre-alarm hushing states, post-alarm states, holding states, and alarm monitoring states.

Alarming states 330 can control activation and deactivation of alarm 350 and display 352 in response to determinations made by multi-criteria state machines 310. Alarm 350 can provide audible cues (e.g., in the form of buzzer beeps) that a dangerous condition is present. Display 352 can provide a visual cue (e.g., such as flashing light or change in color) that a dangerous condition is present. If desired, alarming states 330 can control playback of messages over speaker 354 in conjunction with the audible and/or visual cues. For example, combined usage of alarm 350 and speaker 354 can repeat the following sequence: "BEEP, BEEP, BEEP—Smoke Detected In Bedroom—BEEP BEEP BEEP," where the "BEEPS" emanate from alarm 350 and "smoke detected in bedroom" emanates from speaker 354. As another example, usage of alarm 350 and speaker 354 can repeat the following sequence: "BEEP, BEEP, BEEP—Wave to Hush Alarm—BEEP BEEP BEEP," in which speaker 354 is used to provide alarming hush instructions. Any one of the alarming states 330 (e.g., smoke alarm state 331, CO alarm state 332, and heat alarm state 333) can independently control alarm 350 and/or display 352 and/or speaker 354. In some embodiments, alarming states 330 can cause alarm 350 or display 352 or speaker 354 to emit different cues based on which specific alarm state is active. For example, if a smoke alarm state is active, alarm 350 may emit a sound having a first characteristic, but if a CO alarm state is active, alarm 350 may emit a sound having a second characteristic. In other embodiments, alarming states 330 can cause alarm 350 and display 352 and speaker 354 to emit the same cue regardless of which specific alarm state is active.

Pre-alarming states 340 can control activation and deactivation of speaker 354 and display 352 in response to determinations made by multi-criteria state machines 310. Pre-alarming can serve as a warning that a dangerous condition may be imminent. Speaker 354 may be utilized to playback voice warnings that a dangerous condition may be imminent. Different pre-alarm messages may be played back over speaker 354 for each type of detected pre-alarm event. For example, if a smoke pre-alarm state is active, a smoke related message may be played back over speaker 354. If a CO pre-alarm state is active, a CO related message may be played back. Furthermore, different messages may be played back for each one of the multiple pre-alarms associated with each hazard (e.g., smoke and CO). For example, the smoke hazard may have two associated pre-alarms, one associated with a first smoke pre-alarming state (e.g., suggesting that an alarming state may be moderately imminent) and another one associated with a second smoke pre-alarming state (e.g., suggesting that an alarming state may be highly imminent). Pre-alarm messages may also include voice instructions on how to hush pre-alarm messages. Display 352 may also be utilized in a similar fashion to provide visual cues of an imminent alarming state. In some embodiments, the pre-alarm messages can specify the location of the pre-alarming conditions. For example, if hazard system 300 knows it is located in the bedroom, it can incorporate the location in the pre-alarm message: "Smoke Detected In Bedroom."

Hazard detection system 300 can enforce alarm and pre-alarm priorities depending on which conditions are present. For example, if elevated smoke and CO conditions exist at the same time, the smoke alarm state and/or pre-alarm smoke state may take precedence over the CO alarm state and/or CO pre-alarm state. If a user silences the smoke alarm or smoke pre-alarm, and the CO alarm state or CO pre-alarm state is still active, system 300 may provide an indication (e.g., a voice notification) that a CO alarm or pre-alarm has also been silenced. If a smoke condition ends and the CO alarm or pre-alarm is event is still active, the CO alarm or pre-alarm may be presented to the user.

Multi-criteria state machines 310 can transition to an idling state when it determines that relatively little or no dangerous conditions exist. The idling state can enforce a relatively low level of hazard detection system activity. For example, in the idle state, the data sampling rates of one or more sensors may be set at relatively slow intervals. Multi-criteria state machines 310 can transition to a monitoring state when it determines that sensor data values have raised to a level that warrants closer scrutiny, but not to a level which transitions to a pre-alarming or alarming state. The monitoring state can imply a relatively high level of hazard detection system activity. For example, in the monitoring state, the data sampling rates of one or more sensors may be much greater than in the idle state. In addition, the data sampling rates of one or more sensors may be set at relatively fast intervals for alarming states 330, pre-alarming states 340, or both.

Alarm hushing and pre-alarm hushing states may refer to a user-instructed deactivation of an alarm or a pre-alarm for a predetermined amount of time. For example, in one embodiment, a user can press a button (not shown) to silence an alarm or pre-alarm. In another embodiment, a user can perform a hush gesture in the presence of the hazard detection system. A hush gesture can be a user initiated action in which he or she performs a gesture (e.g., a wave motion) in the vicinity of system 300 with the intent to turn off or silence a blaring alarm. One or more ultrasonic sensors, a PIR sensor, or a combination thereof can be used to detect this gesture. In another approach, wireless circuitry 370 may receive instructions to hush the alarm. For example, a user may use his or her phone to transmit a hush command via a wireless protocol (e.g., Bluetooth low energy) to system 300, whereupon wireless circuitry 380 may forward that command to trigger a hush detection event 304.

Post-alarming states may refer to states that multi-criteria state machines 310 can transition to after having been in one of alarming states 330 or one of pre-alarming states 340. In one post-alarming state, hazard detection system 300 can provide an "all clear" message to indicate that the alarm or pre-alarm condition is no longer present. This can be especially useful, for example, for CO because humans cannot detect CO. Another post-alarming state can be a holding state, which can serve as a system debounce state. This state can prevent hazard detection system 300 from immediately transitioning back to a pre-alarming state 340 after having just transitioned from an alarming state 330.

Multi-criteria state machines 310 can include several different state machines: sensor state machines and system state machines. Each state machine can be associated with a particular hazard such as, for example, a smoke hazard, a carbon monoxide hazard, or a heat hazard, and the multi-criteria state machines may leverage data acquired by one or more sensors in managing detection of a hazard. In some embodiments, a sensor state machine can be implemented for each hazard. In other embodiments, a system state machine may be implemented for each hazard or a subset of hazards. The sensor state machines can be responsible for controlling relatively basic hazard detection system functions and the system state machines can be responsible for controlling relatively advanced hazard detection system functions. In managing detection of a hazard, each sensor state machine and each system state machine can transition among any one of its states based on sensor data 302, hush events 304, and transition conditions 306. A hush event can be a user initiated command to hush, for example, a sounding alarm or pre-alarm voice instruction.

Transition conditions 306 can include a myriad of different conditions that may define how a state machine transitions from one state to another. Each state machine can have its own set of transition conditions. The conditions can define thresholds that may be compared against any one or more of the following inputs: sensor data values, time clocks, and user interaction events (e.g., hush events). State change transitions can be governed by relatively simple conditions (e.g., single-criteria conditions), or relatively complex conditions (e.g., multi-criteria conditions). Single-criteria conditions may compare one input to one threshold. For example, a simple condition can be a comparison between a sensor data value and a threshold. If the sensor data value equals or exceeds the threshold, the state change transition may be executed. In contrast, a multi-criteria condition can be a comparison of one or more inputs to one or more thresholds. For example, a multi-criteria condition can be a comparison between a first sensor value and a first threshold and a comparison between a second sensor value and a second threshold. In some embodiments, both comparisons would need to be satisfied in order to effect a state change transition. In other embodiments, only one of the comparisons would need to be satisfied in order to effect a state change transition. As another example, a multi-criteria condition can be a comparison between a time clock and a time threshold and a comparison between a sensor value and a threshold.

In some embodiments, the threshold for a particular transition condition can be adjusted. Such thresholds are referred to herein as adjustable thresholds (e.g., shown as part of transition conditions 306). The adjustable threshold can be changed in response to threshold adjustment parameter 307, which may be provided, for example, by an alarm threshold setting module according to an embodiment. Adjustable thresholds can be selected from one of at least two different selectable thresholds, and any suitable selection criteria can be used to select the appropriate threshold for the adjustable threshold. In one embodiment, the selection criteria can include several single-criteria conditions or a multi-criteria condition. In another embodiment, if the adjustable threshold is compared to sensor values of a first sensor, the selection criteria can include an analysis of at least one sensor other than the first sensor. In another embodiment, the adjustable threshold can be the threshold used in a smoke alarm transition condition, and the adjustable threshold can be selected from one of three different thresholds.

In some embodiments, the threshold for a particular transition condition can be a learned condition threshold (not shown). The learned condition threshold can be the result of a difference function, which may subtract a constant from an initial threshold. The constant can be changed, if desired, based on any suitable number of criteria, including, for example, heuristics, field report data, software updates, user preferences, device settings, etc. Changing the constant can provide a mechanism for changing the transition condition for one or more states (e.g., a pre-alarming state). This constant can be provided to transition conditions 306 to make adjustments to the learned condition threshold. In one embodiment, the constant can be selected based on installation and setup of hazard detection system 300. For example, the home owner can indicate that hazard detection system 300 has been installed in a particular room of an enclosure. Depending on which room it is, system 300 can select an appropriate constant. For example, a first constant can be selected if the room is a bedroom and a second constant can be selected if the room is a kitchen. The first constant may be a value that makes hazard detection system 300 more sensitive to potential hazards than the second constant because the bedroom is in a location that is generally further away from an exit and/or is not generally susceptible to factors that may otherwise cause a false alarm. In contrast, the kitchen, for example, is generally closer to an exit than a bedroom and can generate conditions (e.g., steam or smoke from cooking) that may cause a false alarm. Other installation factors can also be taken into account in selecting the appropriate constant. For example, the home owner can specify that the room is adjacent to a bathroom. Since humidity stemming from a bathroom can cause false alarms, hazard system 300 can select a constant that takes this into account. As another example, the home owner can specify that the room includes a fireplace. Similarly, hazard system 300 can select a constant that takes this factor into account.

In another embodiment, hazard detection system 300 can apply heuristics to self-adjust the constant. For example, conditions may persist that keep triggering pre-alarms, but the conditions do not rise to alarming levels. In response to such persistent pre-alarm triggering, hazard detection system 300 can modify the constant so that the pre-alarms are not so easily triggered. In yet another embodiment, the constant can be changed in response to a software update. For example, a remote server may analyze data acquired from several other hazard detection systems and adjust the constant accordingly, and push the new constant to hazard detection system 300 via a software update. In addition, the remote server can also push down constants based on user settings or user preferences to hazard detection system 300. For example, the home owner may be able to define a limited number of settings by directly interacting with hazard detection system 300. However, the home owner may be able to define an unlimited number of settings by interacting with, for example, a web-based program hosted by the remote server. Based on the settings, the remote server can push down one or more appropriate constants.

The sensor state machines can control alarming states 330 and one or more of other states 320. In particular, smoke sensor state machine 314 can control smoke alarm state 331, CO sensor state machine 316 can control CO alarming state 332, and heat sensor state machine 318 can control heat alarming state 333. For example, smoke sensor state machine 314 may be operative to sound alarm 350 in response to a detected smoke event. As another example, CO sensor state machine 316 can sound alarm 350 in response to a detected CO event. As yet another example, heat sensor state machine 318 can sound alarm 350 in response to a detected heat event. In some embodiments, a sensor state machine can exercise exclusive control over one or more alarming states 330.

The system state machines can control pre-alarming states 340 and one or more of other states 320. In particular, smoke system state machine 315 may control smoke pre-alarm state 341, and CO system state machine 317 may control CO pre-alarm state 342. In some embodiments, each system state machine can manage multiple pre-alarm states. For example, a first pre-alarm state may warn a user that an abnormal condition exists, and a second pre-alarm state may warn the user that the abnormal condition continues to exist. Moreover, each system state machine can manage other states that cannot be managed by the sensor state machines. For example, these other states can include a monitoring state, a pre-alarm hushing state, and post-alarm states such as holding and alarm monitoring states.

The system state machines can co-manage one or more states with sensor state machines. These co-managed states ("shared states") can exist as states in both system and sensor state machines for a particular hazard. For example, smoke system state machine 315 may share one or more states with smoke sensor state machine 314, and CO system state machine 317 may share one or more states with CO sensor state machine 316. The joint collaboration between system and sensor state machines for a particular hazard is shown by communications link 370, which connects the two state machines. In some embodiments, any state change transition to a shared state may be controlled by the sensor state machine. For example, the alarming state may be a shared state, and anytime a sensor state machine transitions to the alarming state, the system state machine that co-manages states with that sensor state machine may also transition to the alarming state. In some embodiments, shared states can include idling states, alarming states, and alarm hushing states. The parameters by which multi-criteria state machines 310 may function are discussed in more detail in connection with the description accompanying FIGS. 4A-8B of U.S. Provisional Patent Application No. 61/847,937.

Figure 4:
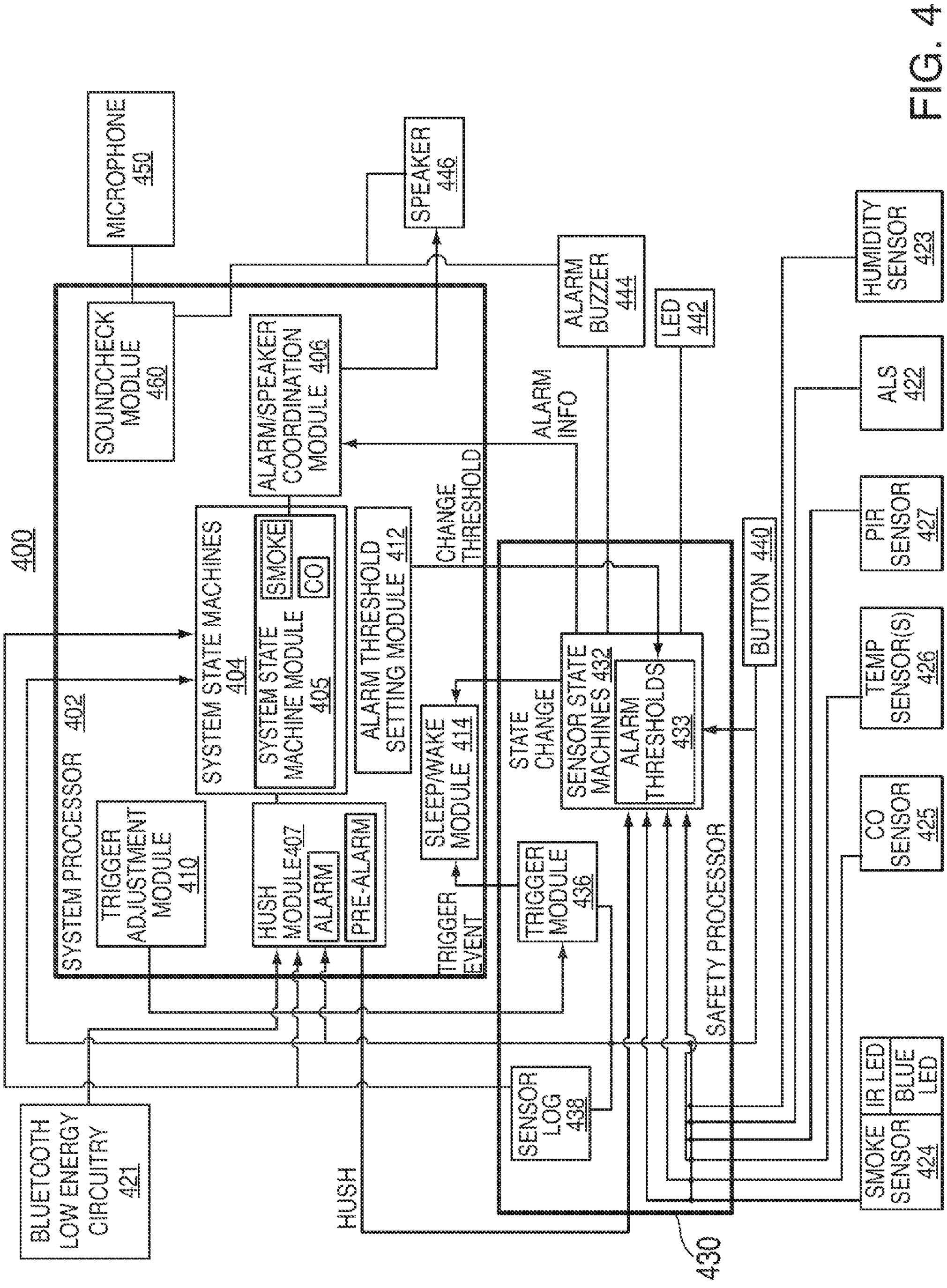
FIG. 4 shows an illustrative schematic of a hazard detection system, according to some embodiments.

FIG. 4 shows an illustrative schematic of hazard detection system 400 according to an embodiment and shows, among other things, signal paths among various components, state machines, and illustrative modules being executed by different processors. System 400 can include system processor 402, safety processor 430, Bluetooth low energy circuitry 421, ALS sensor 422, humidity sensor 423, smoke sensor 424 (which may include an Infrared LED and a blue LED), CO sensor 425, temperatures sensors 426, and PIR sensor 427, button 440, LED(s) 442, alarm 444, speaker 446, microphone 450, and sound check module 460. System processor 402 can be similar to system processor 210 of FIG. 2. System processor 402 can operate system state machines 404, system state machine module 405, alarm/speaker coordination module 406, hush module 407, trigger adjustment module 410, and sleep/wake module 414. System state machines 404 can access system state machine module 405, alarm/speaker coordination module 406, and hush module 407 in making state change determinations. System processor 402 can receive data values acquired by Bluetooth circuitry 421 and other inputs from safety processor 430. System processor 402 may receive data from sensors 422-427, data from sensor log 438, trigger events from trigger module 436, state change events and alarm information from sensor state machines 432, and button press events from button 440.

Safety processor 430 can be similar to safety processor 230 of FIG. 2. Safety processor 430 can operate sensor state machines 432, alarm thresholds 433, trigger module 436, and sensor log 438. Safety processor 430 can control operation of LEDs 442 and alarm 444. Safety processor 430 can receive data values acquired by sensors 422-427 and button 440. All or a portion of acquired sensor data can be provided to sensor state machines 432. For example, as illustrated in FIG. 4, smoke, CO, and heat sensor data is shown being directly provided to sensor state machines 432. Sensor log 438 can store chunks of acquired data that can be provided to system processor 402 on a periodic basis or in response to an event such as a state change in one of sensor state machines 432 or a trigger event detected by trigger module 436. In addition, in some embodiments, even though the sensor data may be stored in sensor log 438, it can also be provided directly to system processor 402, as shown in FIG. 4.

Alarm thresholds 433 can store the alarming thresholds in a memory (e.g., Flash memory) that is accessible by sensor state machines 432. As discussed above, sensor state machines 432 can compare monitored sensor data values against alarm thresholds 433 that may be stored within safety processor 430 to determine whether a hazard event exists, and upon determining that the hazard event exists, may cause the alarm to sound. Each sensor (e.g., smoke sensor, CO sensor, and heat sensor) may have one or more alarm thresholds. When multiple alarm thresholds are available for a sensor, safety processor 430 may initially select a default alarm threshold, but responsive to an instruction received from system processor 402 (e.g., from Alarm/Pre- Alarm Threshold Setting Module 412), it can select one of the multiple alarm thresholds as the alarm threshold for that sensor. Safety processor 430 may automatically revert back to the default alarm threshold if certain conditions are not met (e.g., a predetermined period of time elapses in which an alarm setting threshold instruction is not received from system processor 402).

Safety processor 430 and/or system processor 402 can monitor button 440 for button press events. Button 440 can be an externally accessible button that can be depressed by a user. For example, a user may press button 440 to test the alarming function or to hush an alarm. Safety processor 430 can control the operation of alarm 444 and LEDs 442. Processor 430 can provide alarm information to alarm/speaker coordination module 406 so that module 406 can coordinate speaker voice notification with alarm sounds. In some embodiments, safety processor 430 is the only processor that controls alarm 444. Safety processor 430 can also receive inputs from system processor 402 such as hush events from hush module 407, trigger band boundary adjustment instructions from trigger adjustment module 410, and change threshold instructions from alarm/pre-alarm threshold setting module 412.

As shown, hazard detection system 400 may use a bifurcated processor arrangement to execute the multi-criteria state machines to control the alarming and pre-alarming states, according to various embodiments. The system state machines can be executed by system processor 402 and the sensor state machines can be executed by safety processor 430. As shown, sensor state machines 432 may reside within safety processor 430. This shows that safety processor 430 can operate sensor state machines such as a smoke sensor state machine, CO sensor state machine, and heat sensor state machine. Thus, the functionality of the sensor state machines (as discussed above) are embodied and executed by safety processor 430. As also shown, system state machines 404 may reside within system processor 402. This shows that system processor 402 can operate system state machines such as a smoke system state machine and a CO system state machine. Thus, the functionality of the system state machines (as discussed above) are embodied and executed by system processor 402.

In the bifurcated approach, safety processor 430 can serve as the "brain stem" of hazard detection system 400 and system processor 402 can serve as the "frontal cortex." In human terms, even when a person goes to sleep (i.e., the frontal cortex is sleeping) the brain stem maintains basic life functions such as breathing and heart beating. Comparatively speaking, safety processor 430 is always awake and operating; it is constantly monitoring one or more of sensors 422-427, even if system processor 402 is asleep or non-functioning, and managing the sensor state machines of hazard detection system 400. When the person is awake, the frontal cortex is used to processes higher order functions such as thinking and speaking. Comparatively speaking, system processor 402 performs higher order functions implemented by system state machines 404, alarm/speaker coordination module 406, hush module 407, trigger adjustment module 410, and alarm/pre-alarm threshold setting module 412. In some embodiments, safety processor 430 can operate autonomously and independently of system processor 402.

The bifurcated processor arrangement may further enable hazard detection system 400 to minimize power consumption by enabling the relatively high power consuming system processor 402 to transition between sleep and non-sleep states while the relatively low power consuming safety processor 430 is maintained in a non-sleep state. To save power, system processor 402 can be kept in the sleep state until one of any number of suitable events occurs that wakes up system processor 402. Sleep/wake module 414 can control the sleep and non-sleep states of system processor 402. Safety processor 430 can instruct sleep/wake module 414 to wake system processor 402 in response to a trigger event (e.g., as detected by trigger module 436) or a state change in sensor state machines 432. Trigger events can occur when a data value associated with a sensor moves out of a trigger band associated with that sensor. A trigger band can define upper and lower boundaries of data values for each sensor and are stored with safety processor 430 in trigger module 436. Trigger module 436 can monitor sensor data values and compare them against the boundaries set for that particular sensor's trigger band. Thus, when a sensor data value moves out of band, trigger module 436 registers this as a trigger event and notifies system processor 402 of the trigger event (e.g., by sending a signal to sleep/wake module 414).

The boundaries of the trigger band can be adjusted by system processor 402, when it is awake, based on an operational state of hazard detection system 400. The operational state can include the states of each of the system and sensor state machines, sensor data values, and other factors. System processor 402 may adjust the boundaries of one or more trigger bands to align with one or more system state machine states before transitioning back to sleep. Thus, by adjusting the boundaries of one or more trigger bands, system processor 402 effectively communicates "wake me" instructions to safety processor 430. The "wake me" instructions can be generated by trigger adjustment module 410 and transmitted to trigger module 436, as shown in FIG. 4. The "wake me" instructions can cause module 436 to adjust a boundary of one or more trigger bands.

Sound check module 460 may be similar to sound check module 260 of FIG. 2. Module 460 may be coupled to buzzer 444, speaker 446, and microphone 450 and operative to administer a sound check of buzzer 444 and speaker 446 according to various embodiments described herein.

Figure 5:
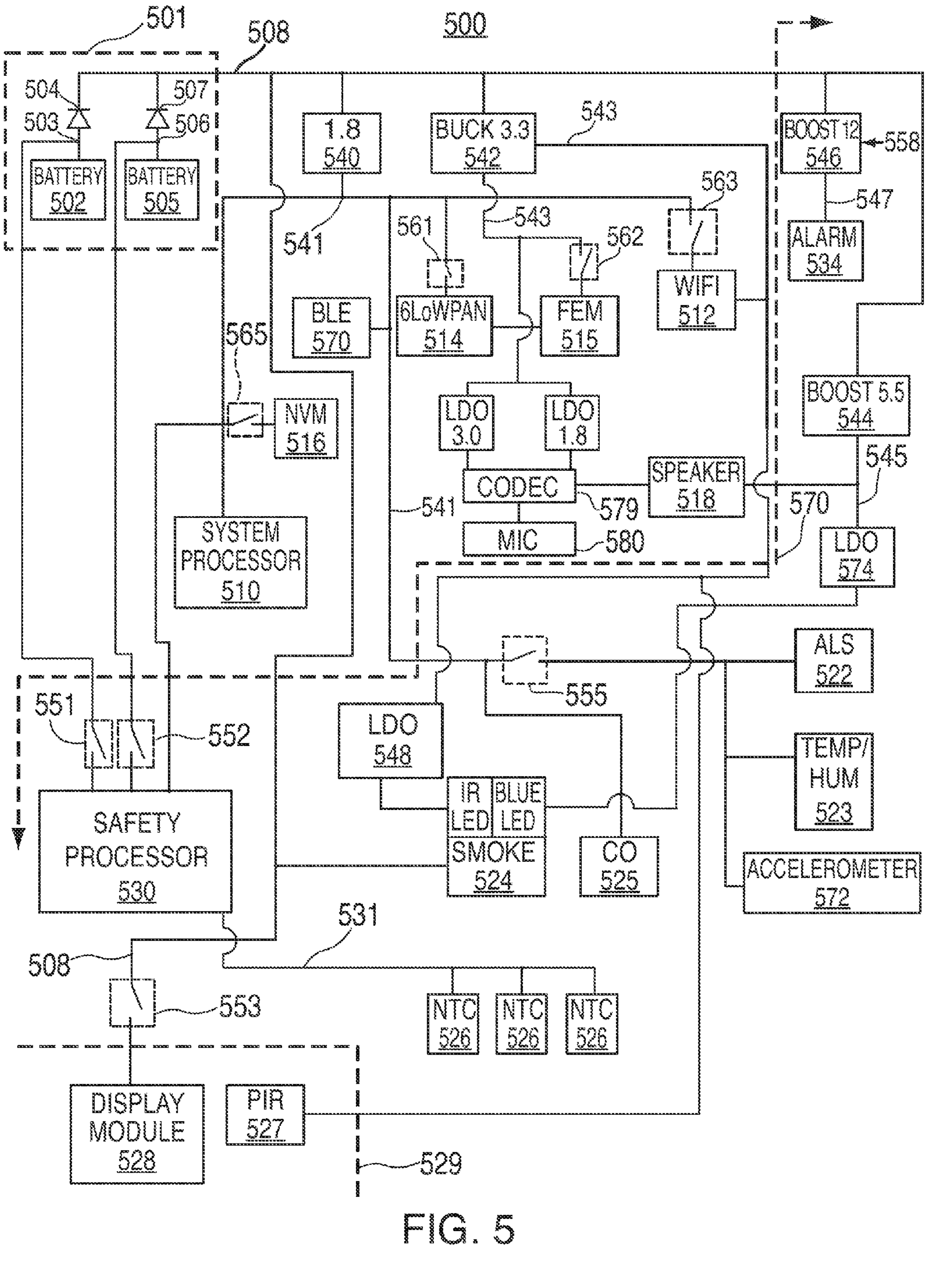
FIG. 5 shows an illustrative circuit schematic of hazard detection system, according to an embodiment.

FIG. 5 shows an illustrative circuit schematic of hazard detection system 500 according to an embodiment. The circuit schematic is a more detailed illustrative representation of hazard detection system 205 (of FIG. 2) and shows, among other things, power consuming components, the power busses supplying power to the components, and gating circuitry for selecting coupling and de-coupling components to a power bus.

Hazard detection system 500 can includes battery system 501 operative to provide a DC power source to power bus 508. The DC power source can exist on power bus 508 at a first voltage level. The voltage level may change slightly depending on various conditions, such as changes in temperature. Depending on composition of DC power source (e.g., alkaline or Lithium-based chemistries), the voltage level can vary, for example, between 3.6-5.4 volts. The voltage level may drop substantially when the energy stored in battery system 501 falls below a predetermined threshold (e.g., when the batteries are effectively dead). Battery system 501 can include battery cell group 502 and battery cell group 505. Each of battery cell groups 502 and 505 can include one or more battery cells. In one embodiment, each cell group includes three battery cells. As shown, battery cell group 502 is coupled to diode 504 and to safety processor 530 via bus 503 and gating circuitry 551. Safety processor 530 is similar in many respects to safety processor 230 (discussed above in connection with FIG. 2). Battery cell group 505 is coupled to diode 507 and to safety processor 530 via bus 506 and gating circuitry 552. Safety processor 530 can temporarily close gating circuitries 551 and 552 to measure the voltages of battery groups 502 and 505, respectively. After the measurement is complete, safety processor 530 can open gating circuitry 551 and 552. Diodes 504 and 507 are coupled to power bus 508.

Power bus 508 can be coupled to receive power from a line power source (not shown) that converts AC power to DC power. For example, the line power can be regulated to provide 5.0 volts. In addition, power bus 508 can be coupled to receive power from another DC source such as a USB port (not shown). For example, the other DC source can provide voltage between 4.4-5.25 volts. As a result, the voltage provided on power bus 508 can range from a first voltage (e.g., 3.6 volts) to a second voltage (e.g., 5.25 volts).

Power bus 508 can be coupled to power converter circuitry 540, power converter circuitry 542, power converter circuitry 544, power converter circuitry 346, smoke detector 324, and display module 328 (e.g., light emitting diode (LED)) via power gating circuitry 553. As discussed above in connection with FIG. 2, power converting circuitry is operative to convert a signal from one level to another. Smoke detector 524 can be one of the safety sensors (as previously discussed). Display module 528 can be any suitable display apparatus. In one embodiment, display module 528 can include one or more LEDs that emit different colored light to signify a status of system 500. For example, display of green light can signify good status, orange light can signify a warning condition such as a low battery, and red light can signify a hazard condition. Each of the components on power bus 508 is coupled to receive DC power at the first voltage level. Although smoke detector 524 and display module 328 can operate using DC power at the first voltage level, other components in system 500 can require different operating voltages. In addition, it is understood that although various components such as smoke detector 524 and display module 528 can receive power from power bus 508 at a first voltage level, one or more of these components may have internal power conversion circuitry. For example, display module 528 can include a boost converter.

Power converter circuitry 540, 542, 544, and 546 are each operative to convert the DC power signal provided on power bus 508 to a signal having a different voltage level. Power converter circuitry 540 and 542 can all be operative to down convert the DC power signal to three different voltages levels lower than the first voltage level. More particularly, power converter circuitry 540 can be a buck converter that provides a signal having a second voltage level (e.g., 1.8 volts) to power bus 541. Power bus 541 can be coupled to system processor 510 (e.g., which can be similar to processor 210 of FIG. 2), safety processor 530, 6LoWPAN module 514 (e.g., which can be similar to low power wireless communication circuitry 214 of FIG. 2) via power gating circuitry 561, WiFi module 512 (e.g., which can be similar to high power wireless communication circuitry 212 of FIG. 2) via power gating circuitry 563, CO sensor 525, non-volatile memory 516 (e.g., which can be similar to non-volatile memory 216) via power gating circuitry 565, and ambient light sensor 522, temperature and humidity sensor 523, and accelerometer 572 via power gating circuitry 555, and Bluetooth low energy circuitry 570.

Power converter circuitry 562 can be a buck converter that provides a signal having a third voltage level (e.g., 3.3 volts) to power bus 343. Power bus 343 can be coupled to RF Front-End Module (FEM) 515 via power gating circuitry 562, PIR sensor 527, and low-drop out regulator (LDO) 548. LDO 548 may be coupled to the IR LED of smoke sensor 524. RF FEM 515 operates in connection with 6LoWPAN module 514 and can include a power amplifier (PA) for transmitting data, a low-noise amplifier (LNA) for receiving data, an optional antenna switch, and an optional transmit/receive switch. The PA boosts the power of the transmitting signal to improve signal range and the LNA improves sensitivity when receiving a signal. 6LoWPAN module 514 can optionally leverage FEM 515 to improve its performance, but doing so incurs a power penalty. ALS sensor 522 and temperature and humidity sensor 523 can be similar to safety sensors 232 discussed above in connection with FIG. 2.

Power converter circuitry 544 can be a boost converter that provides a signal having a fourth voltage level (e.g., 5.5 volts) to power bus 545. Power converting circuitry 544 can be operative to be selectively turned ON and OFF. Power bus 545 can be coupled to speaker 518 and LDO 574. Speaker 518 can be similar to speaker 218 (discussed above in connection with FIG. 2). The fourth voltage level can be higher than the third voltage level and any voltage provided on power bus 508. LDO 574 may be coupled to the Blue LED of smoke sensor 524.

Power converting circuitry 546 can be operative to up convert the DC power signal to a voltage level higher than the first voltage level. Power converting circuitry 546 can be operative to be selectively turned ON and OFF, depending on a signal applied to node 558. Power converting circuitry 546 can be a boost converter that provides a signal having a fifth voltage (e.g., 12 volts) to power bus 547. Alarm 534 can be similar to alarm 234 (discussed above in connection with FIG. 2).

It is understood that although power converting circuitry 540, 542, 544, 546 were described above as having either a buck converting topology or boost converting topology, any suitable converting topologies can be used. For example, other DC-DC converting topologies such as buck-boost can be used. In addition, converting topologies that use transformers can be used, such as, for example, full-bridge forward converters, half bridge forward converters, single-ended converters, push pull converters, (charge pump converters,) and clamp converters.

Some of the sensors may include subcomponents that have separate power requirements, and as such, may need to be separately powered. Such sensors may be coupled to receive power from two or more power busses so that the subcomponents are supplied with the appropriate power. In some embodiments, one or more of the subcomponents of a sensor may be power gated ON and OFF. For example, smoke detector 524 can be an active sensor that “interrogates” air contained within a chamber with an IR LED and a blue LED, and then monitors for scatted IR and blue light. Thus, in some embodiments, smoke detector 524 can include a smoke detection optical source (a first subcomponent) and a first optical sensor (e.g., IR LED) and second optical sensor (e.g., Blue LED), with each of these components being separately powered. In particular, power bus 508 can provide power to the smoke detection sensor (524), power bus 543 can provide power to the IR LED, and power bus 545 can provide power to the blue LED. Power bus 543 can provide power to codec 579, which can be connected to microphone 580 and speaker 518.

Low-dropout regulators 548 and 574 may function as substantially constant current sources to drive their respective LEDs. Thus, smoke sensor 524 is being provided with power from different power busses. As will be explained in more detail below, by separately driving each LED in smoke sensor 524, enhanced efficiencies can be realized that are not possible using only one power bus.

System 500 can include one or more thermistors 526 situated in various locations within system 500. Thermistors 526 can be another one of the safety sensors as previously discussed in connection with FIG. 2. As shown, thermistors 526 are NTC type thermistors, though it is understood that other types of thermistors can be used. (It is also understood that a semiconductor diode, or a semiconductor band gap reference providing a PTAT output may also be used as a temperature sensor.) Thermistors 526 can be coupled to safety processor 530 via power bus 531. Safety processor 530 can selectively provide a power signal to power bus 531. For example, when safety processor 530 desires to take temperature readings from thermistor 526, it can provide power to power bus 531. After the reading is taken, processor 530 can shut off the power to power bus 531. In another embodiment, processor 530 can constantly supply power to power bus 531. It will be understood that any number of thermistors may be used in system 500 and that the thermistors may reside in different locations thereof. For example, in one embodiment, a single thermistor may reside on circuit board 329.

The various components and power busses of hazard detection system 500 can reside on one or more printed circuit boards or flexible printed circuit boards. In one embodiment, PIR sensor 527 and display module 528 can reside on printed circuit board 529 and all other components can reside on another printed circuit board (not shown). In another embodiment, all components can reside on a single printed circuit board.

FIG. 5 shows a dashed line 570 snaking between various components of system 500. Dashed line 570 demarcates an illustrative divide of components dedicated to providing 1) safety features and 2) enhanced features, and in particular, generally shows how power is managed by processors 510 and 530. Components generally associated with safety features are shown below dashed line 570 and components generally associated with enhanced features are shown above dashed line 570. Dashed line 570 further serves to illustrate the bifurcated processors embodiment in which safety processor 530 is dedicated to safety features and system processor 510 is dedicated to handling enhanced features as well as general system administration. As will be discussed in more detail below, dashed line shows that safety processor 530 manages power consumption of the "safety" components and system processor manages power consumption of the other components.

The safety features of system 500 are robust, power efficient, and operate without fail. To ensure the robust and power efficient use of the safety features, system 500 can operate as follows. Power converting circuitry 540 and 542 can always be ON (at least during intended and ordinary usage of system 500) throughout its minimum operational lifespan. There may be instances in which power converting circuitry 540 and 542 are not always ON, such as when the system 500 undergoes a full power-cycle reset. This way, power supplied on power busses 541 and 543 is always available to downstream components. These components can include system processor 510, safety processor 530, non-volatile memory 516, low-dropout regulator 548, low dropout regulator 574, and the safety sensors (e.g., ALS sensor 522, temperature and humidity sensor 523, smoke detector 524, CO sensor 525, thermistors 526, and PIR sensor 527). That safety processor 530 and the safety sensors have access to power via always ON power converting circuitry 540 and 542 ensures that system 500 is constantly monitoring for hazard events.

Power savings can be realized because safety processor 530, as opposed to system processor 510, is dedicated to monitoring the safety sensors for a hazard condition. Additional power savings can be realized by power gating various components. In particular, safety processor 530 can independently control each of power gating circuits 553 and 555. Thus, processor 530 can selectively couple and de-couple display module 528 to power bus 508, and each of ALS sensor 522, temperature and humidity sensor 523, and accelerometer 572 to power bus 541 by controlling power gating circuits 553 and 555, respectively.

Safety processor 530 can further manage power consumption by selectively enabling power converting circuitry 546. Processor 530 can enable or disable circuitry 546 by applying the appropriate signal to control node 558. When converting circuitry 546 is enabled, it can provide a signal at the fifth voltage level to power bus 547. Processor 530 can enable circuitry 546 when a hazard event is detected, and once circuitry 546 is enabled, alarm 534 is operative to sounds its alarm. When no hazard event is detected or there is no need for alarm 534 to be active, processor 530 can disable circuitry 546. Disabling circuitry 546 saves power lost during the operation of circuitry 546 and as well as power that would otherwise be consumed by alarm 534.

Power management can also be exercised by processor 510. Processor 510 can independently control each of power gating circuits 561, 562, 563, 565, and others (not shown). Thus, processor 510 can selectively couple and de-couple 6loWPAN module 514 to power bus 541, FEM 515 to power bus 543, WiFi module 512 to power bus 541, non-volatile memory 516 to power bus 541, controlling the appropriate power gating circuits. These power-gating compatible components can be completely disconnected from a power bus and still be able to function properly when re-connected to their respective power busses.

System processor 510 can further manage power consumption by selectively enabling power converting circuitry 544. Processor 510 can enable or disable circuitry 544 by applying the appropriate signal to control node 568. When converting circuitry 544 is enabled, it can provide a signal at the fourth voltage level to power bus 545. Processor 510 can enable circuitry 544 when WiFi module 512 and speaker 518 require power. Disabling circuitry 544 saves power lost during the operation of circuitry 544 and as well as power that would otherwise be consumed by WiFi module 512 and speaker 518.

System processor 510 and safety processor 530 can operate according to several different power modes. For example, in a very simplistic sense, both processors 510 and 530 can operate in an active mode and a sleep mode. As another example, one or more of processor 510 and 530 can have multiple active modes and multiple sleep modes, each having a different power consumption level. The particular mode each processor operates in may depend on the mode operation of the system 500. For example, if system 500 is in an Idle mode of operation, system processor 510 may be a relatively deep sleep mode, and safety processor 530 may be in a relatively low power active mode.

Figure 6:
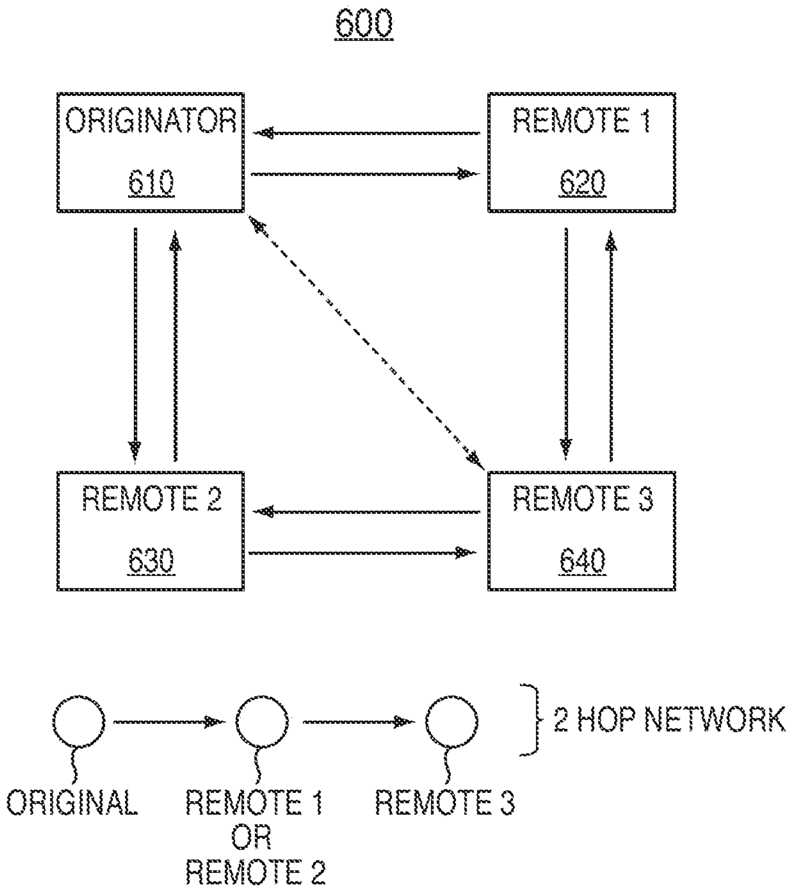
FIG. 6 shows an illustrative schematic of fabric network, according to an embodiment.

FIG. 6 shows an illustrative schematic of fabric network 600 according to an embodiment. Fabric network 600 can include two or more devices capable of wirelessly communicating with each other using one or more different communications protocols. The communications protocols can include, for example, Internet Protocol version 6 (IPv6). The devices of network 600 may be positioned throughout an enclosure, for example, such as a house or building. Depending on the positioning of the devices within the structure and interference elements existing therein, some devices may not be able to directly communicate with each other. For example, as shown in FIG. 6, device 610 can communicate directly with devices 620 and 630 (as indicated by the solid lines), but may not communicate directly with device 640 (as indicated by the dashed line). Device 610 may indirectly communicate with device 640 via either device 620 or 630 because devices 620 and 630 may communicate directly with device 640 (as shown by the solid lines). Two or more of devices 610, 620, 630, and 640 may be a hazard detection system.

Fabric network 600 may represent a multi-hop network in which at least one device serves as a retransmission station for relaying a message received from an originator device to a destination device because the originator and destination devices are not able to directly communicate with each other. The number of hops needed may depend on a number of factors such as the size of the network, the ability of the device to communicate with each other, etc. Fabric network 600 may represent a two-hop network: the first hop exists between device 610 and device 620 or device 630, and the second hop exists between device 620 or 630 and device 640. If, for example, devices 610 and 640 could directly communicate with other, then fabric network 600 would be a single-hop network.

Devices 610, 620, 630, and 640 have been labeled as Originator, Remote 1 (R1), Remote 2 (R2), and Remote 3 (R3). These designations may be referred to herein throughout to indicate which device serves as an originator of a communication and which devices serve as recipients of the originator's message. The originator, as its name implies, is the device that initiates a fabric communication in response to conditions it is monitoring, and messages broadcasted by the originator are distributed to remote devices so that the remote devices can take the appropriate actions in response to the message broadcasted by the originator. The remote devices may transmit messages in response to the originator's message(s), but the originator decides whether to abide by the remote device's message. For example, the originator initiates a fabric communication by informing the remote devices that it is conducting a sound test. In response to receiving the sound test message, the remote devices take an appropriate action (e.g., delay the start of their sound test). A remote device may broadcast its own sound test message when it determines that the originator has completed its sound test. The other remote devices, upon receiving the sound test message, may hold off on commencing their sound check until they determine it is appropriate to start.

The devices can broadcast messages or packets in a non-clear channel assessment (NCCA) mode and a clear channel assessment (CCA) mode. In the NCCA mode, the device may repeatedly broadcast its packets, irrespective of the state of the communication channel. Thus, in this mode, there is a possibility that the packets may saturate the fabric network, as more than one device may be simultaneously broadcasting in the NCCA mode. In the CCA mode, the device may first determine whether any other device is communicating on a channel before attempting to broadcast a packet. In effect, devices operating in CCA mode race each other to determine who broadcasts.

Messages may be communicated across the fabric network after all the devices in the network are woken up. Devices within a fabric network may need to be woken up because they spend a majority of their operational life in a low-power, sleep mode. Once awake, they can transmit messages to each other. More specifically, once the devices are awake, the fabric may be considered to be 'synchronized' or, in other words, 'awake'. For example, the system processors, Wifi radios, and other circuitry may be transitioned from a low power or off state to a high power or on state. Accordingly, the system processors may be used to form and circulate relatively rich data and/or commands throughout the fabric. Such data and/or commands may include, for example, information identifying a location of the originator, instructions to increase sampling rates, etc. By activation of communication circuitry (e.g., the Wifi communication circuitry) other than the low power communication circuitry, such data and/or commands may also be communicated outside of the fabric (e.g., via an access point). Accordingly, after the devices in the fabric network are awake and synchronized, fabric messages can be broadcast onto the network for dissemination from an originator device to any number of remote devices. The fabric messages may be transmitted according to a broadcast scheme that can operate over a multi-hop network. This broadcast scheme may be an effective transmission paradigm for networks where the number of devices is unknown or changing. In one embodiment, the scheme may define a broadcasting primitive based on broadcasting a single message to the network and flooding that message throughout the network. The scheme may separate the forwarding and dissemination of the message from the processing and understanding of the message payload.

Figure 7:
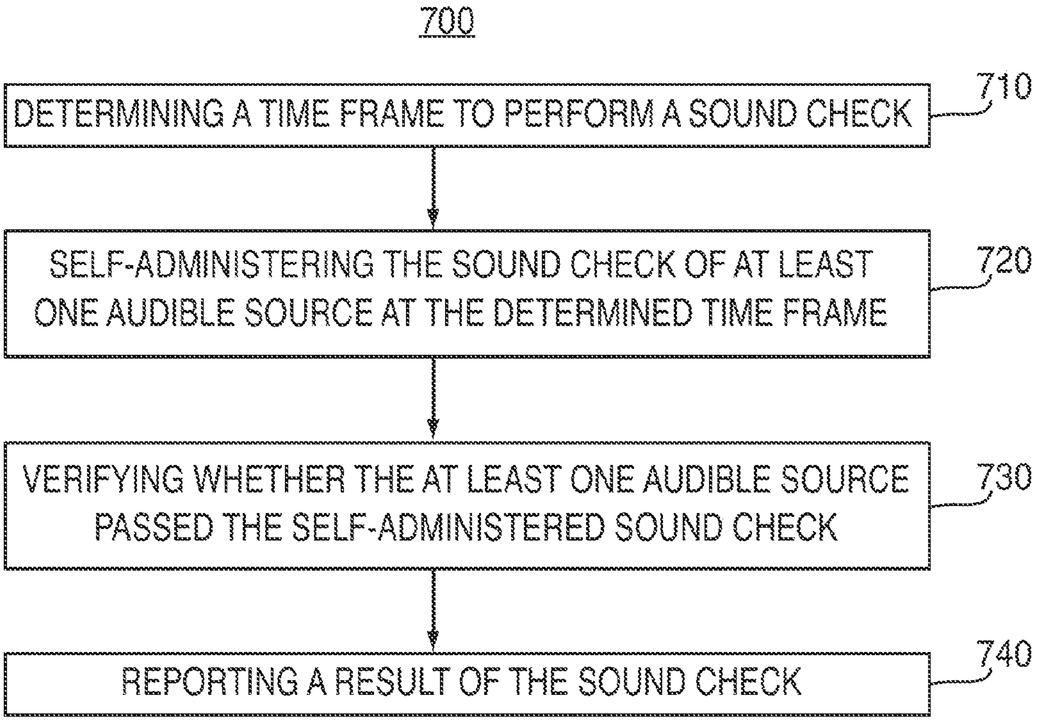
FIG. 7 shows an illustrative flowchart of steps for self-administering a sound test of audible components contained in a hazard detection system, according to an embodiment.

FIG. 7 shows an illustrative flowchart of steps for self-administering a sound test of audible components contained in a hazard detection system, according to an embodiment. The self-administration of the sound check can be performed by the hazard detection system without requiring user interaction to commence the test or the presence of any occupants within a structure containing the system. Starting at step 710, a time frame for performing a sound check can be determined. Sound test module 260 of FIG. 2 may assist in determining the time frame. In particular, module 260 may use scheduler 263 and user preferences 264 to determine the time frame. The time frame can be characterized as a coarsely defined test time and a finely defined test time. The coarse time may refer to a calendar day, and the finely defined test time may refer to a specific time of day or range of times within a day. Thus, the sound check can be performed, for example, at a specific time of day on a monthly, quarterly, semi-yearly, or yearly basis. The time frame can be determined based on any number of suitable factors. For example, the time frame may be based on a user defined time frame or range of times within a day on a calendar basis. As another example, the time frame can take into account occupational data that indicates whether any occupants are present in the structure (e.g., it may not be desirable to run a sound check when the owners are home). The time frame can also take account of the status of the hazard detection system. For example, if the hazard detection system detects a potential hazard, the sound test can be delayed to another time. As another example, if ambient conditions exist that may affect the accuracy of the sound test (e.g., hazard system detects loud ambient noise), the sound test may be delayed or cancelled until the next calendar test date.

The time frame can be determined by one or several different devices. For example, in one embodiment, the hazard detection system can be the sole determinant of the time frame. As another example, a mobile device that can communicate directly with the hazard detection system or to a service that can communicate with the hazard detection system may enable a user to define parameters of the time frame. Thus, when a user defines the time frame using the mobile device, those parameters may be transmitted to the hazard detection system or the service so that sound test is conducted at the appropriate time. If desired, the hazard detection system may make adjustments to the user defined parameters, thereby resulting in a modification to the time frame. As yet another example, the service may determine the time frame. The service may have access to an account associated with the hazard detection system and have knowledge of user preferences, occupancy data, and other metrics that enable it to define the test time.

In embodiments where multiple hazard detection systems exist within a common structure, a different time frame can be selected for each system such that there is no overlap in sound tests. Preventing overlapping sound tests may enhance efficacy of each self-administered sound test. The different time frames for each hazard detection system may differ only in the finely defined test time, and the coarsely defined test time may be the same. Thus, on a test day, each hazard detection system can have different sound test commencement times to avoid overlapping tests.

At step 720, the hazard detection system may self-administer the sound test of at least one audible source at the determined time frame. During the self-administered sound test, each audible source is instructed to emit an audio signal, and while that audio signal is emitted, it is monitored by a device that detects the emitted audio signal. The audible source can be, for example, a speaker or a buzzer. In some embodiments, the system can include both the speaker and the buzzer. The device that detects the audio signal emitted by each audible source can include, for example, a microphone. Other audio signal detectors can include, for example, an energy detector, a correlation receiver, a speaker, a buzzer, an ultrasonic sensor, an accelerometer, and other sound verification devices. The same speaker that functions as an audible source can be used to monitor for an audio signal being emitted by the buzzer. Similarly, the same buzzer that functions as an audible source can monitor for an audio signal being emitted by the speaker. Alternatively, a system may include two buzzers so that the alarm can be blared at two different frequencies. In such a system, one buzzer can be used to monitor the audio signal being emitted by the other buzzer, and vice versa. The ultrasonic sensor can be configured to monitor for higher order harmonics of any one or more of the audible sources. Non-audio detectors can be used to detect the audio signal being emitted by an audible source. For example, non-audio detectors can include a capacitive sensor and an accelerometer. The capacitive sensor can be coupled directly to or adjacent to the buzzer. When the buzzer is sounding, it may vibrate, thereby causing a measurable change in capacitance that is detected by the capacitive sensor. Similarly, the accelerometer may be able to measure vibration induced in the system when the buzzer is sounding.

At step 730, the system can verify whether the at least one audible source passed the self-administered sound test. The system can perform the verification using all sorts of different techniques. Some of the techniques can involve signal processing that operates within a limited software footprint contained in a processor (e.g., system processor 210). The system can perform separate verifications for each audible source. For example, a speaker may be evaluated according to a speaker sound test and the buzzer may be evaluated according to a buzzer sound test. Additional details of these tests are discussed below.

At step 740, the result(s) of the sound test may be reported. The reporting may be manifested in many different ways. In one approach, the hazard detection system may cause its onboard light system to emit a particular color or display a particular color pattern based on the results. In another approach, the hazard detection system may playback a message through the speaker based on the results of the test. In yet another approach, the system may transmit the results to a service, which then distributes those results to a mobile device, which can display the results. Alternatively, the system may transmit the results directly to a mobile device.

It should be appreciated that the steps shown in FIG. 7 are merely illustrative and that additional steps may be added and steps may be omitted. Additional details for implementing one or more of the above steps are discussed in more detail below.

Figure 8:
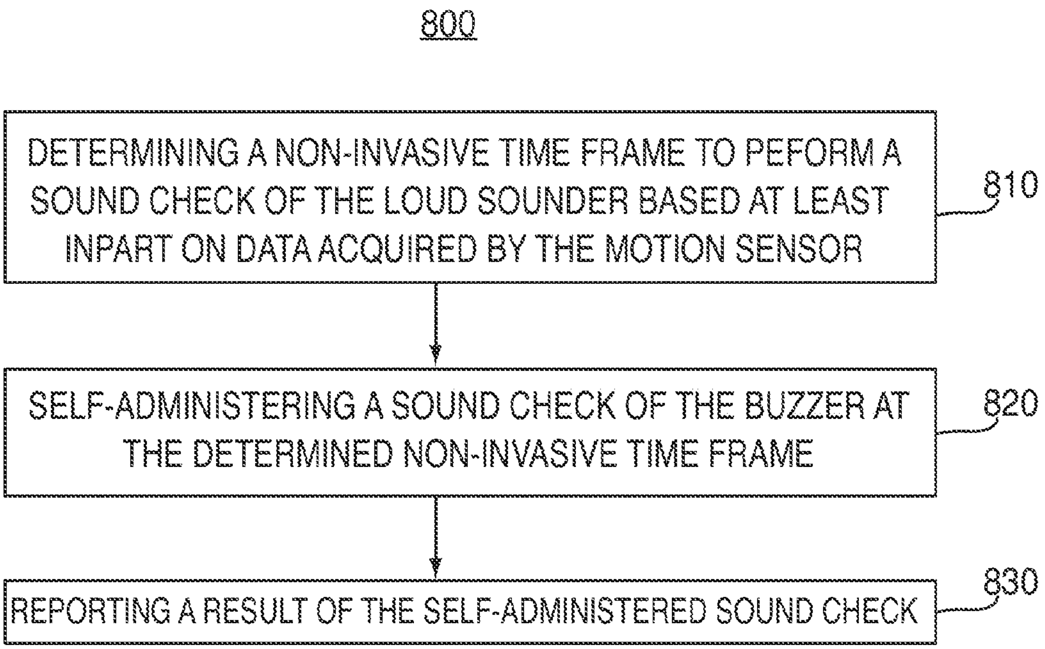
FIG. 8 shows an illustrative flowchart of steps that may be taken to self-test a buzzer in a hazard detection system, according to an embodiment.

FIG. 8 shows an illustrative flowchart of steps that may be taken to self-test a buzzer in a hazard detection system. The system can include, among other things, the buzzer and a motion sensor. Starting at step 810, a non-invasive time frame to perform a sound check of the buzzer is determined based at least in part on data acquired by the motion sensor. Because the buzzer is considered by most humans to be a loud and unpleasant sound, it may be desirable to perform the sound check when it would be non-invasive to occupants who typically work or reside within a structure containing the hazard detection system. As defined herein, the non-invasive time frame is a time to conduct a self-administered sound check of a buzzer (and/or speaker and other audible sources) that has minimal or no auditory impact on the occupants who typically reside in a structure containing the hazard detection system. In other words, the non-invasive time is a time when it is reasonably known that no occupants are present in the structure.

The non-invasive time can be determined in any number of different ways. One approach involves use of the motion sensor to obtain data as to when occupant are detected in the structure. The occupancy information can be analyzed to determine patterns of occupancy. These patterns, coupled with other factors such as time of day, user preferences, and other factors, can provide statistical assurance of whether any occupants are present. For example, the motion sensor data may indicate that there is little or no movement during weekdays between 11 am and 4 pm and that there is little movement during the night between 1 am and 5 am. Using this information along with time of day factors, the non-invasive time may be selected to exist within the 11 am to 4 pm time frame for any weekday.

The non-invasive time can be determined automatically without any user intervention. In one embodiment, the hazard detection system may make the determination independently of any other system (e.g., service or mobile device). In another embodiment, the hazard detection system may operate in connection with a service that determines the non-invasive time. In yet another embodiment, the hazard detection system and/or service may ascertain a location of mobile device(s) associated with the account tied to the hazard detection system in order to determine a non-invasive time. For example, if the location of the associated mobile device(s) is known, the non-invasive time can be based on times when it is known that the mobile device is not located within the structure.

At step 820, a sound check of the buzzer can be self-administered at the determined non-invasive time frame. For example, the sound check can involve temporarily activating the buzzer, monitoring a microphone for an audio signal during the temporary activation of the buzzer, and determining whether the audio signal satisfies sound check criteria. A more detailed explanation of the buzzer sound check can be found below. At step 830, a result of the self-administered sound check can be reported. The reporting can be same as that discussed above in connection with FIG. 7.

Some structures may have more than one hazard detection system contained therein. For such structures, it may be desirable to prevent overlapping sound tests so that administration of one test is not affected by the simultaneous administration of one or more other tests. In order to avoid overlapping tests, the commencement time of each sound test may be staggered. The staggering may be implemented in a number of different ways, a few of which are discussed below in connection with FIGS. 9-11.

Figure 9:
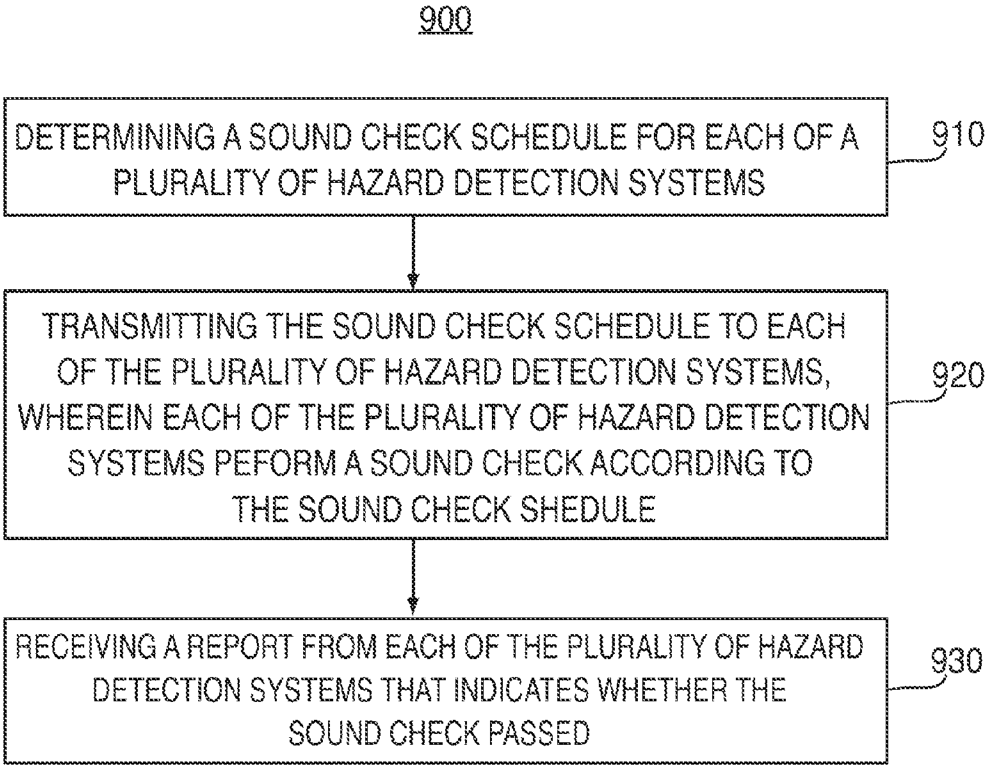
FIG. 9 shows a flowchart of a process for preventing sound interference among a plurality of hazard detection systems that are performing self-administered sound tests within a common structure, according to an embodiment.

FIG. 9 shows a flowchart of process 900 for preventing sound interference among a plurality of hazard detection systems that are performing self-administered sound tests within a common structure, according to an embodiment. Process 900 can be implemented by a service that periodically communicates with the hazard detection systems. The service may be a central service that communicates with the hazard detection systems on a periodic basis and that, among other things, maintains user accounts, provides push notifications to user mobile devices, and provides enhanced processing power on behalf of the hazard detection systems. Starting at step 910, the service may determine a sound check schedule for each of the plurality of hazard detection systems. For example, the service may know how many hazard detection systems are present in the structure. Based on this knowledge, it may assign staggered sound check start times to each system. For example, the staggered start times may be staggered by at least the amount of time necessary for each system to complete its test. Thus, a first system may start at time, to, and each subsequent system may start at time $t_{n*constant}$, where n is the number of the subsequent system and constant is a fixed time duration.

At step 920, the sound check schedule can be transmitted to each of the plurality of hazard detection systems, wherein each of the plurality of hazard detection systems perform a sound check according to the sound check schedule. At step 930, the service may receive a report from each of the plurality of hazard detection systems that indicates whether the sound test passed.

Figure 10:
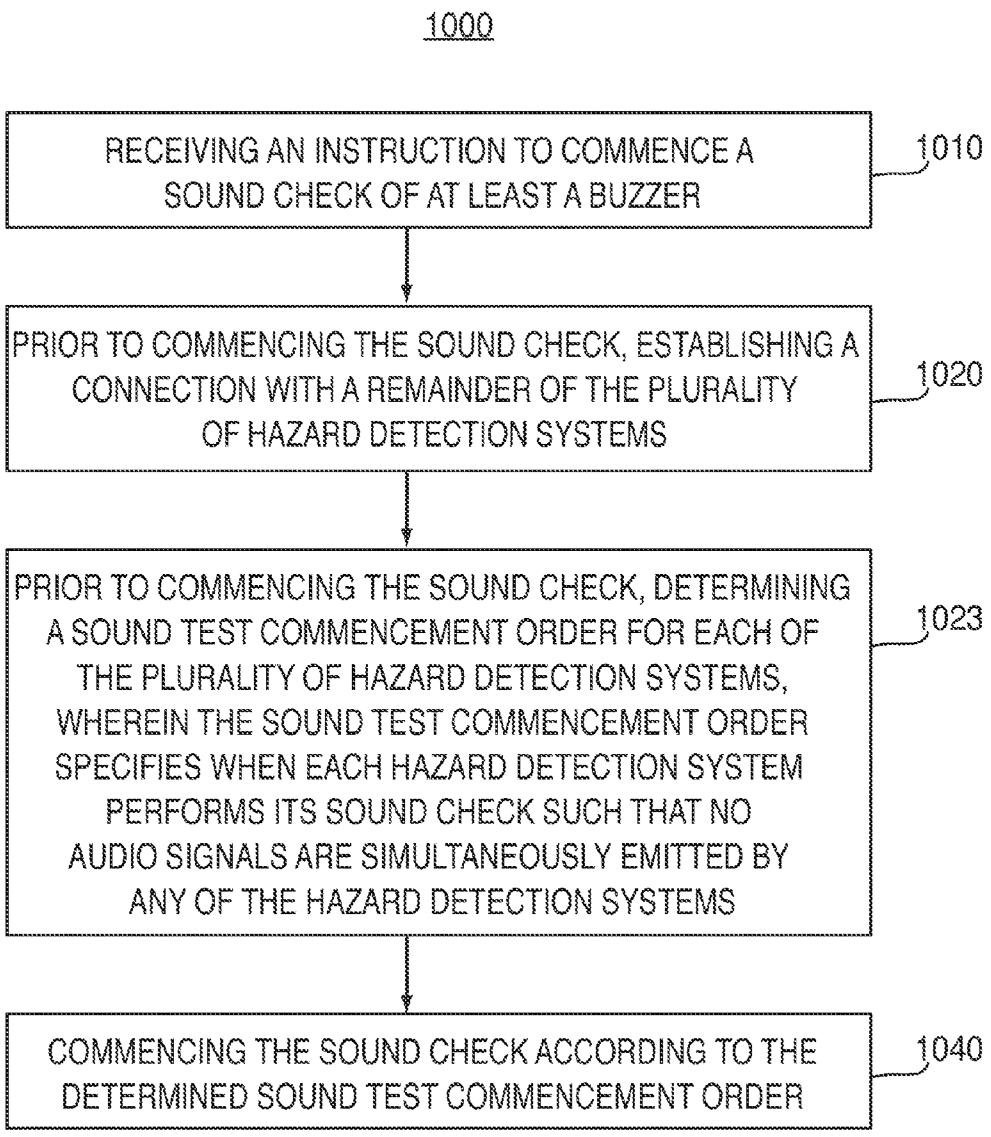
FIG. 10 shows a flowchart of a process for preventing sound interference among a plurality of hazard detection systems that are performing self-administered sound tests within a common structure, according to an embodiment.

FIG. 10 shows a flowchart of process 1000 for preventing sound interference among a plurality of hazard detection systems that are performing self-administered sound tests within a common structure, according to an embodiment. Process 1000 can be implemented by a first hazard detection system. Starting at step 1010, an instruction can be received to commence a sound check of at least a buzzer. The source of the instruction can vary. For example, in one embodiment, the source of the instruction may originate with a mobile device (e.g., user initiates a sound test by interacting with an application). The mobile device may then communicate with the service, which relays the instruction to the first hazard detection system. In another embodiment, the source of the instruction can originate with service. In yet another embodiment, the source of the instruction can originate with first hazard detection system.

Steps 1020 and 1030 may each be implemented prior to commencing the sound test. At step 1020, the first system may establish a connection with a remainder of the plurality of hazard detection systems. For example, the connection may be established using the low power fabric network (e.g., fabric network 600 of FIG. 6). At step 1030, the first system may determine a sound check commencement order for each of the plurality of hazard detection systems, wherein the sound check commencement order specifies when each hazard detection system performs its sound check such that no audio signals are simultaneously emitted by any of the hazard detection systems. The first system can randomly assign sound test commencement times to each system, including itself, or it may assign itself the first test time slot and randomly or purposely assign test time slots to the other systems. At step 1040, the first system may commence the sound test according to the determined sound test commencement order.

Figure 11:
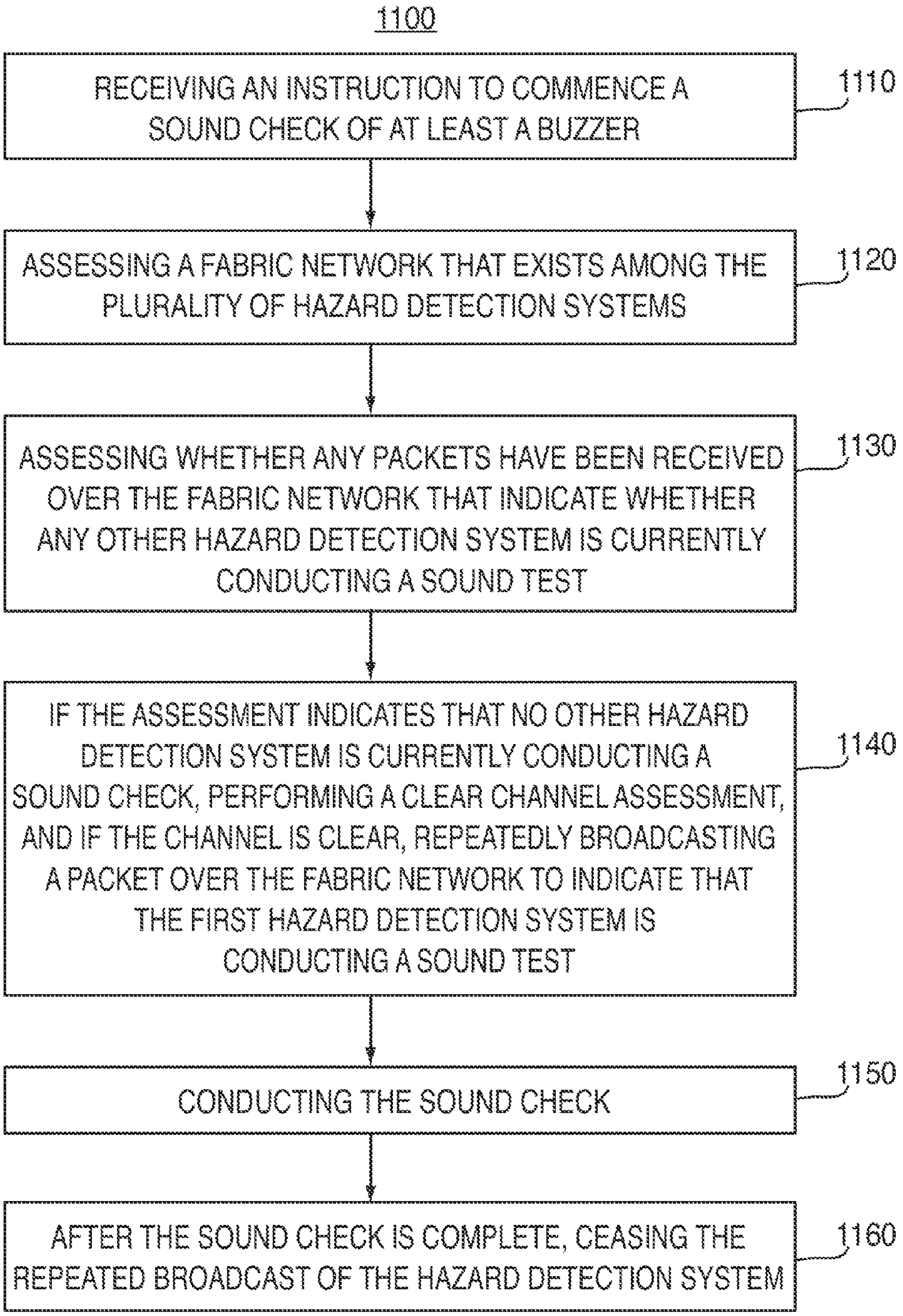
FIG. 11 shows a flowchart of a process for preventing sound interference among a plurality of hazard detection systems that are performing self-administered sound tests within a common structure, according to an embodiment.

FIG. 11 shows a flowchart of process 1100 for preventing sound interference among a plurality of hazard detection systems that are performing self-administered sound tests within a common structure, according to an embodiment. Process 1100 can be implemented by a first hazard detection system. Process 1100 illustrates a scenario where each of the hazard detection system vies for an opportunity to start its self-administered sound test. This process is akin to how such devices may make a clear channel assessment before attempting to transmit packets across a fabric network. At step 1110, the first system may receive an instruction to commence a sound test of at least a buzzer. At step 1120, the first system may access a fabric network that exists among the plurality of hazard detection systems. The fabric network may be similar to fabric network 600 of FIG. 6. At step 1130, the first system may assess whether any packets have been received over the fabric network that indicate whether any other hazard detection system is currently conducting a sound check. For example, if another system is performing a sound test, it may have previously transmitted a packet across the fabric network to inform the other system it is conducting a sound test. The packet may contain various data such as a time stamp that indicated when the packet was originally transmitted or when the self-test is expected to end.

At step 1140, if the assessment indicates that no other hazard detection system is currently conducting a sound check, the first system may perform a clear channel assessment, and if the channel is clear, broadcast a packet over the fabric network to indicate that the first hazard detection system is conducting a sound check. The first system may repeatedly broadcast the packet. The packet can include several fields. For example, it may include a source field that identifies an originator of the packet, a destination field that specifies which hazard detection systems of the fabric network are intended recipients of the received message, and an information field that specifies information relating to the sound check.

If the channel is not clear, the first system may wait until the channel is clear before attempting to broadcast its packet. Moreover, if the channel was not clear, the first system may first check whether a packet was received, which indicates that another hazard detection system is currently conducting a sound check. At step 1150, the first system may conduct the self-administered sound test, and after the sound test is complete, the repeated broadcast of the packet may cease. If desired, the first system may transmit a fabric message indicating that it has completed its sound test.

Figure 12:
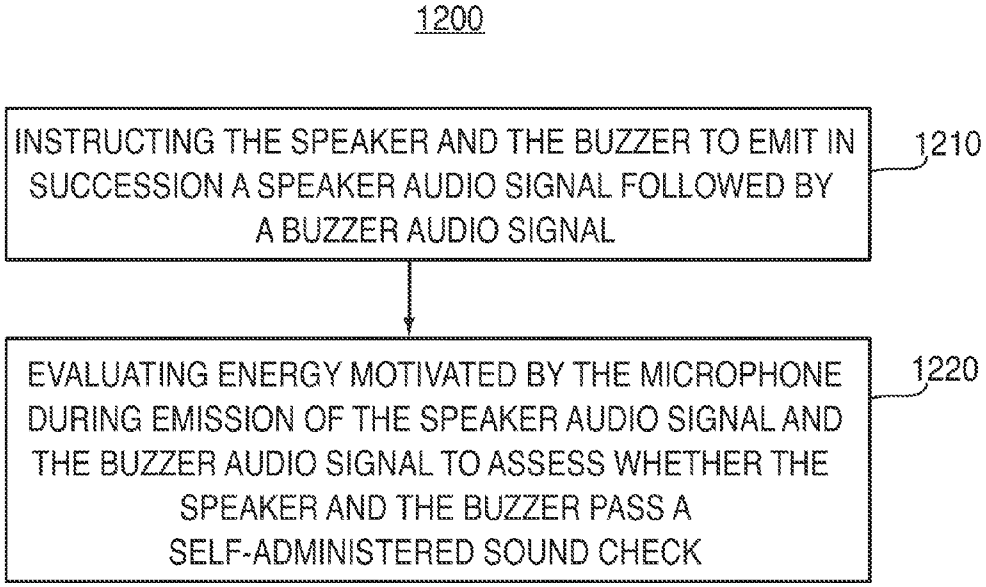
FIG. 12 shows an illustrative process for conducting a self-administered sound test in a system including a speaker, a buzzer, and a microphone, according to an embodiment.

FIG. 12 shows an illustrative process 1200 for conducting a self-administered sound test in a system including a speaker, a buzzer, and a microphone, according to an embodiment. A goal of the self-administered sound check is to check that the speaker, buzzer, and microphone are functional (i.e., operating at the appropriate loudness and frequency). At step 1210, the system can instruct the speaker and the buzzer to emit in succession a speaker audio signal followed by a buzzer audio signal. The emitted signals may be designed to be as pleasant (or innocuous) as possible in an effort to provide the best possible user experience for a sound test (if the user happens be present during the test). The system may provide a signal to be played through the speaker (herein referred to as a 'boop') and another signal to be played through the buzzer (herein referred to as a 'Bip', where both signals produce a microphone signal.

Environmental noise, including other hazard detection systems engaged in a self-test at the same time, and one or more systems in a significantly reverberant environment, are all factors that may cause erroneous results. In general, such environmental noise will have a mix of additive and convolutional components. In addition, the gain of the microphone may have noise and linearity properties that vary from system to system. In one embodiment, the sound test can generate two boops on the speaker and two Bips on the buzzer. In one embodiment, the timing of these signals is fixed, and the expectation is that in most environments the sound test is capable of distinguishing its signals from noise in the environment, including other hazard systems. In another embodiment, the signal parameters may be varied slightly, and in particular, the timing interval between each of the boops and each of the Bips may be varied. Such a variation provides a distinct signature for the sound test and allows rejection of signals from other systems performing sound test or other signals that resemble sound test signals in the environment.

In some embodiments, both the speaker and the buzzer are used. The buzzer amplitude may not be adjustable if it is a self-oscillatory circuit. In one embodiment, a sequence of four tones can be used in the sound test. That is, two tones can be emitted from the speaker and two tones from the buzzer. The speaker tones can be chosen to represents an ascending octave, and the buzzer tones can be chosen to be short but sufficient to assure the buzzer circuitry starts up, and no longer than needed in order to reduce the user experience of the unpleasant buzzer sound. The four tone sequence may be referred to onomatopoeically as "boop boop Bip Bip", and, even more precisely, boop1, boop2, Bip1, Bip2. It should be understood that other tone sequences may be used that provide a desirable user experience.

Figure 13:
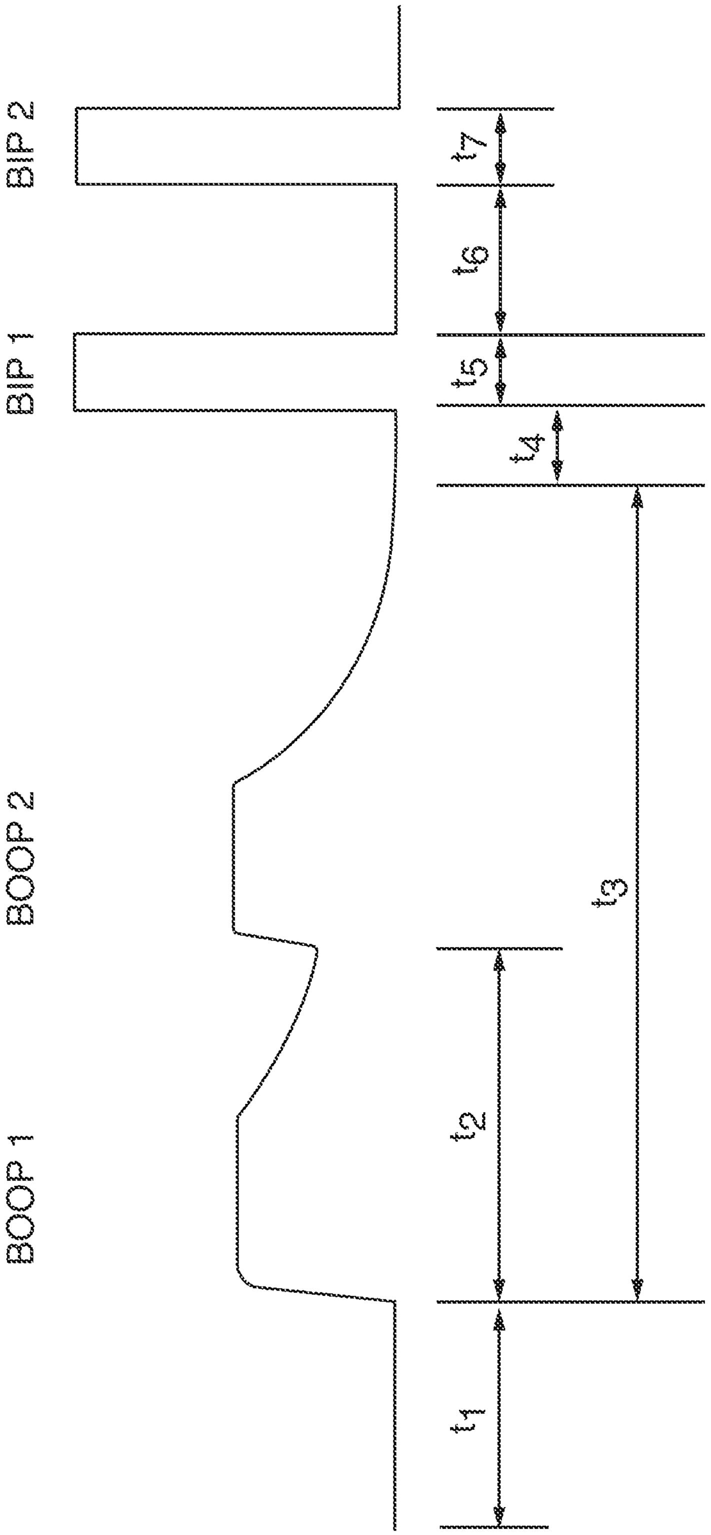
FIG. 13 shows an illustrative timing schematic for the boop1 boop2 Bip1 Bip2 sequence, according to an embodiment.

FIG. 13 shows an illustrative timing schematic for the boop1 boop2 Bip1 Bip2 sequence. The in sequence speaker tones, boop1 and boop2, are shown. They may be sine waves that are an octave apart, (e.g., boop1 sounding at D5 (587 Hz) and boop2 sounding at D6 (1174 Hz). The attack for boop1 starts after time, t1, and the attack for boop2 starts after time, t2. Time, t2, may be varied to enhance rejection of erroneous signals. The sampling rate for the self-test signal processing can be 8 kHz. Based on this frequency, boop1 can be set to a frequency of Fs/14 (=571.42 Hz) and boop2 can be set to Fs/7 (=1142.85 Hz). While these frequencies are about a quarter tone flat with respect to the D5, D6 pair of tones, the octave relation is preserved, giving, for most users, a pleasant to innocuous user experience. The lower tone falls below the nominal 700 Hz f0 of the speaker, presenting a loss of about 4 dB. In one embodiment, the boops may be generated in real time in lieu of a pre-recorded waveform. In another embodiment, the boops may be a pre-recorded waveform. The combined duration of boop1 and boop2 may span time, t3.

FIG. 13 also shows the in sequence buzzer tones, Bip1 and Bip2, which are different from the speaker tones. The buzzer can be used in an oscillator circuit, and the only parameter that can be adjusted is the duration the buzzer oscillator is turned on and the interval of silence before, between, and after the Bips. The Bip sequence may be initiated after time, t4, which may represent an inter process delay existing between the boops and the Bips, due to latency between the System Processor 510 and Safety Processor 530, in one embodiment. Bip1 may be turned on for the duration of time, t5, and Bip may be turned on for the duration of time, t7, separated by variable time, t6. Time, t6, may be varied to enhance rejection of erroneous signals.

Figure 16:
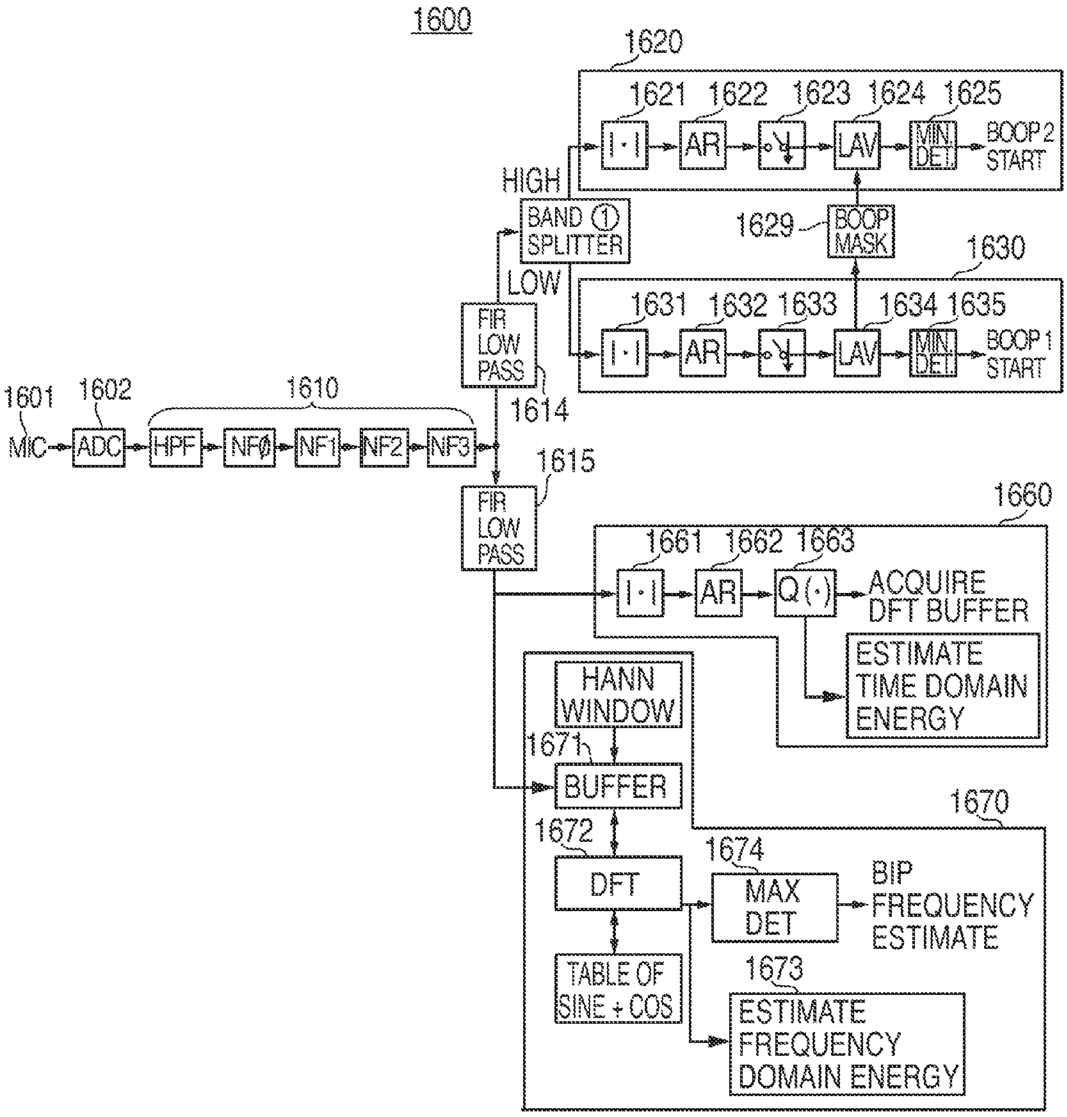
FIG. 16 shows an illustrative block diagram of a filter and processing arrangement that may be used to conduct a sound test, according to an embodiment.
Figure 17:
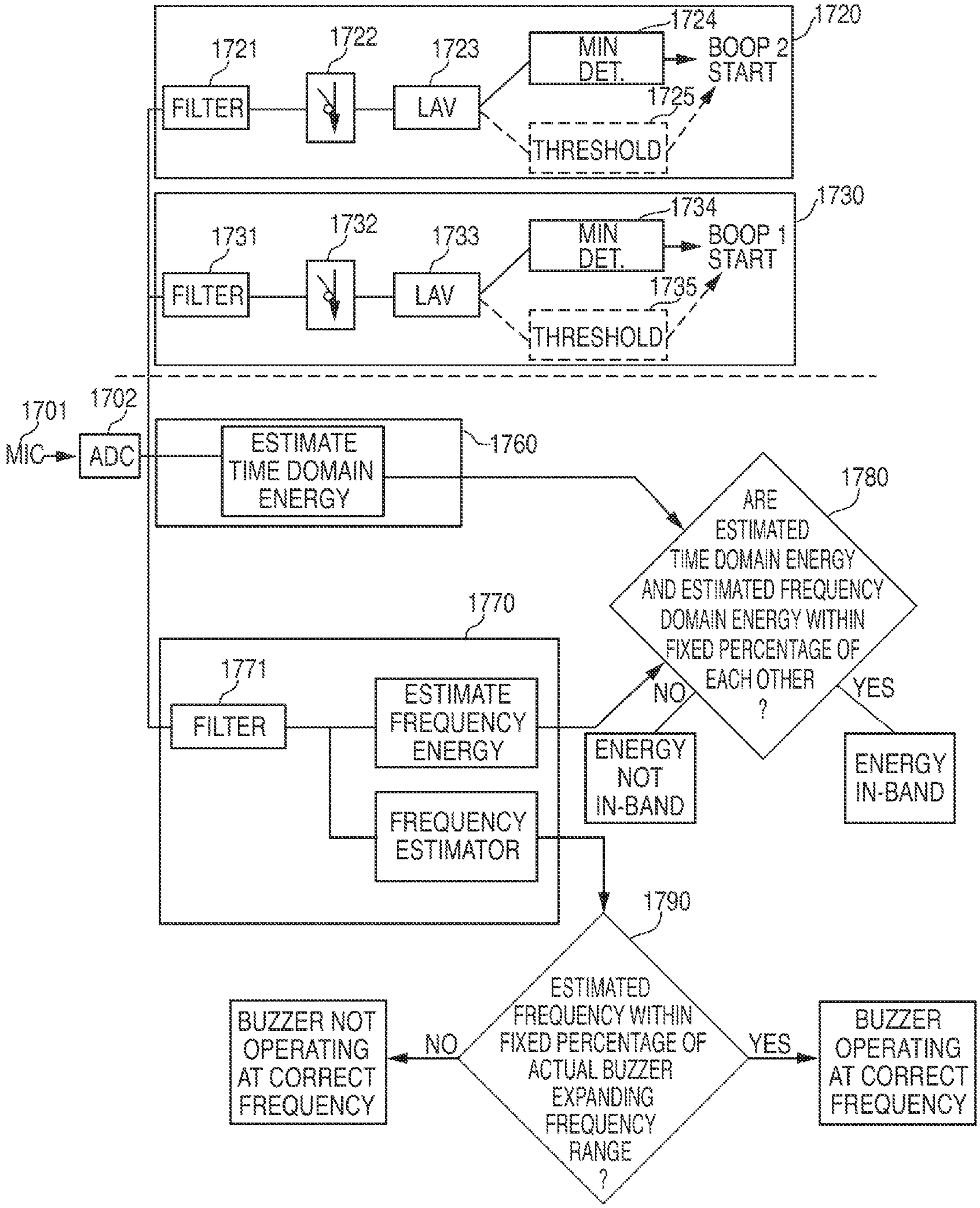
FIG. 17 shows another illustrative block diagram of a filter and processing arrangement that may be used to conduct a sound test, according to an embodiment.

Referring back to FIG. 12, at step 1220, energy monitored by the microphone during emission of the speaker audio signal and the buzzer audio signal can be evaluated to assess whether the speaker and the buzzer pass a self-administered sound check. A spectral analyzer can be used to evaluate the frequency and the amplitude of the audio signals emitted by the speaker and buzzer. The evaluation of the speaker audio signal and the buzzer audio signal can be separated into different digital signal processing tests. For example, a speaker test may be performed independent of a buzzer test, and the results of each test can be reported as separate test results. Both tests are now discussed. In particular, FIG. 14 discusses an illustrative speaker test and FIG. 15 discusses an illustrative buzzer test, and both FIGS. 14 and 15 may make reference to FIGS. 16 and 17, which show different filtering and software processing arrangements for conducting the tests according to various embodiments. FIGS. 16 and 17 are briefly described first to provide context for the discussion of FIGS. 14 and 15, and FIGS. 16 and 17 will be described in more detail as appropriate.

FIG. 16 shows an illustrative block diagram of a filter and processing arrangement 1600 that may be used to conduct a sound test according to an embodiment. Arrangement 1600 can include microphone signal 1601, analog-to-digital converter (ADC) 1602, digital filter cascade 1610, low pass filter 1614, splitting filter 1618, a first evaluation path 1620, a second evaluation path 1630, a high pass filter 1615, time domain energy estimator path 1660, and frequency domain energy and frequency estimator path 1670.

FIG. 17 shows another illustrative block diagram of a filter and processing arrangement 1700 that may be used to conduct a sound test according to an embodiment. Arrangement 1700 can include microphone signal 1701, analog-to-digital converter (ADC) 1702, first evaluation path 1720, second evaluation path 1730, time domain energy estimator path 1760, and frequency domain energy and frequency estimator path 1770.

Figure 14:
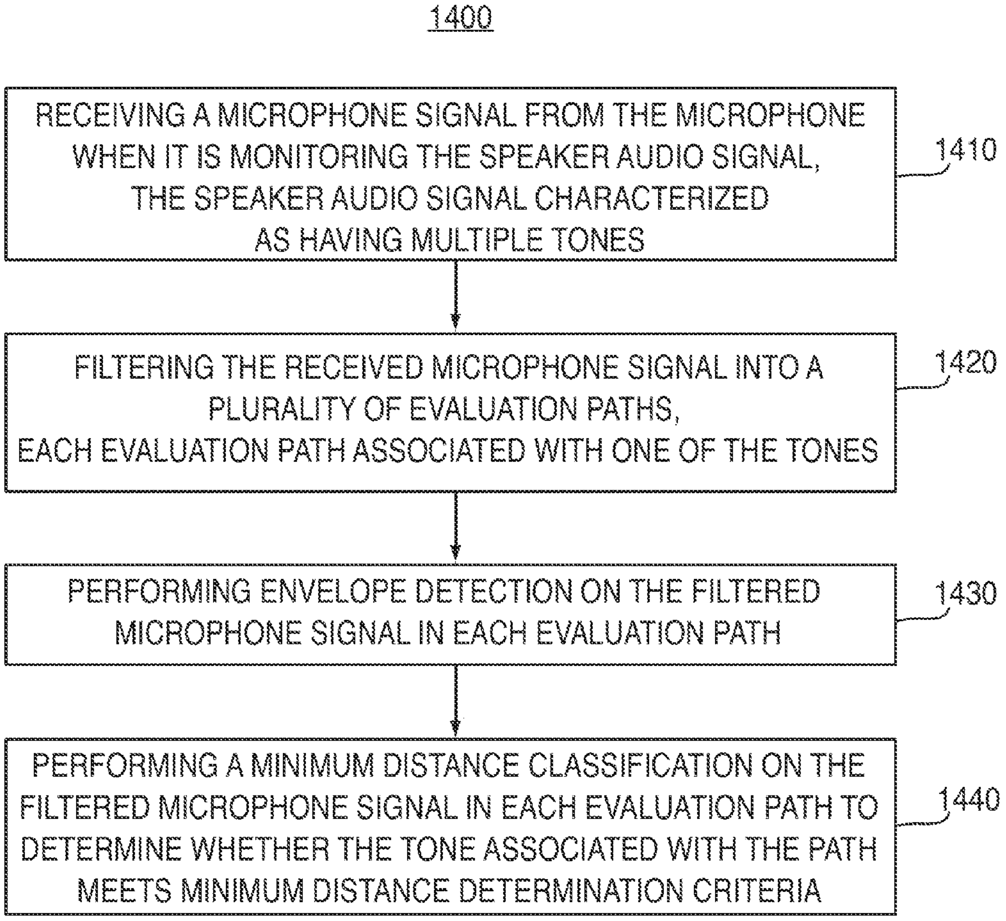
FIG. 14 shows an illustrative process for testing whether the speaker functions properly, according to an embodiment

FIG. 14 shows an illustrative process 1400 for testing whether the speaker functions properly, according to an embodiment. Starting at step 1410, a microphone signal can be received from the microphone when it is monitoring the speaker audio signal, the speaker audio signal characterized as having multiple tones. For example, the speaker may emit the boop1 and boop2 tones as discussed above, though it should be understood that any number of tones may be emitted. At step 1420, the received microphone signal can be filtered into a plurality of evaluation paths, wherein each evaluation path is associated with one of the tones. For example, in FIG. 16, splitting filter 1618 may split the received microphone signal into first evaluation path 1620 and second evaluation path 1630. As shown, splitting filter 1618 splits the microphone signal into two separate evaluation paths (one for each tone), but it should be understood that splitting filter 1630 can be configured to split the microphone into any number of evaluation paths, depending on how many tones are emitted as part of the speaker audio signal. Splitting filter 1618 may split a filtered microphone signal that is filtered by cascading filters 1610 and low pass filter 1614. Cascading filters 1610 may include programmable digital filters (e.g., notch filters) that are included as part of the analog to digital converter hardware. Filters 1610 may be programmed in a first configuration when the speaker is being tested, and may be re-programmed in a second configuration when the buzzer is being tested. Low pass filter 1614 may filter out out-of-band signals that are not of interest to the evaluation paths. For example, low pass filter 1614 may reject buzzer sounds emanating from neighboring hazard detection units.

Referring briefly to FIG. 17, each of evaluation paths 1720 and 1730 can receive a microphone signal directly from ADC 1702. Paths 1720 and 1730 may each include a filter (shown as filter 1721 and 1731, respective) that is tuned specifically for one of the tones emitted by the speaker. Filters 1721 and 1731 may be Goertzel filters, for example, that operate as a single frequency discrete Fourier transform.

Referring back to FIG. 14, at step 1430, envelope detection can be performed on the filtered microphone signal in each evaluation path. For example, in arrangement 1600, envelope detection may be performed by examining the absolute value of the filter microphone signal (at element 1621, applying a first order recursive smoothing function (element 1622) to the signal, and down sampling the signal at element 1623. Second evaluation path 1630 may include similar elements as path 1620, as shown.

At step 1440, a minimum distance classification can be performed on the filtered microphone signal in each evaluation path to determine whether the tone associated with the path meets minimum distance determination criteria. During this step, process 1400 can evaluate how close the filtered microphone signal is to the expected signal. When the difference between the two is a minimum, then it is inferred that the speaker correctly emitted that tone. For example, in arrangement 1600, a least absolute value distance may be calculated based on the down sampled signal and a reference (element 1629) at element 1624. The minimum distance calculation may be performed at step 1625. An advantage of using arrangement 1600 is that there is no need to calibrate.

Arrangement 1700 may also ascertain the minimum distance to determine whether the tone matches an expected signal profile. This is shown by elements 1722-1724 and 1732-1734, whereby the down sampled filtered microphone signal is compared to a template function to determine whether the minimum distance is obtained. Alternatively, arrangement 1700 can forgo the minimum distance determination and perform a threshold test (as shown by 1725 and 1735) to determine whether the speaker is correctly operating.

Figure 15:
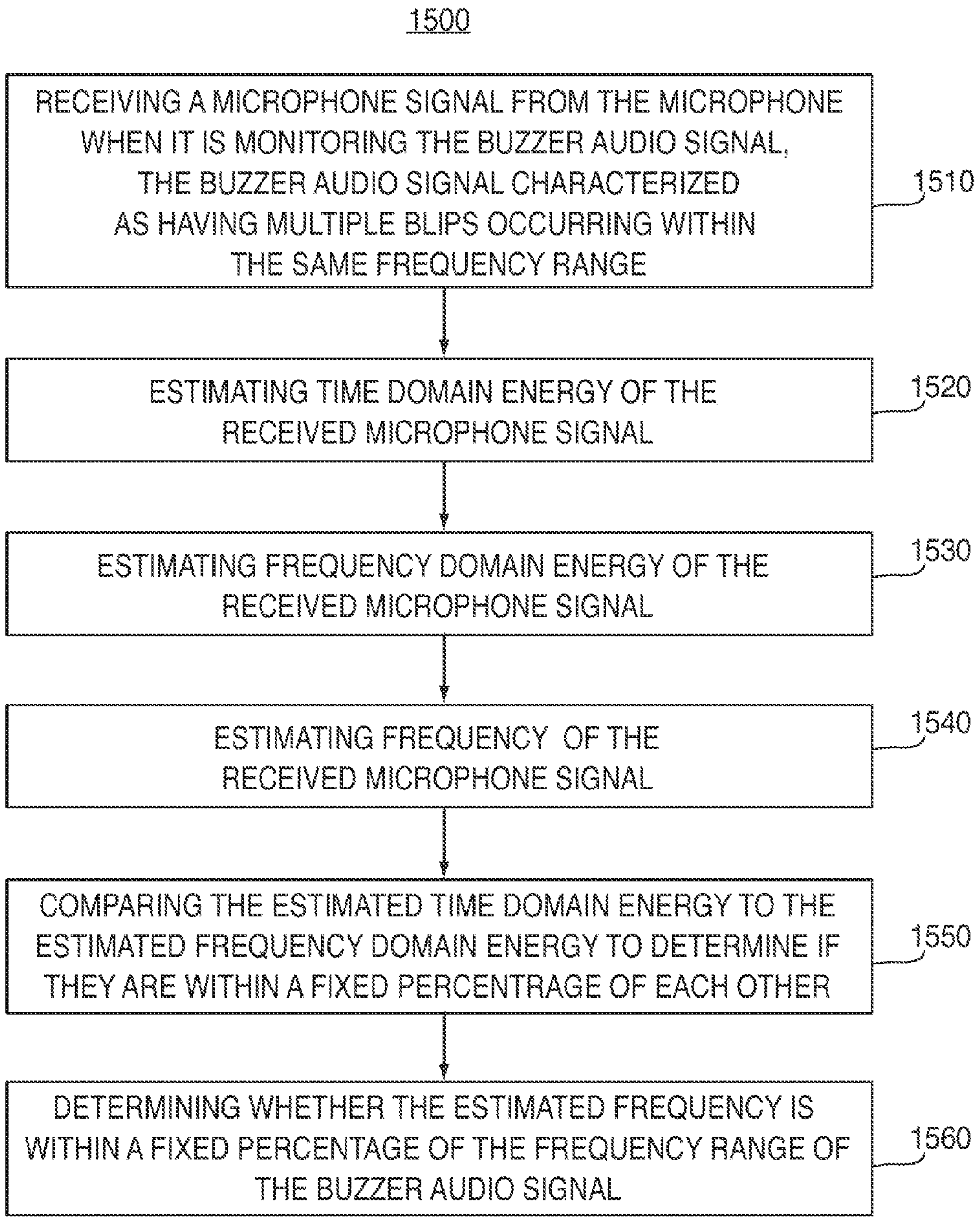
FIG. 15 shows an illustrative process for testing whether the buzzer works, according to an embodiment.

FIG. 15 shows an illustrative process 1500 for testing whether the buzzer works, according to an embodiment. Starting at step 1510, a microphone signal can be received from the microphone when it is monitoring the buzzer audio signal, the buzzer audio signal characterized as having multiple Bips occurring within the same frequency range. For example, the buzzer may operate between 3-3.5 kHz. At step 1520, the time domain energy of the received microphone signal can be estimated. For example, in arrangement 1600, the time domain energy can be derived from buffered filtered microphone signals. That is, the microphone signal may be filtered by the filter cascade 1610 to provide a second filtered microphone signal that is filtered by high pass filter 1615. High pass filter 1615 may reject out-of-band noise that is not germane to the buzzer signal. The second filtered microphone signal is provided to buffer acquisition trigger path 1660, which can apply a smoothing function (element 1662) to the absolute value (element 1661) of the second signal. The second signal can then be applied to a threshold trigger (element 1663) that passes samples that exceed a threshold (e.g., signals having a magnitude exceeding 110 dbSPL) to a buffer. The samples stored in the buffer can be used to estimate the time domain energy of the buzzer audio signal. Arrangement 1700 of FIG. 17 may estimate the time domain energy of the buzzer audio signal by evaluating microphone signals received from ADC 1702.

At step 1530, the frequency domain energy of the received microphone signal can be estimated. For example, in FIG. 16, the frequency domain energy can be obtained in frequency domain energy and frequency estimator path 1670. The second filtered microphone signal can be buffered (at element 1671) and samples contained therein can be applied to a discrete Fourier transform (at element 1672), the output of which can be used to estimate the frequency domain energy (at element 1673). In FIG. 17, the frequency domain energy can be obtained in frequency domain energy and frequency estimator path 1770. Path 1770 may include filter bank 1771 that produces several discrete Fourier transform results (one result for each filter comprising the bank) across the frequency range of the buzzer audio signal. The frequency domain energy can be obtained based on these results.

At step 1540, the frequency of the received microphone signal can be estimated. In arrangement 1600, the frequency of the buzzer audio signal can be determined by finding the maximum frequency output by element 1672 (at element 1674). Similarly, in arrangement 1700, the frequency estimate can be obtained from filter 1771.

At step 1550, the estimated time domain energy can be compared to the estimated frequency domain energy to determine if they are within a fixed percentage of each other, as illustrated in element 1780 (but omitted from FIG. 16 to avoid overcrowding the drawing). This comparison can be made to verify that the detected time domain and frequency domain energy are in-band. For example, if the time domain and frequency domain estimated energies are within a predetermined percentage of each other, they may be considered in-band and that the buzzer is operating properly, otherwise they may be considered out-of-band and that the buzzer is not operating properly.

At step 1560, it is determined whether the estimated frequency is within a fixed percentage of the frequency range of the buzzer audio signal. This determination is shown in element 1790 (but omitted from FIG. 16 to avoid overcrowding the drawing). This determination verifies whether the buzzer is operating within a predetermined range of acceptable buzzer operating frequencies. If it is operating within the predetermined range, then the buzzer may be considered to be operating at the correct frequency, and if not, then it is not considered to be operating at an acceptable frequency.

The above discussion relating to FIGS. 14-17 rely on signals picked up by a microphone. It should be appreciated that concepts taught in connection with FIGS. 14-17 can be used to verify operation of two of more buzzers operating within hazard detection units. For example, one buzzer may sound at around 3 kHz and another buzzer may sound around 520 Hz. In other embodiments, a microphone may not be necessary to verify the operation of a buzzer and/or speaker. Moreover, a user may desire that the microphone be turned off to enhance their feelings from a privacy perspective. Various alternatives to using a microphone to verify the operation of a buzzer and/speaker are now discussed.

In one approach, an on-board ultrasonic sensor may be used to verify the operation of a buzzer. Although the ultrasonic sensor is typically tuned at detect signals (e.g., about 40 kHz) above the normal range of human hearing, it can pick up higher harmonics of the 3-3.5 kHz base frequency of the buzzer, thereby validating its operation. As such, a hazard detection system can test whether its alarm is sounding at the appropriate loudness without using a microphone. Because the buzzer is really, really loud (e.g., more than 85 db), it tends to generate a strong acoustic and electromagnetic signal within other sensors. In one implementation, the buzzer can sounds at 85 dB @ 3 m, at a frequency of 3 kHz. An ultrasonic transducer (which may be used for other purposes in the hazard detection system) may be tuned to emit and detect signals at 40 kHz. When the buzzer sounds, the 11th and 12th harmonics (33 kHz and 36 kHz) of the loud sound are both within the detection range of the ultrasonic transducer. The buzzer may have a complex (harmonic-full) waveform, and thus the 11th and 12th and further harmonics are also quite loud, and thus, the ultrasonic transducer can verify that the buzzer is operating at the appropriate loudness during a sound check. Advantageously, no additional circuitry is required for the transducer to clearly indicate that the buzzer is sounding. (Remarks supra.)

In another approach, an accelerometer can be used to verify that the buzzer is operating at the appropriate sound level. Because the buzzer sounds at very high sound pressure levels, this can produce a vibration with the hazard detection system. The accelerometer can detect this vibration and provide signals representing the vibration. The signals can be evaluated to determine whether the buzzer is functioning properly.

In yet another approach, in hazard detection systems that have two buzzers contained therein, one buzzer may be used as a "microphone" while the other sounds its alarm, and vice versa. Again, because the sound pressure levels emitted by both buzzers are so high, the acoustic energy emitted by one buzzer may be detected by the other detector. This concept may be extended to scenarios where multiple hazard detection systems exist within a structure. A first hazard detection may sound its buzzer and the buzzer in a second hazard detection system, and vice versa. In this extended scenario, because the buzzer in both system are tuned to emits signals in same general range (e.g., 3-3.5 kHz), they may be able to better recognize each other's resonant frequency.

In still yet another approach, hazard detection system may leverage use of a microphone located in a device remotely located from the hazard detection system. For example, a mobile device such as telephone has a microphone. When performing a sound check, the hazard detection system establish a communication with the mobile device (e.g., using Bluetooth Low Energy protocol) and instruct it to listen for sounds being emitted by the speaker and/or buzzer. The mobile device can listen for the sounds and evaluate them to determine whether the sound check passed. Alternatively, the mobile device can record the sounds being emitted by the hazard system and provide them to a service for further evaluation and reporting.

In yet another approach to enhance the rejection of environmental noise, the parameters of the boop1, boop2, Bip1, Bip2 signal may be varied in a fashion such that the perceived experience of the occupant is the same (or similar), but each instance of the signals is different enough to allow robust discrimination of the self-administered stimulus and environmental noises that can cause erroneous results. The signal parameters that may be varied include the frequency of the signals, modulation impressed on the signals, the spectrum of each individual signal, and the relative duration of each portion of each signal, such as the attack, sustain, and decay of each signal. In practice, it is often easiest to make use of this benefit by changing the duration between various epochs of the signals, such as the duration between the starting epochs of boop1 and boop2, or, similarly, Bip1 and Bip2. The signal parameters chosen for variation may be changed by a fixed schedule, a schedule received from the fabric network, or a varying schedule determined by algorithmic means, e.g., a pseudo-random number generator.

Figure 18:
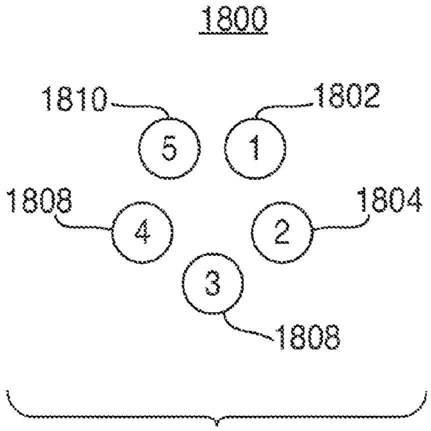
FIG. 18 is an illustration of the arrangement pattern of LED lights on a hazard detector, according to an embodiment.

FIG. 18 is an illustration of the arrangement pattern of LED lights on a hazard detector, according to an embodiment. This representation includes five light elements 1802, 1804, 1806, 1808 and 1810. Light elements 1800 may be turned on and off according to a number of patterns and each may cycle through different hue ranges. The color of each light element may also vary in order to provide an additional variety of visual effects.

Figure 19:
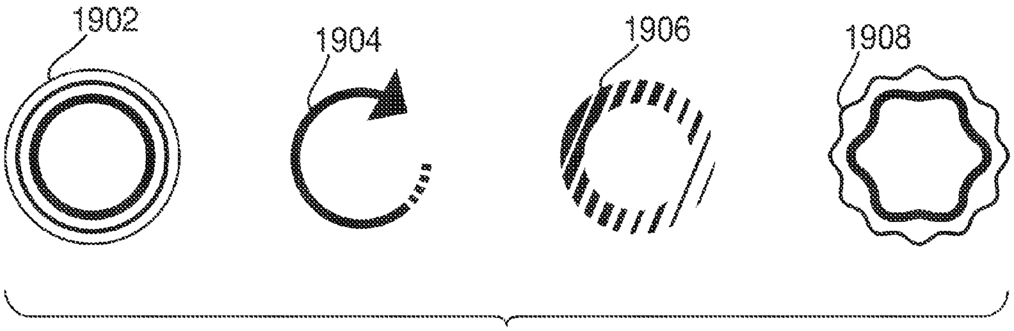
FIG. 19 is an illustration representing four different visual effects that can be generated by a hazard detector, according to an embodiment.

FIG. 19 is an illustration representing four different visual effects that can be generated by a hazard detector, according to an embodiment. Visual effect 1902 is a representation of a pulsing effect that may be created when all of lights elements 1802, 1804, 1806, 1808 and 1810 (shown in FIG. 18) are turned on and off simultaneously. Alternatively, all of light elements 1802, 1804, 1806, 1808 and 1810 may increase and decrease the brightness of the light produced in a synchronized fashion to create a pulsing effect.

Visual effect 1904 represents a rotating effect that can be created when all of light elements 1802, 1804, 1806, 1808 and 1810 are turned on and off sequentially in a clockwise direction. In one embodiment, turning on and off the lights can be done in a gradual fashion. For example, light element 1804 can gradually turn off and light element 1802 gradually turns on while light elements 1806, 1808 and 1810 are turned on at an equal brightness.

Visual effect 1906 represents a wave visual effect that can be created when light elements 1800 (shown in FIG. 18) turn on and off in a side-to-side direction. For example, at a given point in time, light element 1810 is the brightest, light elements 1808 and 1802 are the next brightest, and light elements 1806 and 1804 are the least bright. Shortly thereafter, the lights may gradually change brightness in a linear manner such that light elements 1804 and 1806 are the brightest, lights 1808 and 1802 are the next brightest, and light 1810 is the least bright.

Visual effect 1908 represents a shimmer visual effect that can be created when each of the light elements 1800 cycle through a hue range pattern, with each light element's hue range pattern being out of sync with all the other lights.

Figure 20:
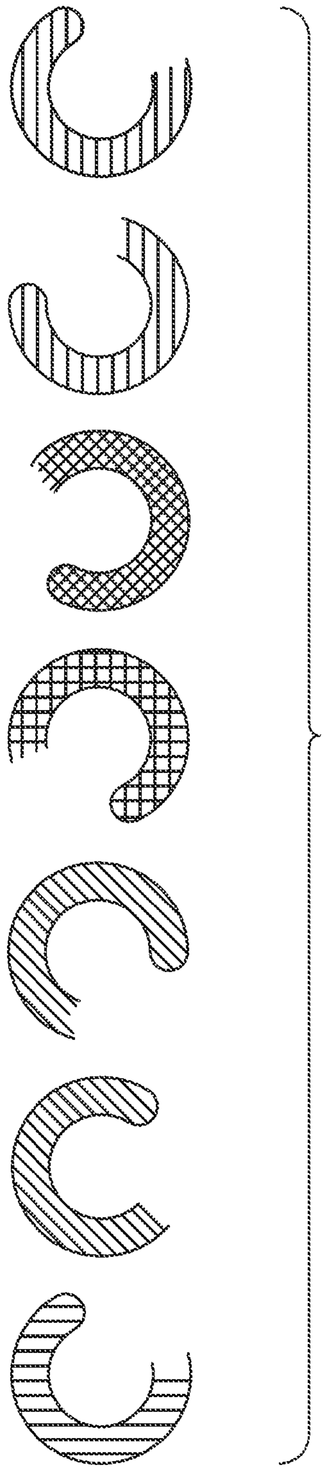
FIG. 20 is an illustration of a rotating visual effect that can be generated by a hazard detector, according to an embodiment.

FIG. 20 is an illustration of a rotating visual effect that can be generated by a hazard detector, according to an embodiment. FIG. 20 provides a further illustration of the rotating visual effect 1904 of FIG. 19. Viewed from left to right, FIG. 20 shows new lights turning on at one end of the rotating visual effect and other lights gradually turning off at the other end of the rotating visual effect. The hatch patterns of each of the sequential representations illustrate how the rotating light may change color during the rotation sequence. Although light elements 1802, 1804, 1806, 1808 and 1810 may each be a different color individually, the colored light mixing causes the color of the rotating visual effect to constantly change during the course of the visual effect.

Figure 21:
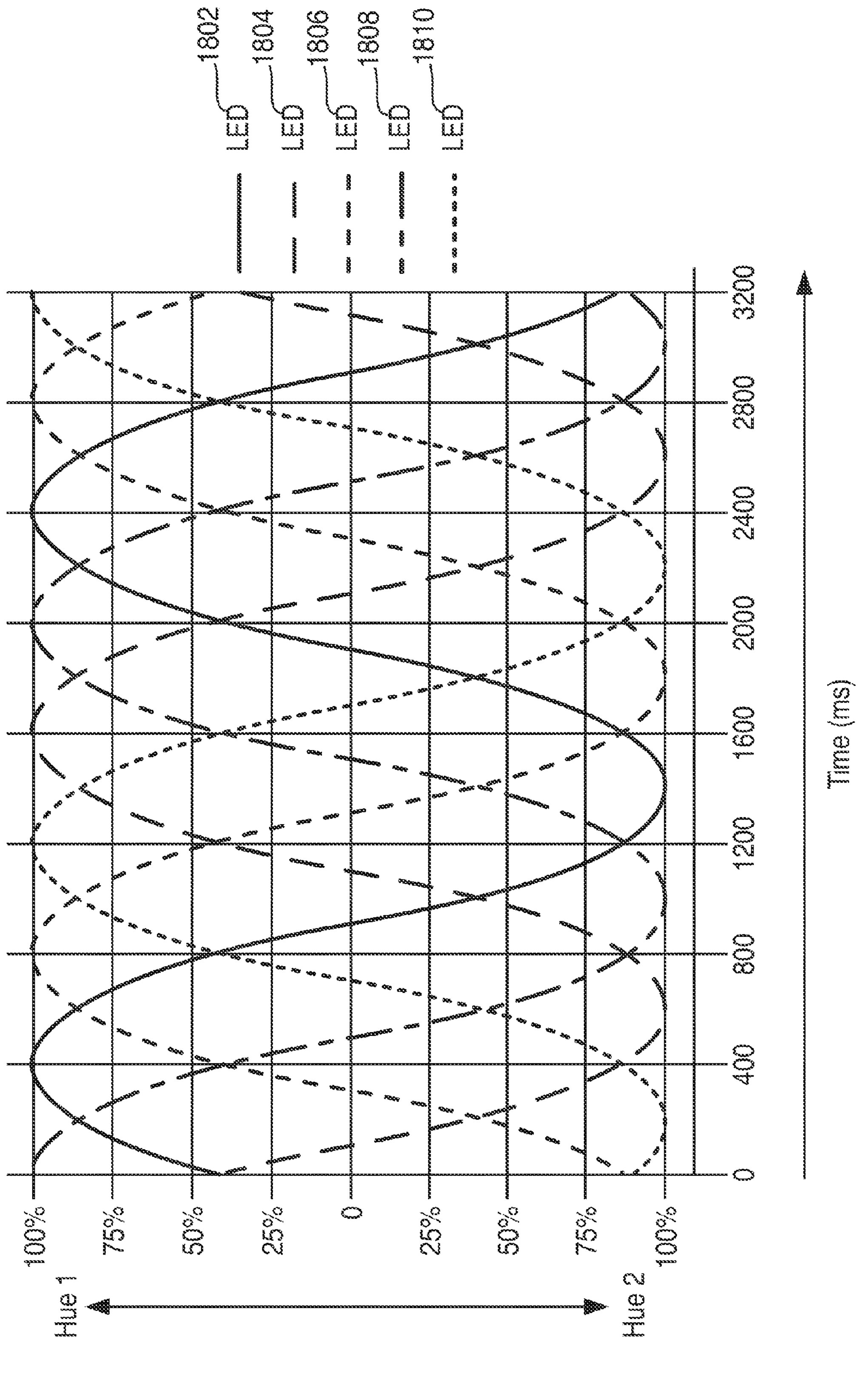
FIG. 21 is an illustration of the different hue range patterns associated with each light, according to an embodiment.

FIG. 21 is an illustration of the different hue range patterns associated with each light element for a shimmering visual effect that can be generated by a hazard detector, according to an embodiment. The extent to which the lights 1802, 1804, 1806, 1808 and 1810 are out of sync may be varied in order to produce variations of the shimmering visual effect.

In various embodiments, the visual effects described above can be varied in a number of different ways. For example, each effect may be animated faster or slower, brighter or dimmer, for a specific number of animation cycles, with only some of the light participating, and using different colors, e.g., white, blue, green, yellow and red. These visual effects can be generated by a hazard detector for a variety of purposes. For example, a specific color, animation, animation speed, etc. or combinations thereof can represent one or more of the following alerts or notifications provided by a hazard detector: booting up, selecting language, ready for connections, connected to client, button pressed, button pressed for test, countdown to test, test under way, test completed, pre-alarms, smoke alarms, carbon monoxide alarms, heat alarms, multi-criteria alarms, hushed after alarm, post-alarm, problems, night light state, reset, shutdown begin, shutdown, safely light, battery very low, battery critical, power confirmation, and more.

Figure 22A:
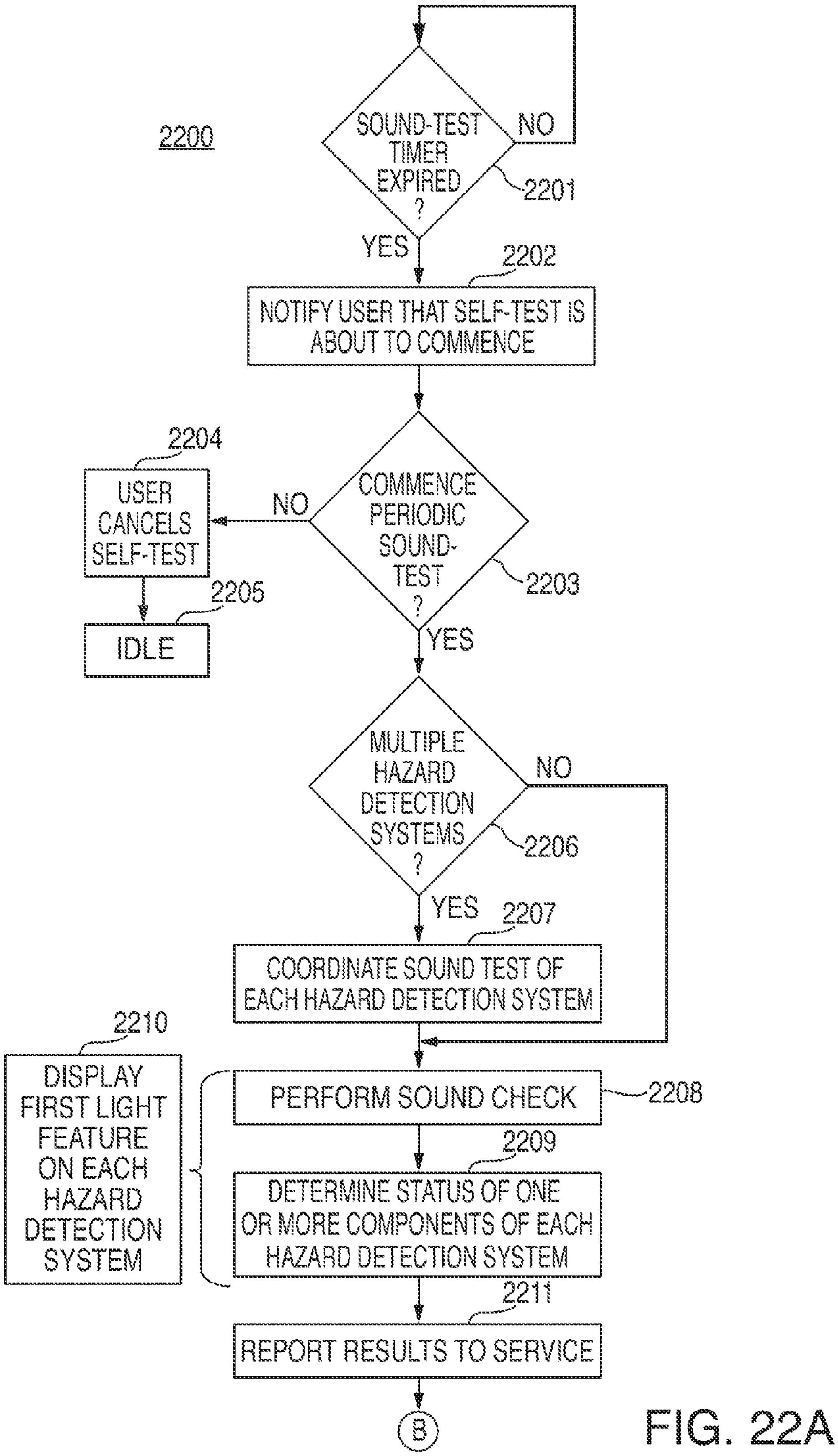
FIGS. 22A-22B illustrate an embodiment of a method for outputting a status based on user input and the criticality of the status during a sound check, according to an embodiment.
Figure 22B:
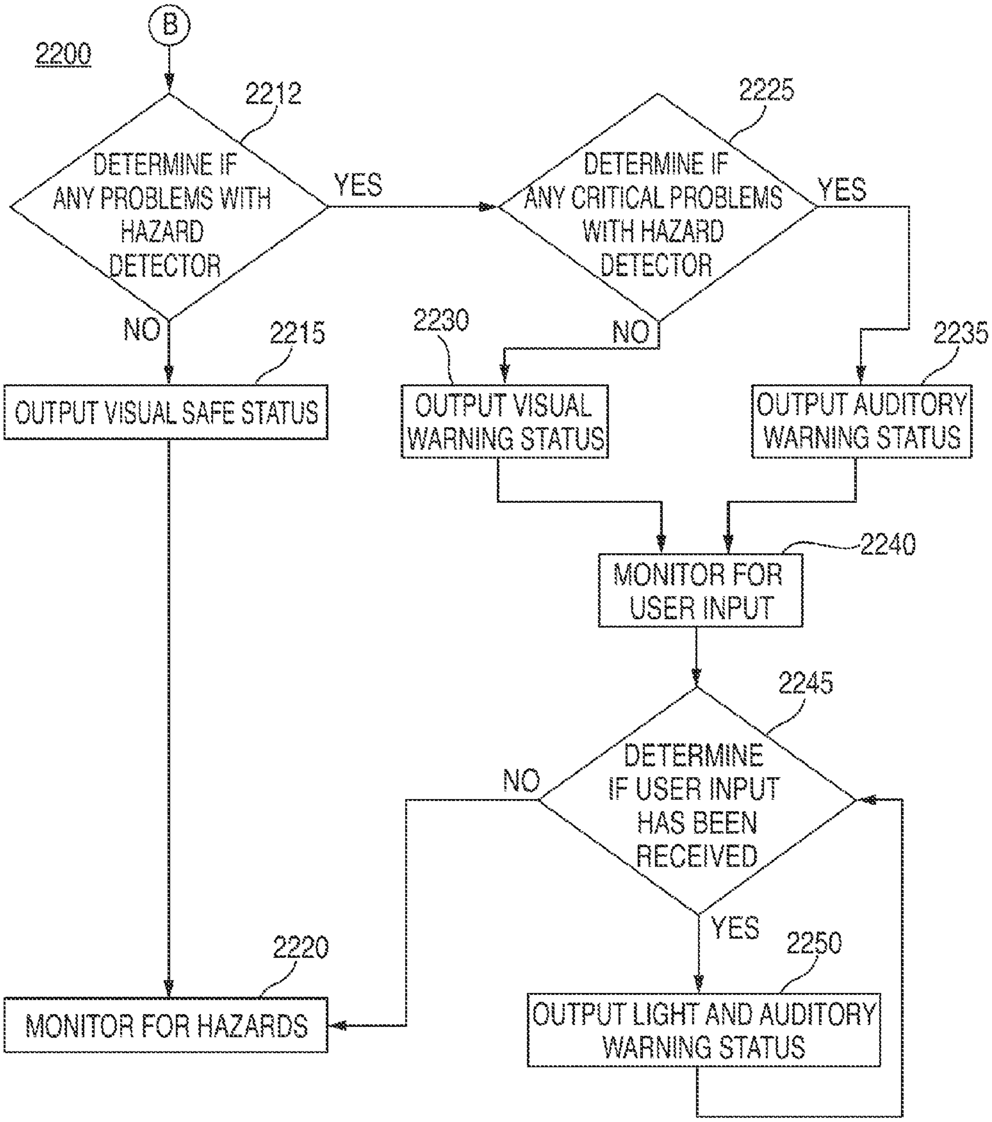

FIGS. 22A-22B illustrate an embodiment of a method 2200 for outputting a status based on user input and the criticality of the status during a sound check, according to an embodiment Method 2200 represents various blocks which may be performed by a hazard detector, such as the hazard detector and/or other devices detailed above. Starting at block 2201, a determination is made whether a sound test timer has expired. If the determination is NO, method 2200 may loop back to the start of black 2201. If the determination is YES, the user may be notified that the test is about to commence. For example, the user may be notified via a push notification on his or her mobile device. At block 2203, a determination is made whether to commence the sound test. For example, a user may be afforded a fixed period of time to cancel or affirm the sound test. If the user cancels the sound test at block 2204, process 2200 may idle at step 2205. If the user affirms the sound test or fails to cancel within the fixed period of time, process 2200 may proceed to block 2206.

At block 2206, a determination is made whether multiple hazard detection systems exist within a common structure or address. If the determination at block 2206 is NO, method 2200 proceeds to block 2208. If the determination is YES, method 2200 may coordinate the sound test of each hazard detection system, at block 2207. Such coordination may be implemented using the process described above in connection with FIGS. 9-11.

At block 2208, a self-administered sound test according to embodiments described herein can be performed. For example, the sound test may determine whether the speaker and buzzer operate properly. Optionally, after block 2208, method 2202 may determine the status of one or more components of the hazard detector may be performed at block 2209. The status check of blocks 2208 and 2209 may be divided up into an analysis of critical and non-critical status checks. Non-critical status checks may include determining if the battery is below a first threshold charge level, a message being present at a remote server in association with a user account linked with the hazard detector, the hazard detector is disconnected from the Internet (and was previously connected), the hazard detector is disconnected from a structure's power supply (and was previously connected), and/or some other problem occurred (an alphanumeric code may be assigned to such other problems). Critical status checks may include determining if the hazard detector has expired, determining if a hazard sensor has failed, and/or determining if the battery charge level is below a second threshold (which is representative of a lower charge level than the first threshold associated with the non-critical battery charge level).

Commensurate with the execution of blocks 2208 and 2209, method 2200 may cause the hazard detection system to display a first light feature, at block 2210. For example, during the status check, a blue rotating light may be displayed.

The results of the status checks at blocks 2208 and 2209 may be reported to a service (at block 2211) so that the service can update information being displayed, for example, on a user's mobile device.

If at block 2212, no status check results in a critical or non-critical status having a negative result, method 2200 may proceed to block 2215. At this block, a visual indication of there being no critical or non-critical status may be output, such as a green illumination of the light of the hazard detector using a calm animation, such as a pulse animation. Following block 2215, the hazard detector may not monitor for user input, such as a button press or gesture relevant to the status, and may proceed to block 2220 to continue to monitor for hazards.

If at block 2212, a status check results in a critical or non-critical status having a negative result (e.g., a sensor fails, the battery is low, Internet connectivity is lost, etc.), method 2200 may proceed to block 2225. At block 2225, if the status check resulted in a critical status, method 2200 may proceed to block 2235. At block 2235, an auditory warning status indicative of the critical status may be output. The auditory warning status may include a synthesized or recorded spoken message. The warning message may be accompanied by illumination of the hazard detector's light using a color indicative of a warning, such as yellow. An animation, such as a fast pulsing of the yellow light may be used to alert the user to the dangerous situation.

Returning to block 2225, if the status check resulted in a non-critical status, method 2200 may proceed to block 2230. At block 2230, a purely visual warning status indicative of the non-critical status may be output. The warning status may be illumination of the hazard detector's light using a color indicative of a warning, such as yellow. An animation, such as a slow pulsing of the yellow light may be used to alert the user to the quasi-dangerous situation. To learn the exact non-critical warning, the user may be required to provide user input.

At block 2240, user input, such as in the form of a button press of the hazard detector (or actuation of some other physical device on the hazard detector) or by a gesture being performed, may be monitored for by the hazard detector for up to a predefined period of time. For example, the hazard detector may monitor for input in response to the output status at blocks 2230 or 2235 for thirty seconds. If the user's presence is detected, the light of the hazard detector may be lit to indicate such presence, such as by illuminated or pulsing blue. At block 2245, it may be determined if input has been received. If no, method 2200 may proceed to block 2220. If yes, block 2250 may be performed.

At block 2250, the critical and/or non-critical statuses may be output via an auditory message. Such a message may include recorded or synthesized speech being output by the hazard detector. If the status was non-critical, block 2250 may be the first time the status is output via audio. If the status is critical, block 2250 may represent at least the second time the status is output via audio (due to block 2235). The auditory output may be accompanied by illumination of the hazard detector's light using a color indicative of a warning, such as yellow. An animation, such as a slow (for non-critical statuses) or fast (for critical statues) pulsing of the yellow light may be used to alert the user to the statues. Following block 2250, method 2200 may return to block 2245 to see if any additional user input is received, such as if the user wants the statuses to be repeated. Whether a gesture or a button push was performed by the user while block 2240 was being performed may alter how the hazard detector's light is lit at block 2250. For instance, if a button press was received at block 2240, the light may be lit blue and pulsed at a fast speed; if a gesture was detected at block 2240, the light may output a yellow wave animation (which may serve as an acknowledgement that the gesture was detected).

Figure 23A:
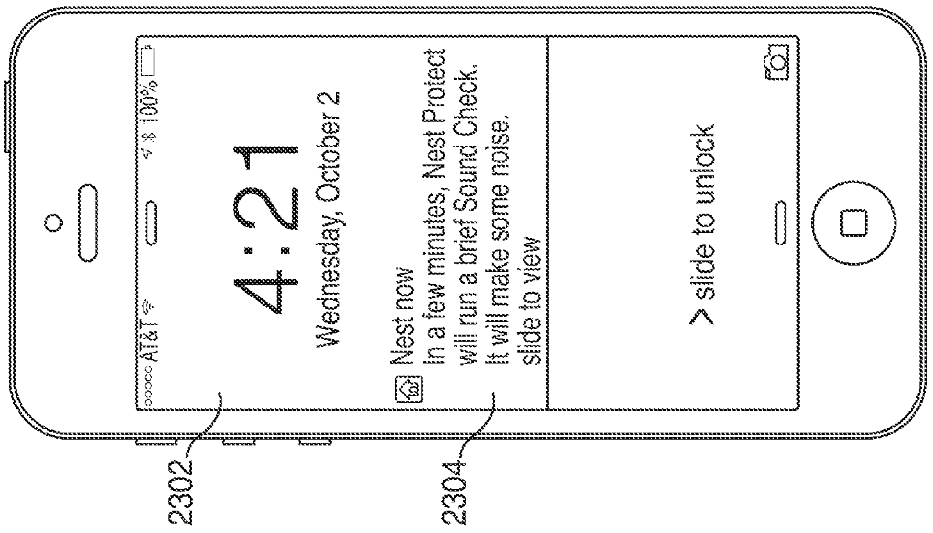
FIGS. 23A-23F show illustrative user interfaces on a mobile device, according to various embodiments.
Figure 23B:
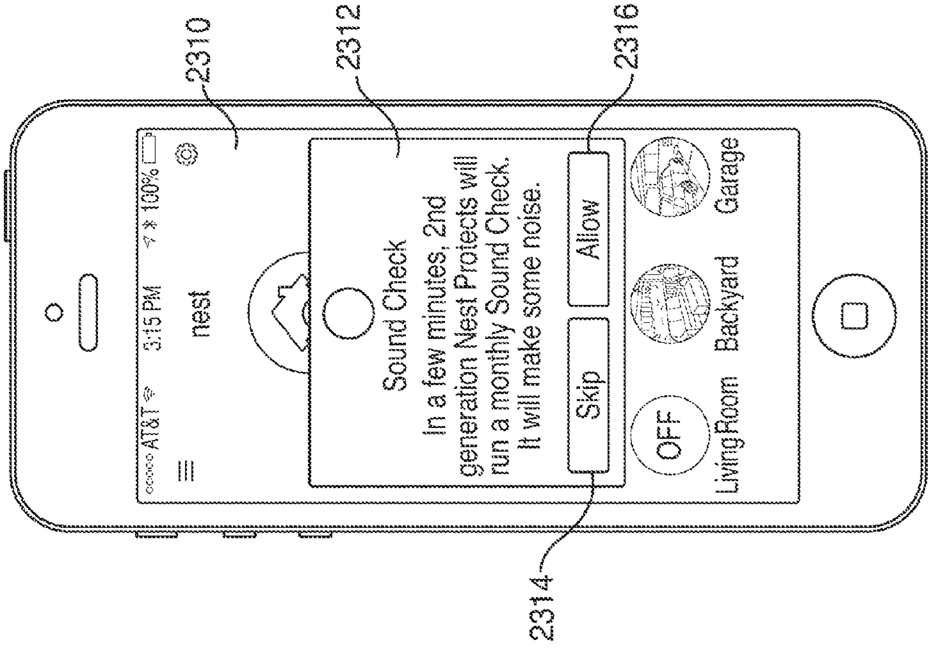
Figure 23D:
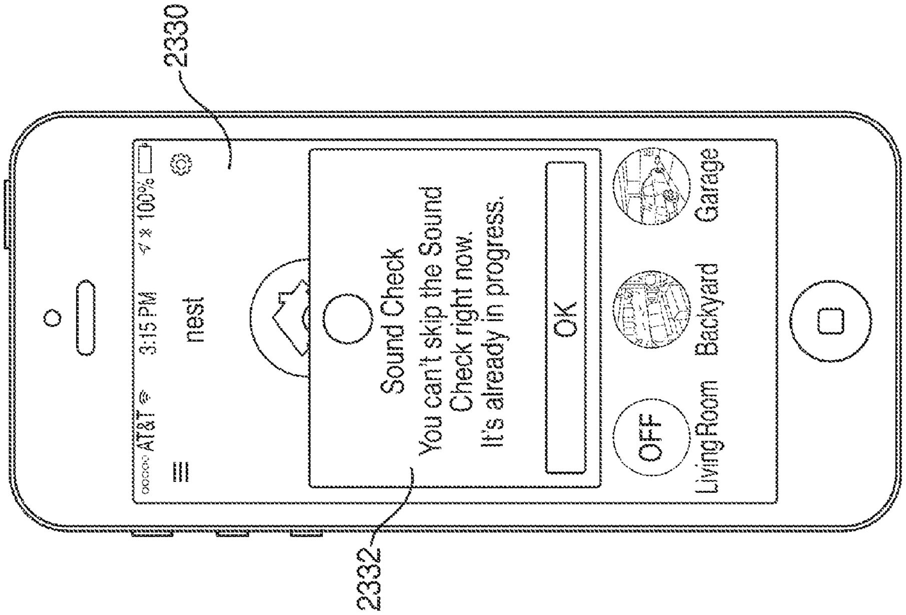
Figure 23C:
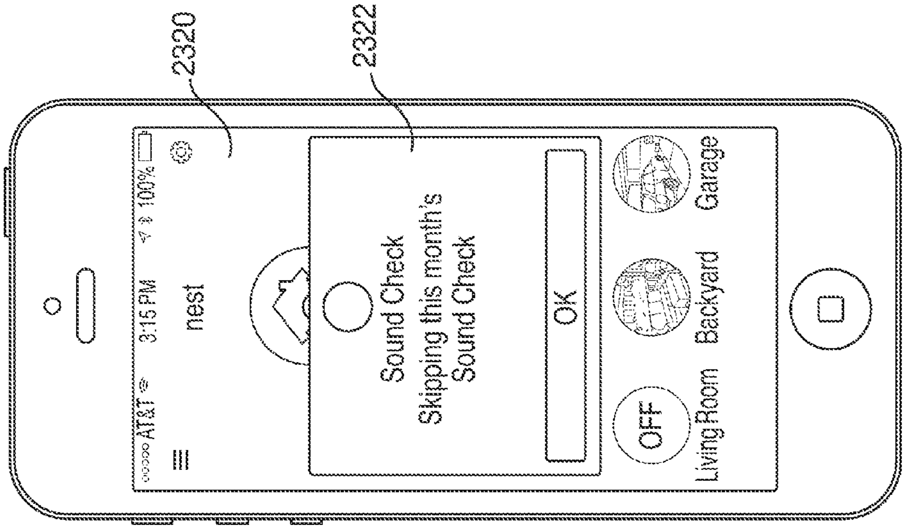

FIG. 23A shows an illustration of a user interface on a mobile device showing a push notification, according to an embodiment. At state 2302, the user interface can display notification 2304 that informs the user that a sound check is about to commence, and to warn the user that the sound check may make some noise. If desired, the user may opt to allow or cancel the sound check by interacting with the user interface. For example, FIG. 23B shows an illustration of the user interface where the user has accessed an application that permits control of the sound check. At state 2310, the user interface presents notification 2312 that provides a message and selectable options 2314 and 2316. If skip option 2314 is selected, and the sound check has not already commenced, the mobile device may present notification 2322, as shown in FIG. 23C. At state 2320, notification 2322 may indicate that this month's sound check is being skipped. If desired, the user may be presented with the option to define how long to delay the sound check. For example, the user may be permitted to delay the sound check by a hour or a day. If skip option 2314 is selected, and the sound check has already commenced, the mobile device may present notification 2332 at state 2330, as shown in FIG. 23D. Notification 2330 may inform the user that the sound check cannot be cancelled because it is already in progress.

Figure 23E:
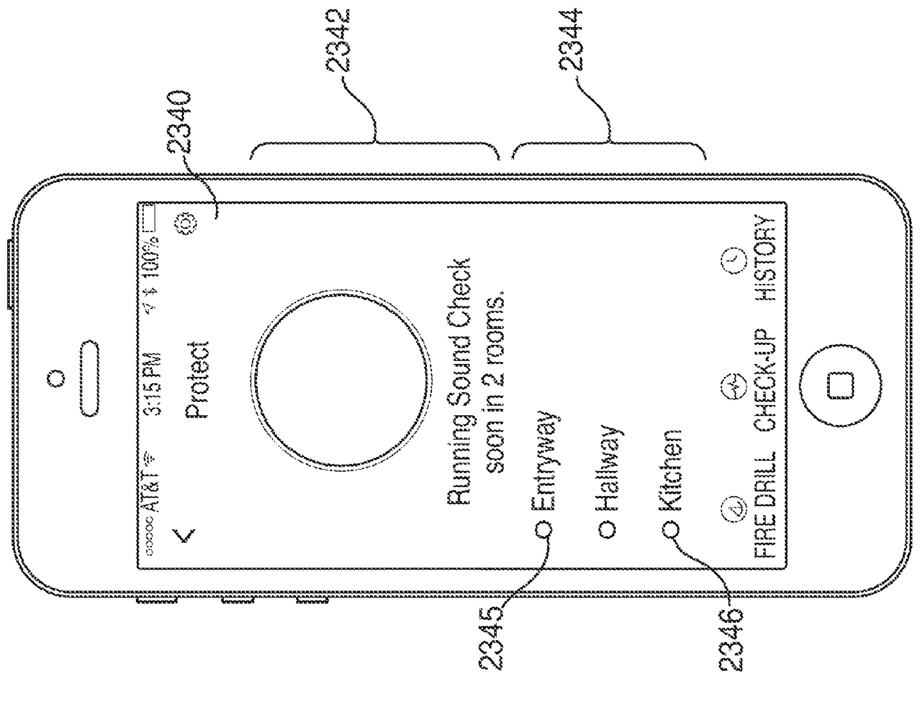

If allow option 2316 is selected at state 2310 of FIG. 23B, the mobile device may enter into state 2340, as shown in FIG. 23E. State 2340 may provide real-time graphical status of which hazard detection systems are performing a sound check. For example, state 2340 may include graphical element 2342 that graphically shows that the sound check is currently commencing. For example, graphical element 2342 may show a rotating light circle in a certain color (e.g., blue) to indicate the test is being performed. In addition, element 2342 may specify how many sound checks are being performed. State 2340 may also include hazard detection identifiers 2344 that specify status specific information for each hazard detection system. For example, three systems are shown (i.e., Entryway, Hallway, and Kitchen). Each system may have its own sound check status indicator 2345, which may be a graphical light representation of the sound check status of that hazard system. The status check indicator 2345 may replicate the light displays status currently being displayed by that hazard system. For example, status indicator 2345 may show a rotating blue light to signify that that system is currently undergoing a sound check. Status check 2346, for example, may show a solid green light to signify that the Kitchen's sound check is complete and passed. If, for example, the Kitchen's sound check experienced an issue, its status check 2346 may be displayed as a different color (e.g., orange) to signify that there is an issue. The user may select any one of the system identifiers 2344 to obtain additional information on that hazard system.

Figure 23F:
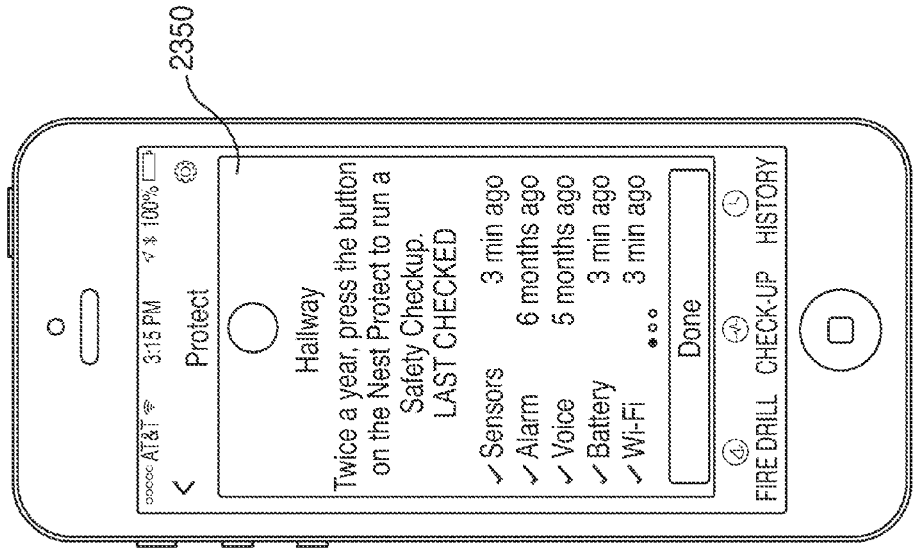

FIG. 23F shows an illustration of a user interface on a mobile device showing detailed status information of a particular hazard detection system selected in state 2340, according to an embodiment. At state 2350, the user interface can display the status of various components within the hazard detection system. For example, the status of the various components can be identified by a check (i.e., to signify the component is okay) or a hazard sign (i.e., to signify there may be problem with the component). In addition, in state 2350, the user interface may specify when the last test was performed on a particular component. For example, the sensors, battery, and Wi-Fi are shown to have been tested "3 min ago" but the Alarm and the Voice were tested "6 months ago".

Figure 24B:
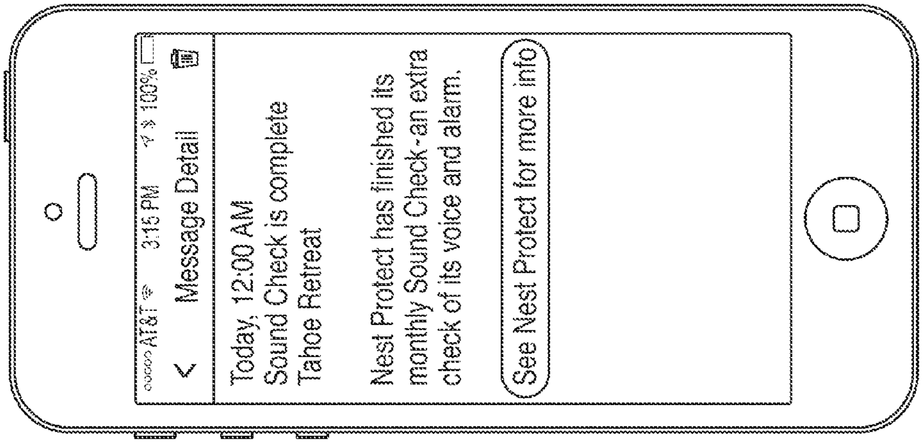
FIGS. 24A-24C show illustrative user interfaces on a mobile device, according to various embodiments.
Figure 24A:
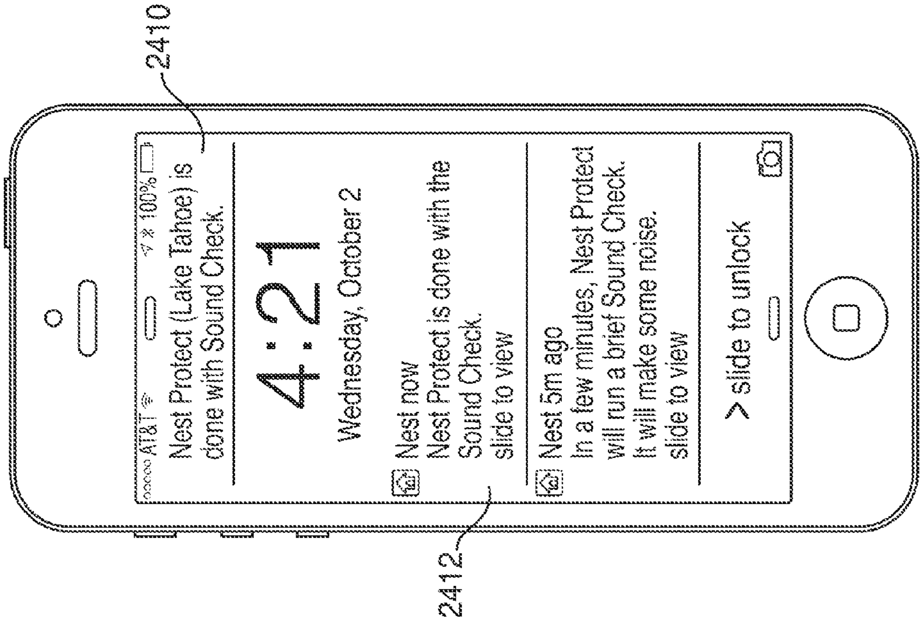
Figure 24C:
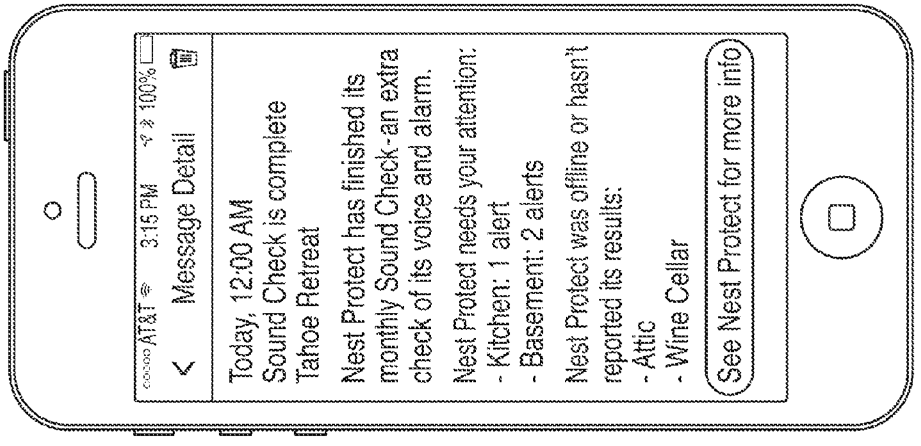

FIG. 24A shows an illustration of a user interface on a mobile device showing another push notification, according to an embodiment. State 2410 can include notification 2412, which may show a message on the user's mobile device indicating that the sound check is complete. If the user selects notification 2412, the mobile device may present a message detail, as illustrated in FIG. 24B or FIG. 24C. The message detail may provide relatively detailed information relating to the hazard detection systems. For example, in FIG. 24B, the message detail may specify that the sound check is complete. No additional information may be provided because all of the hazard detections systems passed their sound check. However, in FIG. 24C, additional information may be provided to indicate which systems have alerts and which systems have not provided their results or are offline.

Figure 25A:
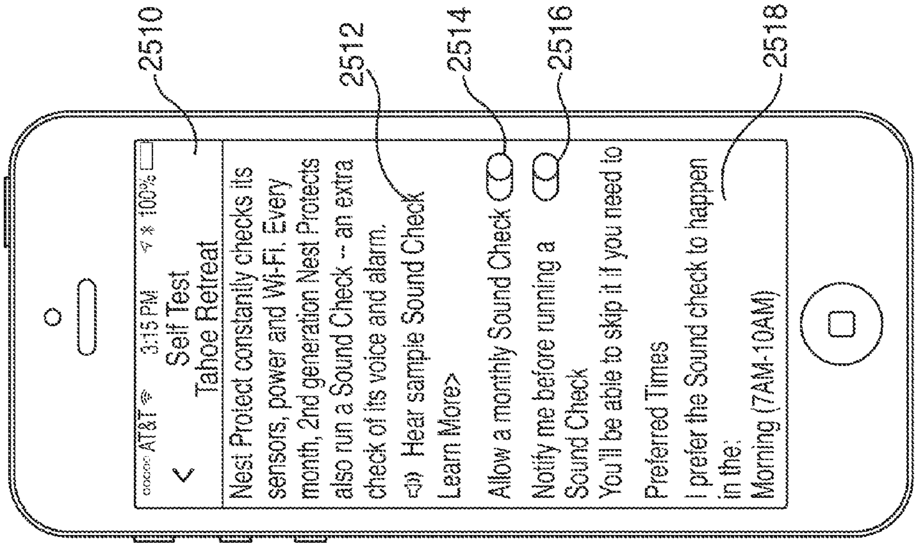
FIGS. 25A-25B show illustrative user interfaces on a mobile device, according to various embodiments.
Figure 25B:
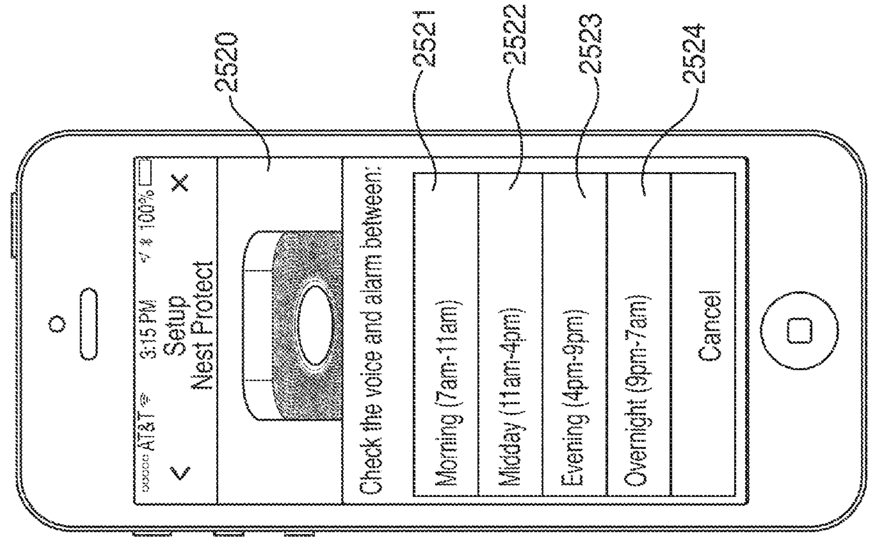

FIG. 25A shows an illustration of a user interface on a mobile device showing a sound test setting screen, according to an embodiment. State 2510 can include selectable elements 2512, 2514, 2516, and 2518. Selectable element 2512 may enable a user to hear a sample sound check. For example, the sample sound check may mimic what the actual sound test may sound like, but may not include the blaringly loud buzzer sound. Selectable element 2514 may be user selectable option for enabling a periodic sound check to be performed. When element 2514 is turned on, the sound check may be performed on a periodic basis. In some embodiments, the user may be able to define the periodic basis. For example, the user may select a monthly basis, quarterly basis, or semi-yearly basis. Selectable element 2516 may enable a user to define whether to be notified before a sound check is performed. Selectable element 2518 may enable a user to define a time frame for when the sound check can be performed. For example, when the user selects element 2518, the mobile device may display state 2520 of FIG. 25B. In state 2520, the user may select one of predefined time frames 2521-2524 as a time for the sound test to be performed. In another embodiment (not shown), a user may be provided with an option to manually define a time frame during which the sound test can be performed.

Figure 26A:
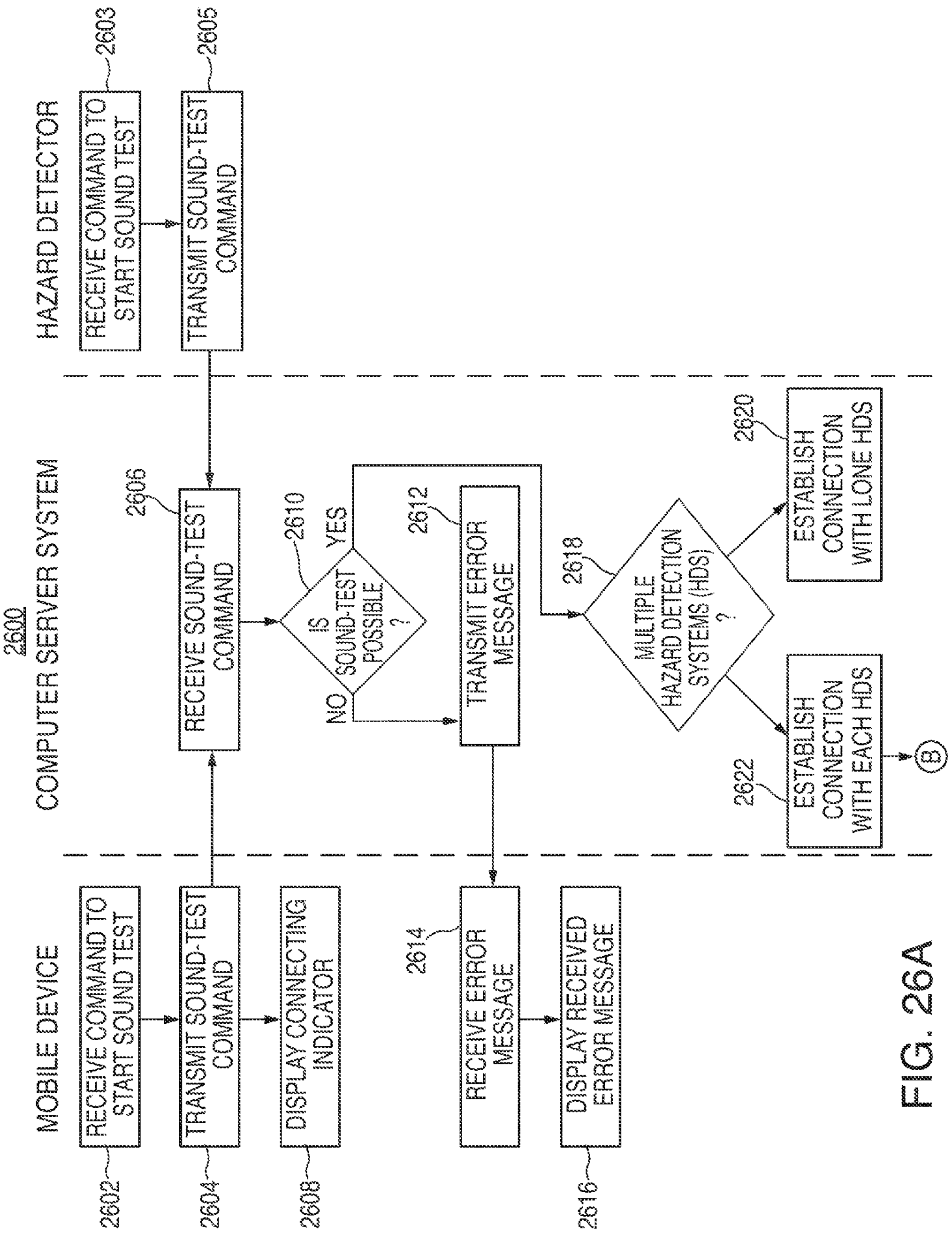
FIG. 26A-26C is an interaction flowchart of one embodiment of a process for conducting a sound test of a hazard detector on a mobile device remote from the hazard detector, according to an embodiment.
Figure 26B:
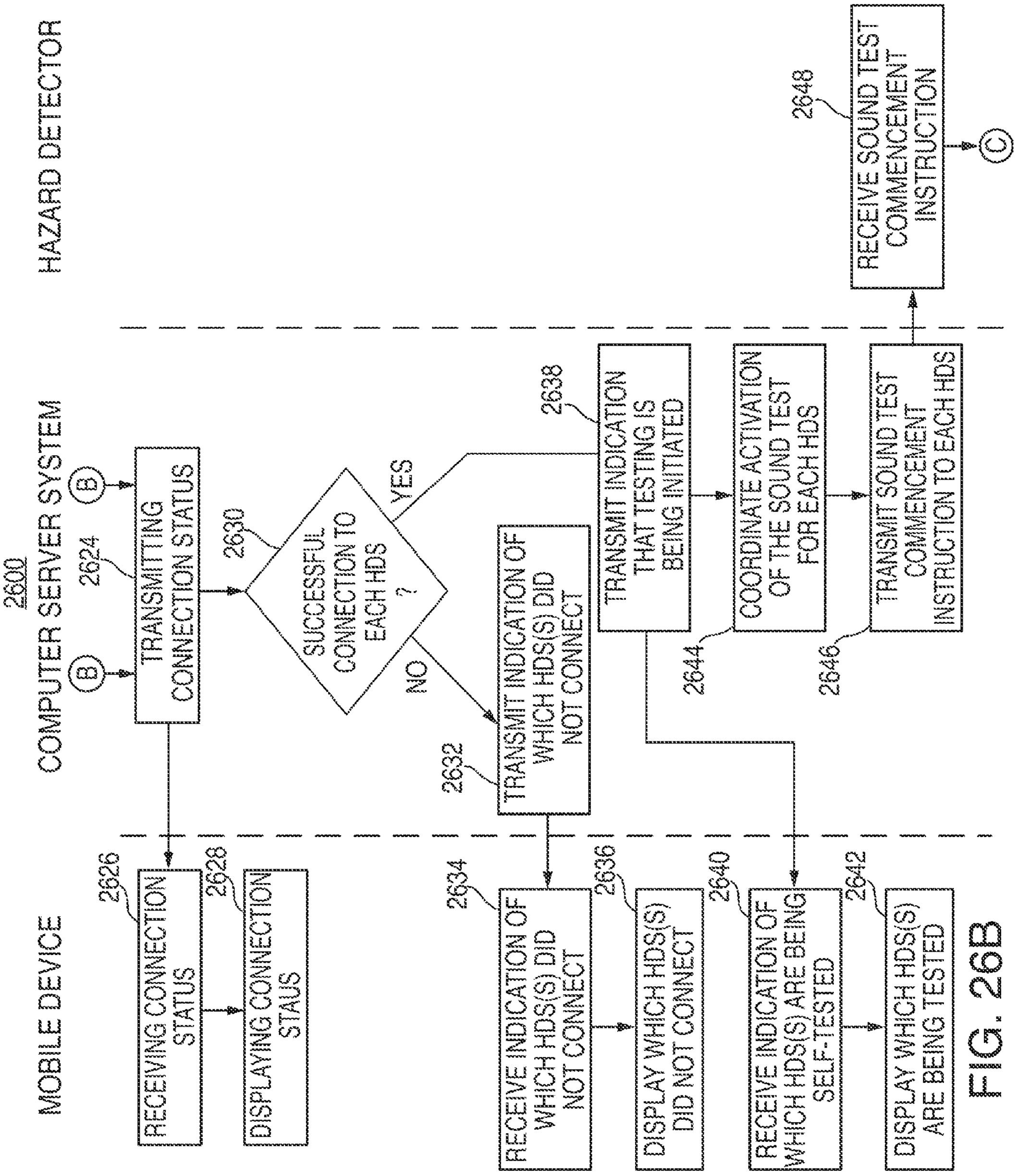
Figure 26C:
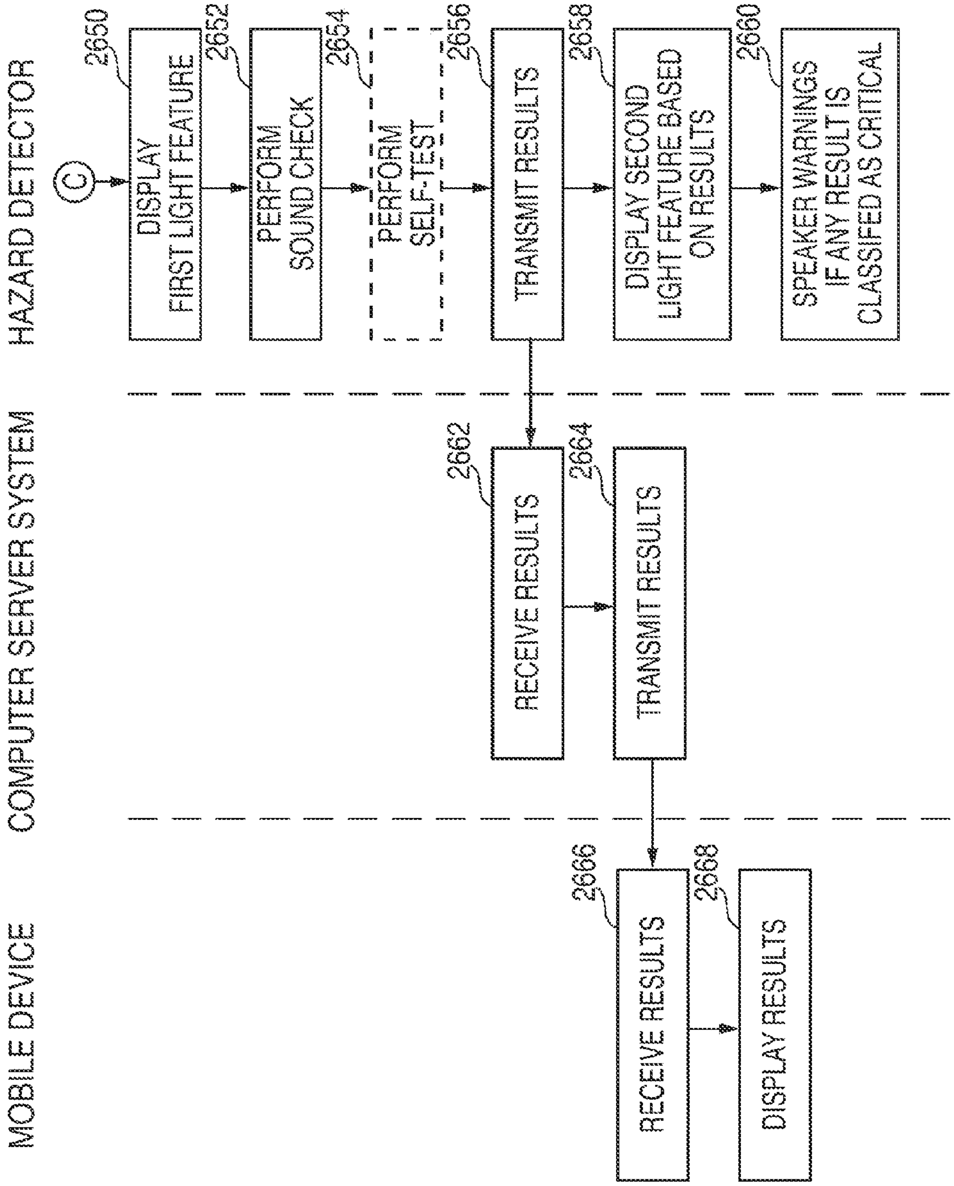

FIGS. 26A-26C is an interaction flowchart of one embodiment of a process 2600 for conducting a sound test of a hazard detector on a mobile device remote from the hazard detector. The flow chart illustrates the interactions between three components: a mobile device, a computer server system, and a hazard detector.

At block 2602, the mobile device receives a command to start a sound check. For example, a user may select an initiate sound check icon being displayed on the mobile device after accessing an application or interacting with a push notification. See FIG. 27A as an illustrative example.

At block 2604, the mobile device may transmit a sound check command to the computer server system. Alternatively, at block 2603, the hazard detector may receive a command to start a sound check. The sound check command may be transmitted to the computer server at block 2605. At block 2608, the mobile device may display a connecting indicator to show that a connection is being made with one or more hazard detection systems. See FIG. 27B as an illustrative example.

At block 2610, the server system may determine whether a sound test can be performed. If the determination is NO, an error message is transmitted to the mobile device at block 2612. At block 2614, the error message is received and displayed at block 2616. If the determination at block 2610 is YES, process 2600 determines whether multiple hazard detection systems exist at block 2618. If NO, a connection is established with the loan hazard detection system at block 2620, and if YES, a connection is established with each hazard detection system. At block 2624, the connection status may be transmitted to the mobile device.

At block 2626, the mobile device receives the connection status and displays the status at block 2628. At block 2630, the computer server system determines whether a successful connection is made to each hazard detection system. If the determination is NO, it may transmit (to the mobile device) an indication of which hazard systems did not connect. The mobile device can receive that indication at block 2634 and display which systems did not connect at block 2636. If the determination at block 2630 is YES, the computer server may transmit an indication that testing is being initiated. The mobile device may receive this indication at block 2640 and display which hazard systems are being tested. For example, the mobile device may display a rotating blue light adjacent to the name of each hazard system being tested, similar to what is shown in FIG. 23E.

At block 2644, the computer server may coordinate activation of the sound test for each hazard system, and transmit the commencement instructions to each hazard system at block 2646. The hazard detection system may receive the commencement instruction at block 2648. At block 2650, the hazard detection system may display a first light feature. The first light feature may indicate that the system is performing a test. For example, the system may display a rotating blue colored circle. At block 2652, the system may perform a sound check. Optionally, at block 2654, the system may perform a self-test of other components in the system. At step 2656, the results can be transmitted to the computer server. The hazard system may display a second light feature based on the result of the test. For example, if the test is successful, it may display a solid green circle. If the result did not pass, it may display an orange or red circle.

The computer server can receive the results from each hazard detection system at block 2662 and relay those results to the mobile device at block 2664. The mobile device can receive the results at block 2666 and display them at block 2668. For example, the mobile device may display results similar that shown in FIGS. 27C and 27D.

Figure 27A:
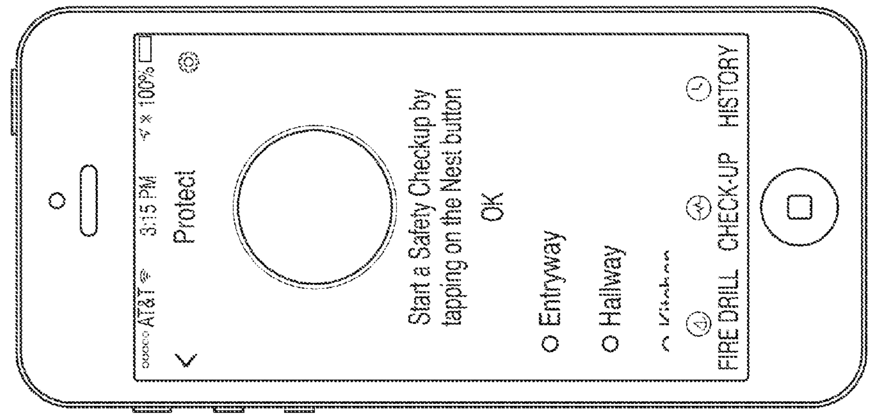
FIGS. 27A-27F show various illustrative user interfaces on a mobile device, according to various embodiments.
Figure 27C:
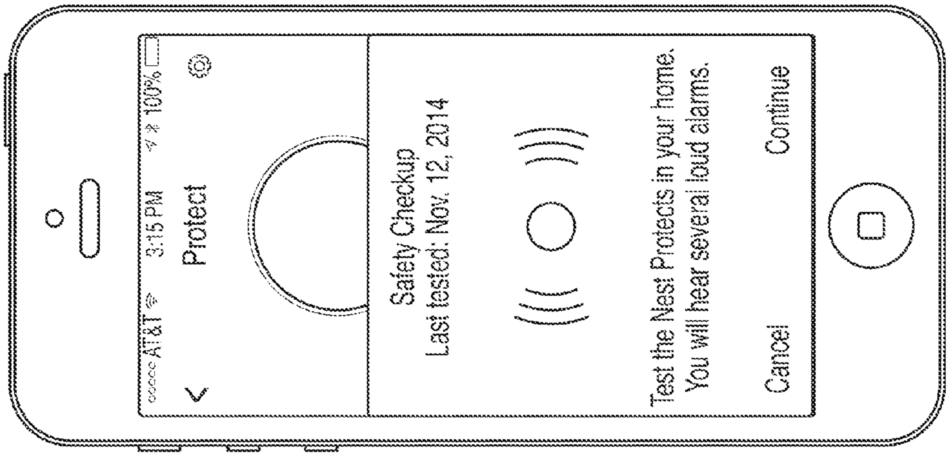
Figure 27B:
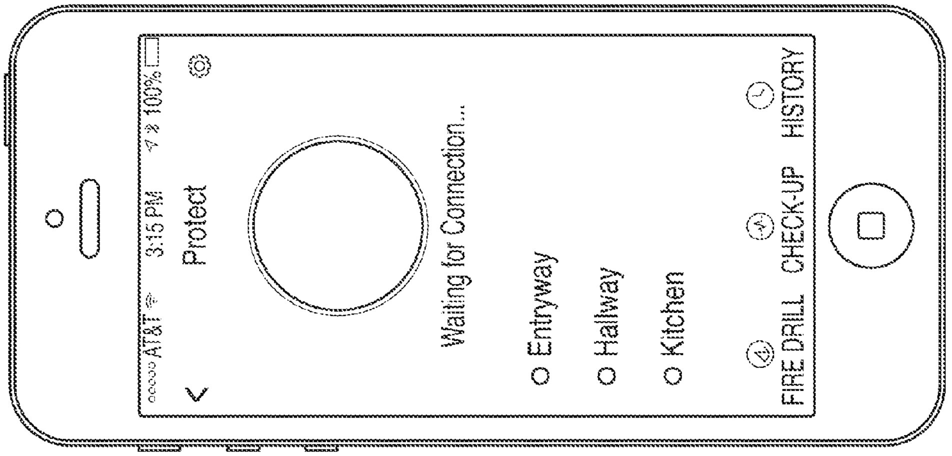
Figure 27D:
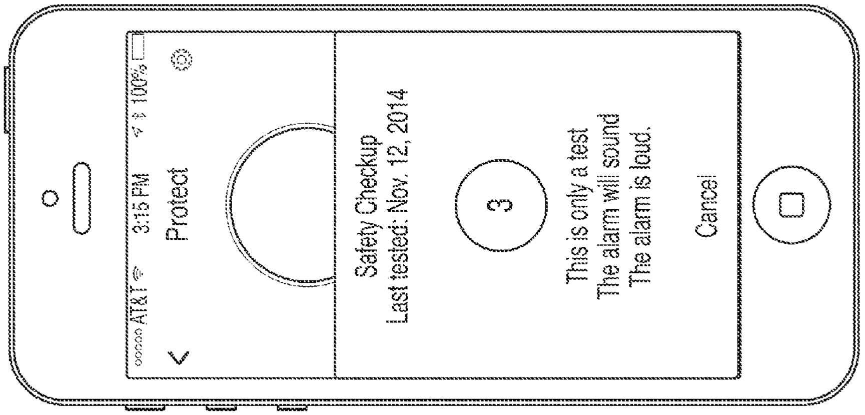
Figure 27E:
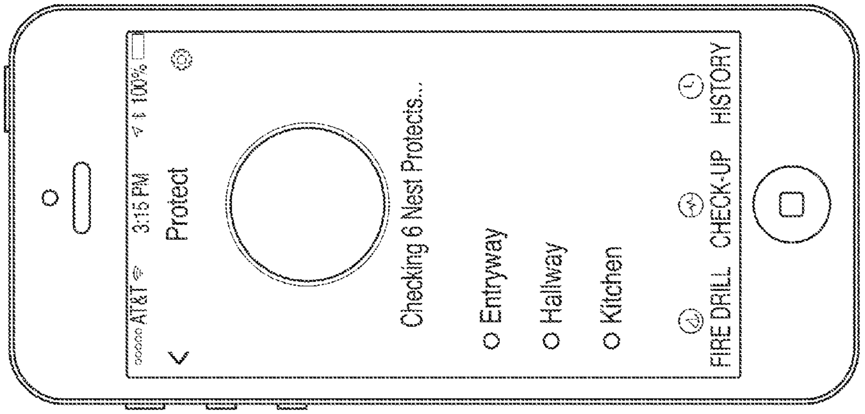
Figure 27F:
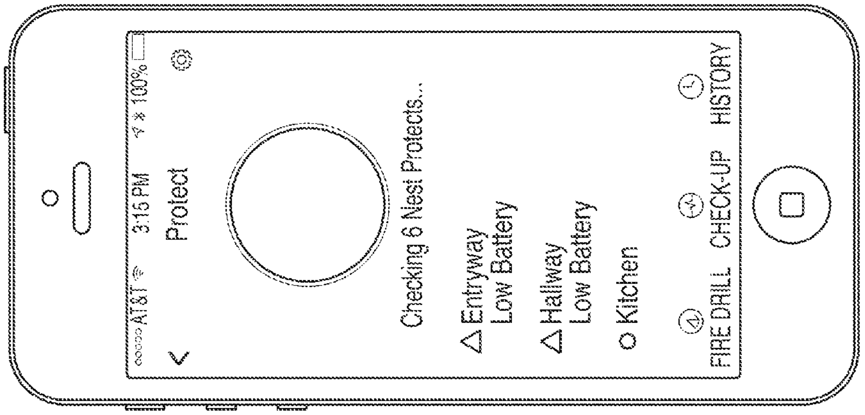

FIG. 27A shows an illustrative user interface screen 2700 where the user can select element 2702 to commence a sound check. FIG. 27B shows an illustrative user interface screen 2710 that illustrates that a connection is made with various hazard detection systems. FIG. 27C shows an illustrative user interface screen 2720 that informs a user that sound test is about to commence. The user may be presented with the opportunity to cancel the test, if desired. Screen 2720 shows an illustrative system 2722 that has sound waves 2723-2725 emanating therefrom. Sound waves 2723-2725 may be displayed in an animated fashion to show that the sound waves are moving. For example, waves 2723 may be displayed first, followed by waves 2724, which are followed by waves 2725. FIG. 27D shows an illustrative countdown timer in user interface screen 2730. FIG. 27E shows an illustrative user interface screen 2740 that indicates the reported status of one or more hazard system. As shown, the entryway and hallway system are associated with a green light status indicator, and the kitchen system is still being tested. FIG. 27F shows an illustrative user interface screen 2750 that indicates the reported status of one or more hazard system. For example, the entryway and hallway systems are associated with a yellow caution symbol.

Figure 28:
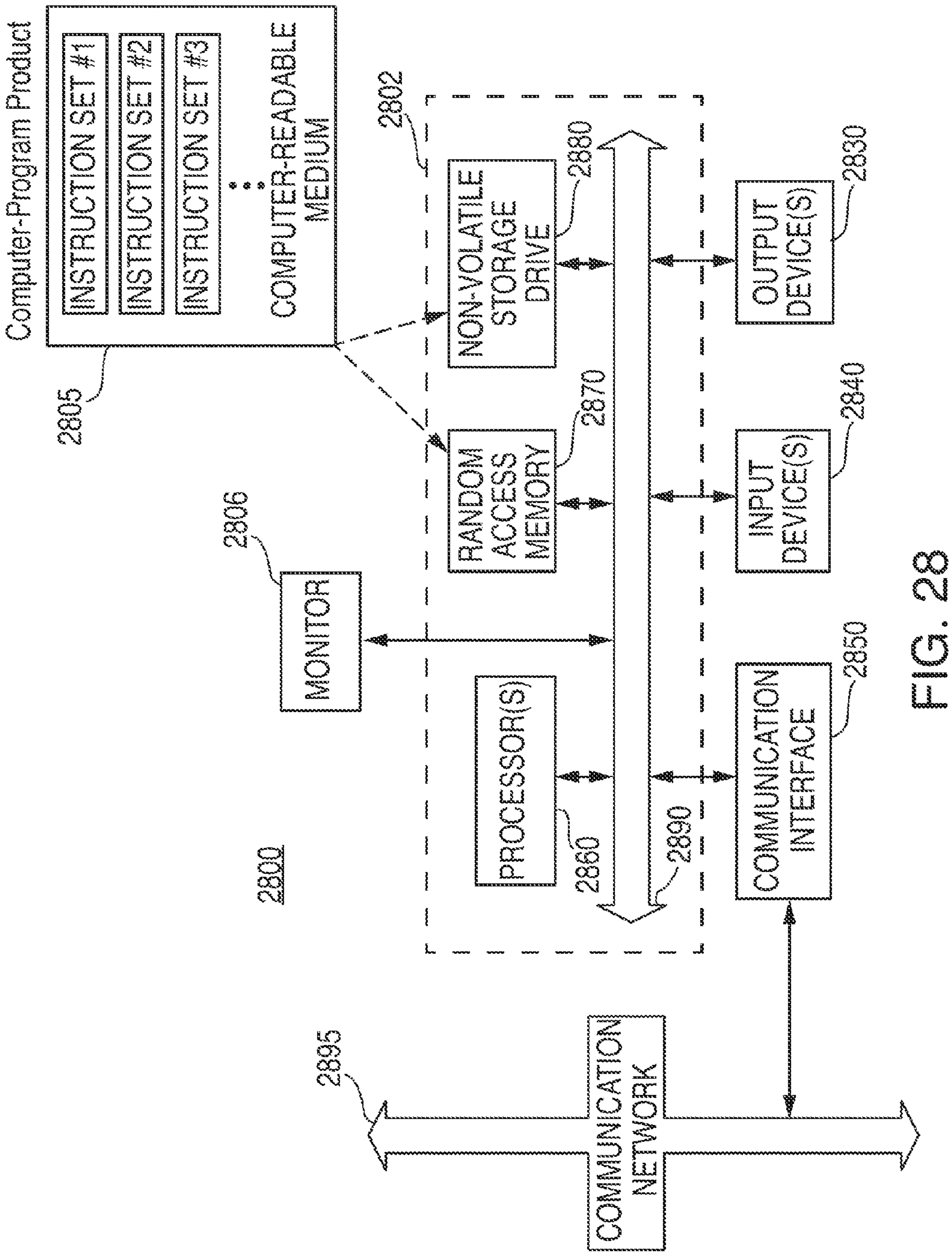
FIG. 28 shows a special-purpose computer system, according to an embodiment.

With reference to FIG. 28, an embodiment of a special-purpose computer system 2800 is shown. For example, one or more intelligent components may be a special-purpose computer system 2800. Such a special-purpose computer system 2800 may be incorporated as part of a hazard detector and/or any of the other computerized devices discussed herein, such as a remote server, smart thermostat, or network. The above methods may be implemented by computer-program products that direct a computer system to perform the actions of the above-described methods and components. Each such computer-program product may comprise sets of instructions (codes) embodied on a computer-readable medium that direct the processor of a computer system to perform corresponding actions. The instructions may be configured to run in sequential order, or in parallel (such as under different processing threads), or in a combination thereof. After loading the computer-program products on a general purpose computer system 2800, it is transformed into the special-purpose computer system 2800.

Special-purpose computer system 2800 can include computer 2802, a monitor 2806 coupled to computer 2802, one or more additional user output devices 2830 (optional) coupled to computer 2802, one or more user input devices 2840 (e.g., keyboard, mouse, track ball, touch screen) coupled to computer 2802, an optional communications interface 2850 coupled to computer 2802, a computer-program product 2805 stored in a tangible computer-readable memory in computer 2802. Computer-program product 2805 directs computer system 2800 to perform the above-described methods. Computer 2802 may include one or more processors 2860 that communicate with a number of peripheral devices via a bus subsystem 2890. These peripheral devices may include user output device(s) 2830, user input device(s) 2840, communications interface 2850, and a storage subsystem, such as random access memory (RAM) 2870 and non-volatile storage drive 2880 (e.g., disk drive, optical drive, solid state drive), which are forms of tangible computer-readable memory.

Computer-program product 2805 may be stored in non-volatile storage drive 2880 or another computer-readable medium accessible to computer 2802 and loaded into random access memory (RAM) 2870. Each processor 2860 may comprise a microprocessor, such as a microprocessor from Intel® or Advanced Micro Devices, Inc.®, or the like. To support computer-program product 2805, the computer 2802 runs an operating system that handles the communications of computer-program product 2805 with the above-noted components, as well as the communications between the above-noted components in support of the computer-program product 2805. Exemplary operating systems include Windows® or the like from Microsoft Corporation, Solaris® from Sun Microsystems, LINUX, UNIX, and the like.

User input devices 2840 include all possible types of devices and mechanisms to input information to computer 2802. These may include a keyboard, a keypad, a mouse, a scanner, a digital drawing pad, a touch screen incorporated into the display, audio input devices such as voice recognition systems, microphones, and other types of input devices. In various embodiments, user input devices 2840 are typically embodied as a computer mouse, a trackball, a track pad, a joystick, wireless remote, a drawing tablet, a voice command system. User input devices 2840 typically allow a user to select objects, icons, text and the like that appear on the monitor 2806 via a command such as a click of a button or the like. User output devices 2830 include all possible types of devices and mechanisms to output information from computer 2802. These may include a display (e.g., monitor 2806), printers, non-visual displays such as audio output devices, etc.

Communications interface 2850 provides an interface to other communication networks, such as communication network 2895, and devices and may serve as an interface to receive data from and transmit data to other systems, WANs and/or the Internet. Embodiments of communications interface 2850 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2850 may be coupled to a computer network, to a FireWire® bus, or the like. In other embodiments, communications interface 2850 may be physically integrated on the motherboard of computer 2802, and/or may be a software program, or the like.

RAM 2870 and non-volatile storage drive 2880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2870 and non-volatile storage drive 2880 may be configured to store the basic programming and data constructs that provide the functionality of various embodiments of the present invention, as described above.

Software instruction sets that provide the functionality of the present invention may be stored in RAM 2870 and non-volatile storage drive 2880. These instruction sets or code may be executed by the processor(s) 2860. RAM 2870 and non-volatile storage drive 2880 may also provide a repository to store data and data structures used in accordance with the present invention. RAM 2870 and non-volatile storage drive 2880 may include a number of memories including a main random access memory (RAM) to store instructions and data during program execution and a read-only memory (ROM) in which fixed instructions are stored. RAM 2870 and non-volatile storage drive 2880 may include a file storage subsystem providing persistent (non-volatile) storage of program and/or data files. RAM 2870 and non-volatile storage drive 2880 may also include removable storage systems, such as removable flash memory.

Bus subsystem 2890 provides a mechanism to allow the various components and subsystems of computer 2802 to communicate with each other as intended. Although bus subsystem 2890 is shown schematically as a single bus, alternative embodiments of the bus subsystem may utilize multiple busses or communication paths within the computer 2802.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

It is to be appreciated that while the described methods and systems for intuitive status signaling at opportune times for a hazard detector are particularly advantageous in view of the particular device context, in that hazard detectors represent important life safety devices, in that hazard detectors are likely to be placed in many rooms around the house, in that hazard detectors are likely to be well-positioned for viewing from many places in these rooms, including from near light switches, and in that hazard detectors will usually not have full on-device graphical user interfaces but can be outfitted quite readily with non-graphical but simple, visually appealing on-device user interface elements (e.g., a simple pressable button with shaped on-device lighting), and in further view of power limitations for the case of battery-only hazard detectors making it desirable for status communications using minimal amounts of electrical power, the scope of the present disclosure is not so limited. Rather, the described methods and systems for intuitive status signaling at opportune times are widely applicable to any of a variety of smart-home devices such as those described in relation to FIG. 15 supra and including, but not limited to, thermostats, environmental sensors, motion sensors, occupancy sensors, baby monitors, remote controllers, key fob remote controllers, smart-home hubs, security keypads, biometric access controllers, other security devices, cameras, microphones, speakers, time-of-flight based LED position/motion sensing arrays, doorbells, intercom devices, smart light switches, smart door locks, door sensors, window sensors, generic programmable wireless control buttons, lighting equipment including night lights and mood lighting, smart appliances, entertainment devices, home service robots, garage door openers, door openers, window shade controllers, other mechanical actuation devices, solar power arrays, outdoor pathway lighting, irrigation equipment, lawn care equipment, or other smart home devices. Although widely applicable for any of such smart-home devices, one or more of the described methods and systems become increasingly advantageous when applied in the context of devices that may have more limited on-device user interface capability (e.g., without graphical user interfaces), and/or having power limitations that make it desirable for status communications using minimal amounts of electrical power, while being located in relatively readily-viewable locations and/or well-traveled locations in the home. Having read this disclosure, one having skill in the art could apply the methods and systems of the present invention in the context of one or more of the above-described smart home devices. Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Any processes described with respect to FIGS. 1-28, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A method for testing a plurality of hazard detection systems within a common structure, the method implemented in a first hazard detection system of the plurality of hazard detection systems, the method comprising:

receiving an instruction to commence a sound check of at least a loud sounder;

prior to commencing the sound check, establishing wireless communications with a remainder of the plurality of hazard detection systems to enable the first hazard detection system to communicate with the remainder of the plurality of hazard detection systems;

determining a sound check commencement order for each of the plurality of hazard detection systems, wherein the sound check commencement order specifies when each hazard detection system performs its sound check such that no audio signals are simultaneously emitted by any other of the plurality of hazard detection systems, wherein the sound check commencement order is randomly selected for each of the hazard detection systems; and transmitting the randomly selected sound check commencement order to the remainder of the plurality of hazard detection systems via the established wireless communications; and commencing the sound check according to the determined sound check commencement order such that sound interference is prevented when the plurality of hazard systems are performing sounds check evaluations.

2. The method of claim 1, wherein the sound check commencement order staggers a start time for each hazard detection system, and wherein said wireless communications is one of direct point-to-point wireless communications between the hazard detection systems and an indirect wireless communications via one or more remote servers.

3. The method of claim 1, wherein the sound check commencement order is randomly selected for each of the hazard detection systems.

4. The method of claim 1, further comprising:

temporarily activating the loud sounder;

monitoring a microphone for an audio signal during the temporary activation of the loud sounder;

determining whether the audio signal satisfies sound check criteria; and reporting a result of whether the audio signal satisfied sound check criteria.

5. The method of claim 1, wherein the instruction originated from a mobile device.

6. The method of claim 1, wherein each of the plurality of hazard detection systems emits a unique tone via its speaker during the sound check, the method further comprising:

rejecting any audio signals that do not match the unique tone associated with the first hazard detection system.

7. A first hazard detection system implemented in a structure comprising at least a second hazard detection system, the first hazard detection system comprising:

a loud sounder;

a microphone;

communications circuitry; and at least one processor operative to:
- receive an instruction to commence a sound check of at least one loud sounder;
- prior to commencing the sound check,
  - establish wireless communications with the at least second hazard detection system to enable the first hazard detection system to communicate with the at least a second hazard detection system;
  - determine a sound check commencement order for each of the first and second hazard detection systems, wherein the sound check commencement order specifies when each hazard detection system performs its sound check such that no audio signals are simultaneously emitted by the first hazard detection system and the at least the second hazard detection system, wherein the sound check commencement order is randomly selected for each of the hazard detection systems; and
  - transmitting the randomly selected sound check commencement order to the at least a second hazard detection system via the established wireless communications; and
- commence the sound check according to the determined sound check commencement order such that sound interference is prevented when the first hazard detection system and the at least the second hazard system are performing sound check evaluations.

8. The first hazard detection system of claim 7, wherein the sound check commencement order staggers a start time for each hazard detection system, and wherein said wireless communications is one of direct point-to-point wireless communications between the hazard detection systems and an indirect wireless communications via one or more remote servers.

9. The first hazard detection system of claim 7, wherein the at least one processor is operative to:
- temporarily activate the loud sounder;
- monitor a microphone for an audio signal during the temporary activation of the loud sounder:
- determine whether the audio signal satisfies sound check criteria; and
- report a result of whether the audio signal satisfied sound check criteria.

10. The first hazard detection system of claim 7, wherein the instruction originated from a mobile device.

11. The first hazard detection system of claim 7, wherein each of the first and second hazard detection systems emits a unique tone via its speaker during the sound check, and wherein the at least one processor is operative to reject any audio signals that do not match the unique tone associated with the first hazard detection system.

12. A non-transitory computer-readable storage medium for testing a plurality of hazard detection systems within a common structure, a non-transitory computer-readable storage medium comprising instructions for:
- receiving an instruction to commence a sound check of at least one loud sounder;
- prior to commencing the sound check,
  - establishing wireless communications with a remainder of the plurality of hazard detection systems to enable a first hazard detection to communicate with the remainder of the plurality of hazard detection systems;
  - determining a sound check commencement order for each of the plurality of hazard detection systems, wherein the sound check commencement order specifies when each hazard detection system performs its sound check such that no audio signals are simultaneously emitted by any other of the plurality of hazard detection systems, wherein the sound check commencement order is randomly selected for each of the hazard detection systems; and
  - transmitting the randomly selected sound check commencement order to the remainder of the plurality of hazard detection systems via the established wireless communications; and
- commencing the sound check according to the determined sound check commencement order such that sound interference is prevented when the plurality of hazard systems are performing sounds check evaluations.

13. The non-transitory computer-readable storage medium of claim 12, wherein the sound check commencement order staggers a start time for each hazard detection system, and wherein said wireless communications is one of direct point-to-point wireless communications between the hazard detection systems and an indirect wireless communications via one or more remote servers.

14. The non-transitory computer-readable storage medium of claim 12, wherein the sound check commencement order is randomly selected for each of the hazard detection systems.

15. The non-transitory computer-readable storage medium of claim 12, further comprising instructions for:
- temporarily activating the loud sounder;
- monitoring a microphone for an audio signal during the temporary activation of the loud sounder;
- determining whether the audio signal satisfies sound check criteria; and
- reporting a result of whether the audio signal satisfied sound check criteria.

16. The non-transitory computer-readable storage medium of claim 12, wherein the instruction originated from a mobile device.

17. The non-transitory computer-readable storage medium of claim 12, wherein each of the plurality of hazard detection systems emits a unique tone via its speaker during the sound check, the non-transitory computer-readable storage medium further comprising instructions for:
- rejecting any audio signals that do not match the unique tone associated with the first hazard detection system.

* * * * *